US011663670B1

(12) United States Patent
Miller et al.

(10) Patent No.: US 11,663,670 B1
(45) Date of Patent: May 30, 2023

(54) USE DETERMINATION RISK COVERAGE DATASTRUCTURE FOR ON-DEMAND AND INCREASED EFFICIENCY COVERAGE DETECTION AND REBALANCING APPARATUSES, METHODS AND SYSTEMS

(71) Applicants: Anthony Miller, Minneapolis, MN (US); Matthew Chock, Apple Vally, MN (US); David Dickey, Yvonne, MN (US); Glen Eiden, Forest Lake, MN (US); Trevor Fast, San Francisco, CA (US); Shawn Wagoner, Edina, MN (US); Matthew Wiandt, Edina, MN (US); Jessica Zeaske, Minneapolis, MN (US)

(72) Inventors: Anthony Miller, Minneapolis, MN (US); Matthew Chock, Apple Vally, MN (US); David Dickey, Yvonne, MN (US); Glen Eiden, Forest Lake, MN (US); Trevor Fast, San Francisco, CA (US); Shawn Wagoner, Edina, MN (US); Matthew Wiandt, Edina, MN (US); Jessica Zeaske, Minneapolis, MN (US)

(73) Assignee: Bind Benefits, Inc., Minneapolis, MN (US)

( * ) Notice: Subject to any disclaimer, the term of this patent is extended or adjusted under 35 U.S.C. 154(b) by 180 days.

(21) Appl. No.: 15/631,961

(22) Filed: Jun. 23, 2017

Related U.S. Application Data

(60) Provisional application No. 62/524,188, filed on Jun. 23, 2017, provisional application No. 62/510,215, (Continued)

(51) Int. Cl.
*G06Q 40/08* (2012.01)
*G06Q 10/06* (2012.01)
*G06Q 10/067* (2023.01)

(52) U.S. Cl.
CPC .......... *G06Q 40/08* (2013.01); *G06Q 10/067* (2013.01)

(58) Field of Classification Search
CPC ............................ G06Q 40/08; G06Q 10/06
(Continued)

(56) References Cited

U.S. PATENT DOCUMENTS 5,301,105 A   4/1994  Cummings
5,523,942 A   6/1996  Tyler
(Continued)

FOREIGN PATENT DOCUMENTS

WO   2011123823   10/2011
WO   2014130392    8/2014
WO   2015191562   12/2015

OTHER PUBLICATIONS

Karen Davis, Marilyn Moon, Barbara Cooper and Cathy Schoen. "Medicare Extra: A Comprehensive Benefit Option For Medicare Beneficiaries". Health Affairs, (2005). doi: 10.1377/hlthaff.w5.442. http://content.healthaffairs.org/content/early/2005/10/04/hlthaff.w5.442.citation (Year: 2005).*

(Continued)

*Primary Examiner* — Ayal I. Sharon
(74) *Attorney, Agent, or Firm* — Hanchuk Kheit LLP.; Walter G. Hanchuk

(57) ABSTRACT

The Use Determination Risk Coverage Datastructure for On-Demand and Increased Efficiency Coverage Detection and Rebalancing Apparatuses, Methods and Systems ("UDRCD") transforms coverage enrollment request, event signal inputs via UDRCD components into coverage enrollment response, add-in recommendation outputs. A coverage (Continued)

enrollment request from a user is obtained. Available options for an enrollment user interface are configured based on the plan sponsor settings. Copay setting selections for individual core coverage services, atomized condition add-in selections, and atomized procedure add-in selections are obtained via the enrollment user interface. A core coverage cost and add-in coverage costs are calculated using the associated modeling data. A user cost for the user is calculated based on the core coverage cost, the subsidization settings for the core coverage cost, the add-in coverage costs, and the subsidization settings for the add-in coverage costs. The enrollment user interface is configured to display the calculated user cost for the user.

16 Claims, 30 Drawing Sheets

Related U.S. Application Data filed on May 23, 2017, provisional application No. 62/446,810, filed on Jan. 16, 2017.

(58) Field of Classification Search
USPC .......................................................... 705/4
See application file for complete search history.

(56) References Cited

U.S. PATENT DOCUMENTS

| | | | |
|---|---|---|---|
| 6,266,645 B1* | 7/2001 | Simpson | G06Q 10/10 705/3 |
| 7,392,201 B1* | 6/2008 | Binns | G06F 19/328 600/300 |
| 7,493,264 B1 | 2/2009 | Kelly | |
| 7,702,522 B1 | 4/2010 | Sholem | |
| 7,702,527 B1* | 4/2010 | Kron | G06Q 40/08 705/2 |
| 7,805,318 B1 | 9/2010 | Kuhn | |
| 8,005,687 B1* | 8/2011 | Pederson | G06F 19/328 705/2 |
| 8,041,636 B1 | 10/2011 | Hunter | |
| 8,352,286 B1* | 1/2013 | Bawa | G06Q 50/22 703/2 |
| 8,670,996 B1 | 3/2014 | Weiss | |
| 10,521,864 B1 | 12/2019 | Davis | |
| 2001/0034619 A1 | 10/2001 | Sherman | |
| 2002/0065758 A1 | 5/2002 | Henley | |
| 2003/0195838 A1 | 10/2003 | Henley | |
| 2003/0204421 A1* | 10/2003 | Houle | G06Q 40/08 705/4 |
| 2004/0010426 A1* | 1/2004 | Berdou | G06Q 40/02 705/4 |
| 2004/0111363 A1 | 6/2004 | Trench | |
| 2004/0143464 A1* | 7/2004 | Houle | G06Q 10/10 705/4 |
| 2004/0193456 A1 | 9/2004 | Kellington | |
| 2005/0055251 A1 | 3/2005 | Ashley | |
| 2005/0256745 A1 | 11/2005 | Dalton | |
| 2006/0089862 A1* | 4/2006 | Anandarao | G06Q 10/10 705/4 |
| 2006/0200407 A1 | 9/2006 | Hartley | |
| 2007/0021986 A1* | 1/2007 | Cheung | G06Q 30/00 705/4 |
| 2007/0156455 A1* | 7/2007 | Tarino | G06F 19/328 705/2 |
| 2007/0162308 A1 | 7/2007 | Peters | |
| 2007/0271119 A1* | 11/2007 | Boerger | G06F 19/328 705/2 |
| 2007/0276704 A1 | 11/2007 | Naumann | |
| 2008/0109263 A1 | 5/2008 | Clark | |
| 2008/0120143 A1* | 5/2008 | Beauregard | G06Q 40/08 705/4 |
| 2008/0183504 A1 | 7/2008 | Highley | |
| 2008/0208640 A1 | 8/2008 | Thomas | |
| 2008/0243547 A1 | 10/2008 | Brett | |
| 2008/0275737 A1 | 11/2008 | Gentry | |
| 2008/0288286 A1 | 11/2008 | Noreen | |
| 2009/0076841 A1 | 3/2009 | Baker | |
| 2009/0112632 A1* | 4/2009 | Belliveau | G06Q 40/08 705/4 |
| 2010/0030579 A1 | 2/2010 | Dhauvan | |
| 2010/0088112 A1 | 4/2010 | Krasny | |
| 2010/0241449 A1 | 9/2010 | Firminger | |
| 2010/0268108 A1 | 10/2010 | Firminger | |
| 2010/0274577 A1 | 10/2010 | Firminger | |
| 2010/0274578 A1 | 10/2010 | Firminger | |
| 2010/0293002 A1 | 11/2010 | Firminger | |
| 2010/0305962 A1 | 12/2010 | Firminger | |
| 2011/0035231 A1 | 2/2011 | Firminger | |
| 2011/0153369 A1 | 6/2011 | Feldman | |
| 2011/0161117 A1 | 6/2011 | Busque | |
| 2011/0161118 A1 | 6/2011 | Borden | |
| 2011/0166895 A1* | 7/2011 | Bakos | G06Q 40/00 705/4 |
| 2011/0282690 A1 | 11/2011 | Patel | |
| 2012/0035975 A1 | 2/2012 | Sugimoto | |
| 2012/0047105 A1 | 2/2012 | Saigal | |
| 2012/0066662 A1 | 2/2012 | Chao | |
| 2012/0129139 A1 | 5/2012 | Partovi | |
| 2012/0239560 A1* | 9/2012 | Pourfallah | G06Q 40/08 705/40 |
| 2012/0284058 A1 | 11/2012 | Varanasi | |
| 2012/0310679 A1* | 12/2012 | Olson | G06Q 40/08 705/4 |
| 2012/0330690 A1 | 12/2012 | Goslinga | |
| 2013/0035956 A1 | 2/2013 | Carmeli | |
| 2013/0124217 A1 | 5/2013 | Thesman | |
| 2013/0166317 A1 | 6/2013 | Beardall | |
| 2013/0185231 A1 | 7/2013 | Baras | |
| 2013/0191157 A1 | 7/2013 | Eiden | |
| 2014/0006066 A1 | 1/2014 | Watts | |
| 2014/0142964 A1 | 5/2014 | Lang | |
| 2014/0172470 A1 | 6/2014 | Watts | |
| 2014/0180714 A1* | 6/2014 | Mun | G06Q 40/08 705/2 |
| 2014/0180949 A1* | 6/2014 | Ramasamy | G06Q 10/1057 705/322 |
| 2014/0249851 A1 | 9/2014 | Christodouleas | |
| 2014/0304009 A1 | 10/2014 | Saxon | |
| 2014/0372150 A1 | 12/2014 | Karle | |
| 2015/0161622 A1 | 6/2015 | Hoffmann | |
| 2015/0199493 A1 | 7/2015 | Glenn | |
| 2015/0339602 A1 | 11/2015 | Schlosser | |
| 2015/0356685 A1 | 12/2015 | Lindberg | |
| 2016/0042135 A1 | 2/2016 | Hogan | |
| 2016/0092641 A1 | 3/2016 | Delaney | |
| 2016/0125362 A1* | 5/2016 | Dziuba | G06Q 10/10 705/322 |
| 2016/0140295 A1 | 5/2016 | Powell | |
| 2016/0246941 A1 | 8/2016 | Miller | |
| 2016/0292367 A1 | 10/2016 | Thorpe | |
| 2016/0358295 A1* | 12/2016 | Heffley | G06Q 50/24 |
| 2016/0378932 A1* | 12/2016 | Sperling | G06F 19/328 705/3 |
| 2018/0166157 A1 | 6/2018 | Firminger | |
| 2018/0197636 A1 | 7/2018 | Firminger | |
| 2018/0260905 A1* | 9/2018 | Andreae | G06Q 30/06 |
| 2018/0301222 A1 | 10/2018 | Dew | |
| 2020/0118691 A1 | 4/2020 | Kiljanek | |
| 2021/0043310 A1 | 2/2021 | Valuck | |
| 2021/0090694 A1 | 3/2021 | Colley | |
| 2021/0174963 A1 | 6/2021 | Hill | |
| 2021/0407672 A1 | 12/2021 | Zumbrun | |
| 2021/0407682 A1 | 12/2021 | Crossen | |

OTHER PUBLICATIONS

Peter Diamond. "Organizing the Health Insurance Market". Econometrica, vol. 60, No. 6. (Nov. 1992), pp. 1233-1254. http://links.jstor.org/sici?sici=0012-9682%28199211%2960%3A6%3C1233%3AOTHIM%3E2.0.CO%3B2-5 (Year: 1992).*

(56) References Cited

OTHER PUBLICATIONS

Adam Atherly. "The Effect of Medicare Supplemental Insurance on Medicare Expenditures". International Journal of Health Care Finance and Economics, 2, 137-162, 2002. (Year: 2002).*

Mark V. Pauly, Patricia Danzon, Paul Feldstein, and John Hoff. "A Plan for 'Responsible National Health Insurance'". Health Affairs, pp. 5-25, Spring (1991). (Year: 1991).*

Susan L. Ettner. "Adverse selection and the purchase of Medigap insurance by the elderly". Journal of Health Economics. vol. 16, Issue 5, Oct. 1997, pp. 543-562. https://doi.org/10.1016/S0167-6296(97)00011-8 (Year: 1997).*

John H. Goddeeris and Andrew J. Hogan. "Improving Access to Health Care: What Can the States Do?" W.E. Upjohn Institute for Employment Research. (1992). ISBN 0-88099-117-8. (Year: 1992).*

Dictionary.com. Definition of "Condition". Collins English Dictionary—Complete & Unabridged 2012 Digital Edition. Downloaded on Aug. 3, 2019. https://www.dictionary.com/browse/condition (Year: 2012).

Dictionary.com. Definition of "Atomize". Collins English Dictionary—Complete & Unabridged 2012 Digital Edition. Downloaded on Aug. 3, 2019. https://www.dictionary.com/browse/atomize (Year: 2012).

D. C. Stahl, L. Rouse, D. Ko and J. C. Niland, "GDSI: a Web-based decision support system to facilitate the efficient and effective use of clinical practice guidelines," Proc. of 37th Annual Hawaii Int'l Conf, on System Sciences, 2004. pp. 10, doi: 10.1109/HICSS .2004.1265377. (Year: 2004).

V. Tresp, J. Marc Overhage, M. Bundschus, S. Rabizadeh, P. A. Fasching and S. Yu, "Going Digital: A Survey on Digitalization and Large-Scale Data Analytics in Healthcare," in Proc. of the IEEE, vol. 104, No. 11, pp. 2180-2206, Nov. 2016, doi: 10.1109/JPROC .2016.2615052.

Ongenae, Femke et al. "Towards computerizing intensive care sedation guidelines: design of a rule-based architecture for automated execution of clinical guidelines." BMC medical informatics and decision making vol. 10 3. Jan. 18, 2010, doi: 10.1186/1472-6947-10-3. (Year: 2010).

Geamsakul etal. "Analysis of Hepatitis Dataset by Decision Tree Based on Graph-Based Induction". Annual Conference of the Japanese Society for Artificial Intelligence. JSAI 2004: New Frontiers in Artificial Intelligence, pp. 5-28. https://link.springer.com/chapter/10.1007/978-3-540-71009-7_2 (Year: 2004).

Geamsakul et al. "Constructing a Decision Tree for Graph-Structured Data and its Applications". Fundamenta Informaticae 66 (2005) 131-160 131. IOS Press. https://www.researchgate.net/publication/234785949_Constructing_a_Decision_Tree_for_Graph-Structured_Data_and_its_Applications (Year: 2005).

Ling et al. "Decision trees with minimal costs". ICML '04: Proceedings of the twenty-first international conference on Machine learning. Jul. 2004 https://doi.org/10.1145/1015330.1015369 (Year: 2004).

Desarkaretal. "Med-Tree: A User Knowledge Graph Framework for Medical Applications". 13th IEEE International Conference on Bioinformatics and BioEngineering. Nov. 10-13, 2013. DOI: 10.1109/BIBE.2013.6701564 (Year: 2013).

U.S. Appl. No. 15/631,961.
U.S. Appl. No. 15/632,052.
U.S. Appl. No. 16/659,429.
U.S. Appl. No. 16/659,438.
U.S. Appl. No. 16/659,444.
U.S. Appl. No. 17/862,333.
U.S. Appl. No. 17/862,351.
U.S. Appl. No. 17/862,368.
U.S. Appl. No. 17/862,385.
U.S. Appl. No. 17/862,392.
U.S. Appl. No. 62/446,810.
U.S. Appl. No. 62/510,215.
U.S. Appl. No. 62/524,188.
U.S. Appl. No. 62/748,518.
U.S. Appl. No. 62/807,711.
U.S. Appl. No. 63/220,986.
U.S. Appl. No. 63/220,988.
U.S. Appl. No. 63/220,991.
U.S. Appl. No. 63/220,992.
U.S. Appl. No. 63/220,993.

* cited by examiner

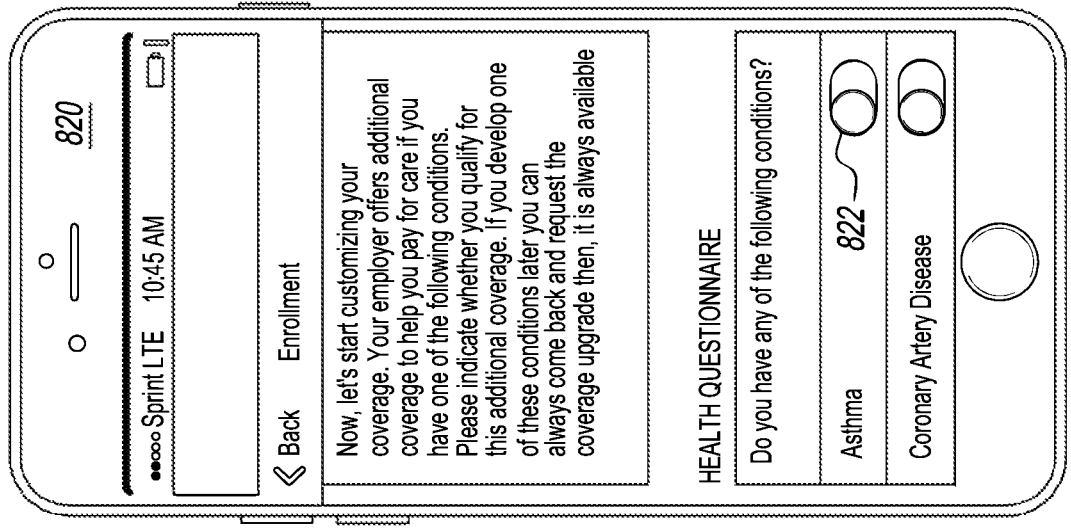
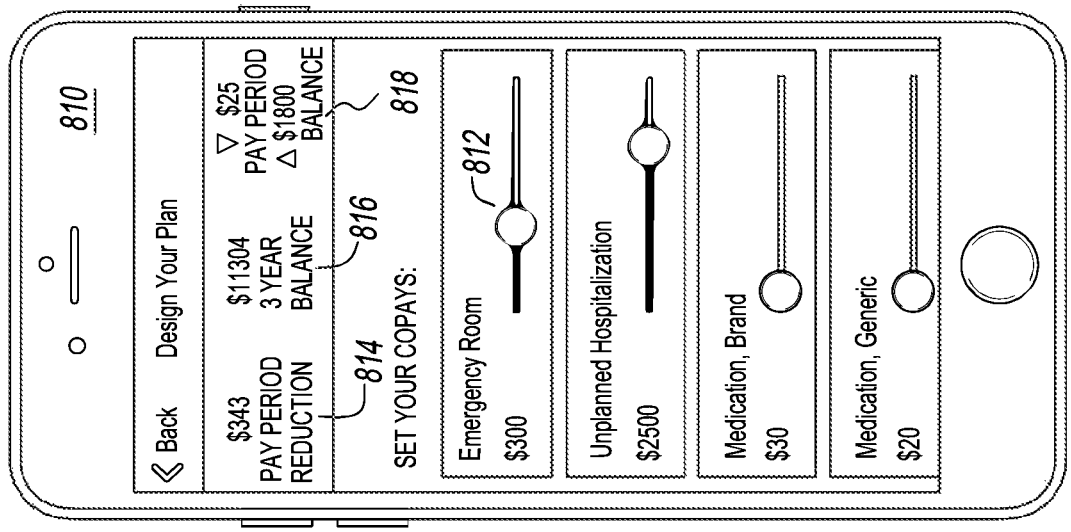
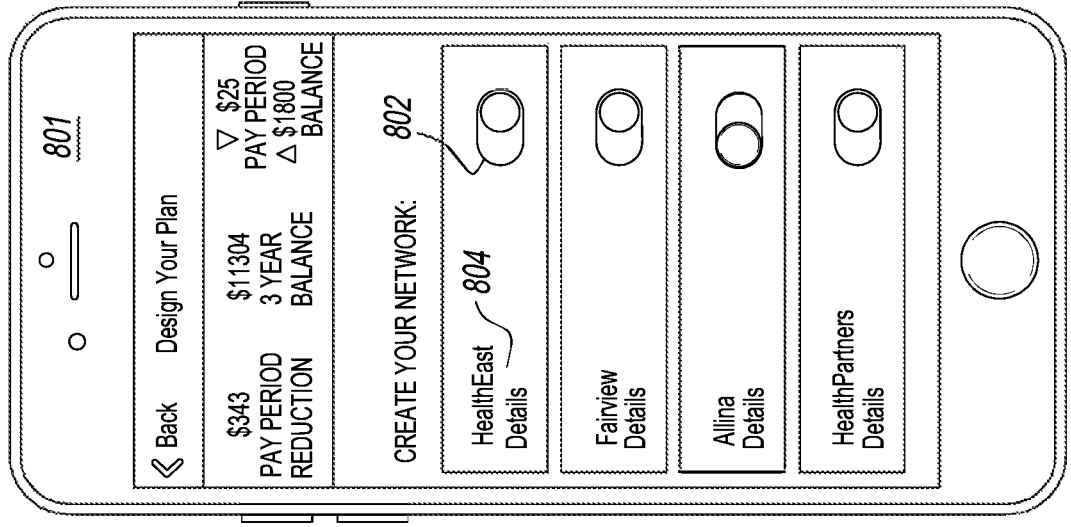
FIG. 8

FIG. 9

|  | Core | Core + Add-Ins |
|---|---|---|
| Preventive | Free | Free |
| Virtual Office Visit | Free | Free |
| Primary Care Visit | $45 | $20 |
| Specialty Visit | $95 | $45 |
| Urgent Care | $200 | $100 |
| Emergency Room | $500 | $500 |
| Hospital | $3000 | $3000 |
| Prescription Drugs (Gen./Brand Pref./Brand NP/Specialty) | $8/30/50/350 | $5/15/25/175 |

MENU | BIND | INBOX (3) | PROFILE
SEARCH | ID CARD | JANE

Is Ear Infection using Park Nicollet Clinic - St Louis Park covered?

← SEARCH AGAIN    ADVANCED SEARCH

YES — This is covered in the Personal Protection Policy for Jane.

Cost and Coverage Options
Descriptive content about cost and coverage goes here.

| | |
|---|---|
| Primary Care visit | $45.00 |
| Specialist visit | $95.00 |
| Urgent Care visit | $200.00 |
| ADDITIONAL DETAILS | ⌄ |

Find a Provider
Descriptive content about finding a provider goes here.

BY LOCATION | BY NAME

Virtual Visit
Descriptive content about why a virtual visit is a good option for this condition goes here Virtual Visit    FREE

SCHEDULE A VIRTUAL VISIT

SUPPORT ⌄
RESOURCES ⌄
SOCIAL ⌄

TERMS OF SERVICE
PRIVACY POLICY
c 2017 BIND All Rights Reserved

---

1910

MENU | BIND | INBOX (3) | PROFILE
SEARCH | ID CARD | JANE

Is Ear Infection using Erin Parker, MD - Park Nicollet Clinic covered?

← SEARCH AGAIN    ADVANCED SEARCH

YES — This is covered in the Personal Protection Policy for Jane.

Cost and Coverage Options
Descriptive content about cost and coverage goes here.

| | |
|---|---|
| Primary Care visit | $45.00 |
| Urgent Care visit | $200.00 |
| ADDITIONAL DETAILS | ⌄ |

Find a Provider

Erin Parker, MD
Park Nicollet Clinic - St Louis Park
Family Medicine    CALL  DIRECTIONS
Copay: $45

Virtual Visit
Descriptive content about why a virtual visit is a good option for this condition goes here Virtual Visit    FREE

SCHEDULE A VIRTUAL VISIT

SUPPORT ⌄
RESOURCES ⌄
SOCIAL ⌄

TERMS OF SERVICE
PRIVACY POLICY
c 2017 BIND All Rights Reserved

---

1920

MENU | BIND | INBOX (3) | PROFILE
SEARCH | ID CARD | JANE

Is Ear Infection using Stephen Peech, MD - Peech Family Clinic covered?

← SEARCH AGAIN    ADVANCED SEARCH

NO — This provider is not covered in the Personal Protection Policy for Jane.

Find a Provider
Descriptive content about finding a provider that is covered in Personal Protection Policy that treats an ear infection goes here.

BY LOCATION | BY NAME

Virtual Visit
Descriptive content about why a virtual visit is a good option for this condition goes here Virtual Visit    FREE

SCHEDULE A VIRTUAL VISIT

SUPPORT ⌄
RESOURCES ⌄
SOCIAL ⌄

TERMS OF SERVICE
PRIVACY POLICY
c 2017 BIND All Rights Reserved

FIG. 21

LIKELY UPCOMING CARE

Virtual Second Opinion
Covered Service $0

Knee Replacement Surgery $1,000 - $20,000
Upgrade Available
View Upgrade Options

INSIDER TIP!

Depending on the specialist you see next your odds of having surgery vary. Additionally, some surgeons have better results than others. We have studied surgeons and arranged for special pricing with those that guarantee successful results for you by adhering to medical evidence.

*FIG. 23*

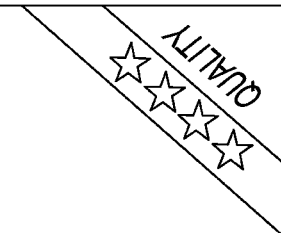

FIG. 25

| 2502 | Total Episodic Cost 2520 | | 2513 High | Provider Average Allowed | 2531 Util. Factor | 2532 Price Factor | Member Add-in Cost 2540 Copay + Paycheck |
|---|---|---|---|---|---|---|---|
| | Low | 2512 Market | | | | | |
| Ankle Surgery | $11,781 | | $35,342 | $27,143 | 1.20 | 0.96 | $3,500 + $200 for 24 pay periods |
| Back Surgery | $34,513 | | $103,540 | $56,823 | 0.84 | 0.98 | $3,500 + $300 for 26 pay periods |
| Back, Radio Frequency Ablation | $1,250 | | $3,750 | $2,235 | 1.09 | 0.82 | $700 + N/A |
| Back, Spinal Injections For Pain | $174 | | $522 | $450 | 1.22 | 1.06 | $200 + N/A |
| Bariatric Surgery/Weight Loss Surgery | $14,240 | | $42,721 | $21,435 | 1.06 | 0.71 | $3,500 + $100 for 26 pay periods |
| Benign Prostatic Hyperplasia Surgery | $1,037 | | $3,110 | $2,576 | 1.14 | 1.09 | $600 + $50 for 4 pay periods |
| Breast Reduction | $293 | | $880 | $491 | 0.94 | 0.89 | $200 + N/A |
| Bunionectomy | $7,465 | | $22,396 | $9,317 | 0.80 | 0.78 | $2,600 + $50 for 4 pay periods |
| Carotid Endarterectomy | $4,724 | | $14,173 | $10,522 | 0.87 | 1.28 | $3,000 + $50 for 4 pay periods |
| Carpal Tunnel Procedure | $3,829 | | $8,423 | $6,540 | 1.05 | 0.96 | $2,200 + $50 for 3 pay periods |
| Colonoscopy (Except Colorectal Cancer Screening) | $1,376 | | $4,127 | $2,496 | 1.12 | 0.81 | $600 + $50 for 3 pay periods |
| Coronary Angioplasty with our without Stents | $16,135 | | $48,406 | $20,088 | 0.75 | 0.83 | $3,500 + $100 for 26 pay periods |
| Coronary Artery Bypass Surgery | $43,010 | | $129,031 | $51,303 | 0.71 | 0.84 | $3,500 + $300 for 26 pay periods |
| Endometrial Ablation | $3,476 | | $10,427 | $7,319 | 0.94 | 1.12 | $600 + $50 for 4 pay periods |
| Functional Nasal Procedure/Sinus Surgery/Septoplasty | $13,927 | | $41,782 | $14,640 | 0.73 | 0.72 | $2,000 + $50 for 4 pay periods |
| Gallbladder Removal (Cholecystectomy) | $8,765 | | $26,294 | $15,997 | 1.17 | 0.78 | $3,500 + $50 for 18 pay periods |
| Ganglion Cyst Surgery | $375 | | $1,125 | $725 | 0.84 | 1.15 | $3,500 + $50 for 26 pay periods |
| Hammertoe Surgery | $6,645 | | $19,934 | $9,688 | 0.81 | 0.90 | $300 + N/A |
| Hernia Repairs | $6,627 | | $19,880 | $12,977 | 0.96 | 1.02 | $2,800 + $50 for 3 pay periods |
| Hip Arthroscopy | $14,545 | | $43,635 | $30,021 | 0.86 | 1.20 | $3,500 + $50 for 8 pay periods |
| Hip Replacement | $18,610 | | $55,830 | $27,870 | 0.72 | 1.04 | $3,500 + $200 for 26 pay periods |
| Hip Resurfacing | $1,144 | | $3,432 | $2,907 | 1.05 | 1.21 | $3,500 + $200 for 25 pay periods |
| Hysterectomy (Except in Cases of Cancer) | $10,963 | | $32,888 | $27,856 | 1.21 | 0.94 | $3,500 + $50 for 9 pay periods |
| Knee Surgery (Arthroscopic) | $7,145 | | $21,434 | $13,029 | 0.94 | 0.97 | $3,500 + $50 for 9 pay periods |
| Knee Surgery (Open)/Knee Replacement | $19,319 | | $57,957 | $40,786 | 0.91 | 1.16 | $3,500 + $300 for 26 pay periods |
| Morton's Neuroma | $292 | | $876 | $898 | 1.25 | 1.23 | $300 + N/A |
| Myringotomy/Tympanostomy (Ear Tubes) | $716 | | $2,149 | $774 | 0.72 | 0.75 | $300 + N/A |
| Nissan Fundoplication (Reflux Surgery) | $11,997 | | $35,995 | $26,332 | 0.93 | 1.18 | $3,500 + $150 for 26 pay periods |
| Plantar Fasciitis Surgery | $3,425 | | $10,275 | $3,696 | 0.76 | 0.71 | $1,000 + $50 for 3 pay periods |
| Tonsillectomy/Adenoidectomy | $8,015 | | $24,044 | $17,262 | 1.21 | 0.89 | $3,500 + $50 for 26 pay periods |
| Tubal Ligation | $3,560 | | $10,679 | $7,176 | 0.90 | 1.12 | $2,000 + $50 for 4 pay periods |
| Upper Q Endoscopy | $4,730 | | $14,191 | $9,177 | 0.97 | 1.00 | $2,600 + $50 for 4 pay periods |
| Urinary Incontinence Treatment | $7,549 | | $22,647 | $12,649 | 1.18 | 0.71 | $3,500 + $50 for 6 pay periods |
| Varicose Vein Stripping | $525 | | $1,576 | $969 | 0.94 | 0.98 | $300 + N/A |
| Vasectomy | $395 | | $1,185 | $877 | 1.00 | 1.11 | $300 + N/A |

Provider Control Panel 2501
Provider Group A's Current Performance 2511

FIG. 26

| Provider Control Panel 2601 | Modify Add-In Pricing | | | | | 2650 | | |
|---|---|---|---|---|---|---|---|---|
| | Episodic 2610 | Provider Change 2620 | Code Level | New Allowed | Total 2630 | Member Responsibility 2640 Copay + Paycheck | Low | Total Member Cost Net High |
| □ Ankle Surgery | 0% | Codes | | $27,143 | $8,300 | $3,500 + $200 for 24 pay periods | $3,550 | $10,000 |
| □ Back Surgery | 0% | Codes | | $56,823 | $11,300 | $3,500 + $300 for 26 pay periods | $10,000 | $11,300 |
| □ Back, Radio Frequency Ablation | 0% | Codes | | $2,235 | $2,235 | $700 + N/A | $400 | $1,150 |
| □ Back, Spinal Injections For Pain | 0% | Codes | | $450 | $200 | $200 + N/A | $100 | $200 |
| □ Bariatric Surgery/Weight Loss Surgery | 0% | Codes | | $21,435 | $6,100 | $3500 + $100 for 26 pay periods | $4,300 | $11,300 |
| □ Benign Prostatic Hyperplasia Surgery | 0% | Codes | | $2,576 | $800 | $600 + $50 for 4 pay periods | $400 | $950 |
| □ Breast Reduction | 0% | Codes | | $491 | $200 | $200 + N/A | $100 | $300 |
| □ Bunionectomy | 0% | Codes | | $9,317 | $2,800 | $2,600 + $50 for 4 pay periods | $2,250 | $6,100 |
| □ Carotid Endarterectomy | 0% | Codes | | $10,522 | $3,200 | $3,000 + $50 for 4 pay periods | $1,450 | $4,300 |
| □ Carpal Tunnel Procedure | 0% | Codes | | $6,540 | $2,000 | $1,800 + $50 for 4 pay periods | $1,150 | $2,550 |
| □ Colonoscopy (Except Colorecteral Cancer Screening) | 0% | Codes | | $2,496 | $750 | $600 + $50 for 3 pay periods | $500 | $1,250 |
| □ Coronary Angioplasty with our without Stents | 0% | Codes | | $20,088 | $6,100 | $3,500 + $100 for 26 pay periods | $4,800 | $11,300 |
| □ Coronary Artery Bypass Surgery | 0% | Codes | | $51,303 | $11,300 | $3,500 + $300 for 26 pay periods | $11,300 | $11,300 |
| □ Endometrial Ablation | 0% | Codes | | $7,319 | $2,200 | $2,000 + $50 for 4 pay periods | $1,050 | $3,150 |
| □ Functional Nasal Procedure/Sinus Surgery/Septoplasty | 0% | Codes | | $14,640 | $4,400 | $3,500 + $50 for 18 pay periods | $4,200 | $11,300 |
| □ Gallbladder Removal (Cholecystectomy) | 0% | Codes | | $15,997 | $4,800 | $3,500 + $50 for 26 pay periods | $2,650 | $7,400 |
| □ Ganglion Cyst Surgery | 0% | Codes | | $725 | $300 | $300 + N/A | $200 | $400 |
| □ Hammertoe Surgery | 0% | Codes | | $9,688 | $2,950 | $2,800 + $50 for 3 pay periods | $2,000 | $6,000 |
| □ Hernia Repairs | 0% | Codes | | $12,977 | $3,900 | $3,500 + $50 for 8 pay periods | $2,000 | $6,000 |
| □ Hip Arthroscopy | 0% | Codes | | $30,021 | $8,700 | $3,500 + $200 for 26 pay periods | $4,400 | $11,300 |
| □ Hip Replacement | 0% | Codes | | $27,870 | $8,500 | $3,500 + $200 for 25 pay periods | $5,600 | $11,300 |
| □ Hip Resurfacing | 0% | Codes | | $2,907 | $900 | $700 + $50 for 4 pay periods | $400 | $1,050 |
| □ Hysterectomy (Except in Cases of Cancer) | 0% | Codes | | $27,856 | $8,500 | $3,500 + $200 for 25 pay periods | $8,500 | $10,000 |
| □ Knee Surgery (Arthroscopic) | 0% | Codes | | $13,029 | $3,950 | $3,500 + $50 for 9 pay periods | $2,150 | $6,100 |
| □ Knee Surgery (Open)/ Knee Replacement | 0% | Codes | | $40,786 | $11,300 | $3,500 + 300 for 26 pay periods | $5,800 | $11,300 |
| □ Morton's Neuroma | 0% | Codes | | $898 | $300 | $300 + N/A | $100 | $300 |
| □ Myringotomy/Tympanostomy (Ear Tubes) | 0% | Codes | | $774 | $300 | $300 + N/A | $300 | $700 |
| □ Nissan Fundoplication (Reflux Surgery) | 0% | Codes | | $26,332 | $7,400 | $3,500 +$150 for 26 pay periods | $3,600 | $11,000 |
| □ Plantar Fasciitis Surgery | 0% | Codes | | $3,696 | $1,150 | $1,000 + $50 for 3 pay periods | $1,050 | $3,100 |
| □ Tonsillectomy/Adenoidectomy | 0% | Codes | | $17,262 | $4,800 | $3,500 + $50 for 26 pay periods | $2,450 | $7,250 |
| □ Tubal Ligation | 0% | Codes | | $7,176 | $2,200 | $2,000 + $50 for 4 pay periods | $1,100 | $3,250 |
| □ Upper Q Endoscopy | 0% | Codes | | $9,177 | $2,800 | $2,600 + $50 for 4 pay periods | $1,450 | $4,300 |
| □ Urinary Incontinence Treatment | 0% | Codes | | $12,649 | $3,800 | $3,500 + $50 for 6 pay periods | $2,300 | $6,800 |
| □ Varicose Vein Stripping | 0% | Codes | | $968 | $300 | $300 + N/A | $200 | $500 |
| □ Vasectomy | 0% | Codes | | $877 | $300 | $300 + N/A | $200 | $400 |

| Carpal Tunnel Release | 2701 |
|---|---|
| Anchor Procedures | |

| Anchor Codes | |
|---|---|
| Proc Code | Description |
| 64721 | Neuroplasty &/transpos Median Nrvcarpal Tunne |
| 29848 | Ndsc Wrst Surgwrls Transvrs Carpl Ligm |
| Total Anchor Cost | |

| Anesthesiology | |
|---|---|
| Proc Code | Description |
| 01810 | Anes Nerve Muscle Tdnfascia&bursaforearm Wrist |
| 370 | Anesthesia General |
| 01830 | Anes Arths/endscpystl Radiusulna/wrist/hand |
| All Other | |
| Total Anesthesiology Cost | |

| Facility | |
|---|---|
| Rev Code | Description |
| 360 | Or Services, General |
| 490 | Ambulat Orysurgery, General |
| 250 | Pharmacy, General |
| 710 | Recoveryroom, General |
| 370 | Anesthesia General |
| 272 | Med/surg Supply/device Sterile |
| 636 | Pharmacy, Detail Coding Drugs |
| 270 | Med/surg Supply/device General |
| 258 | Pharmacy, Iv Solutions |
| 271 | Med/surg Supply/device, Nonsterile |
| 300 | Lab, General |
| 301 | Lab, Chemistry |
| 278 | Med/surg Supply/device, Otherimplants |
| 259 | Pharmacy, Other |
| All Other | |
| Total Facility Cost | |

| Other Procedure Codes | |
|---|---|
| Proc Code | Description |
| 64718 | Neuroplasty&/transposition Ulnar Nerve Elbow |
| 26055 | Tendon Sheath Incision |
| 29848 | Nsdc Wrst Surgwrls Transvrs Carp Ligm |
| 64415 | Single Nerve Block Injection Arm Nerve |
| 88304 | Level Iii Surg Pathology Grossµsccopic Exam |
| 64721 | Neuroplasty &/transpos Medi An Nrvcarpal Tunne |
| 25447 | Arthrpinteropositercarpal/met Acarpal Joints |
| 25115 | Rad Exc Bursa Synva Wrst/f/arm Tdn Sht Hs Flxrs |
| 25609 | Optx Dstl Radl I-artic Fx/epi Physl Sep 3 Frag |
| 25000 | Incision Extension Tendon Sheath Wrist |
| 64417 | Injection Anesthetic Agent Axillary Nerve |
| 88305 | Level Iv Surg Pathology Gross µscopic Exam |
| 25111 | Excision Ganglion Wrist Dorsal/volar Primary |
| 20526 | I Njection Therapeutic Carpal Tunnel |
| 64450 | Injection Anes Other Peripheral Nerve/branch |
| 20605 | Arthrocentesis Aspir &/inj Interm Jt/bus W/ous |
| All Other | |
| Total Other Procedure Cost | |

| Total Anchor Cost | |
|---|---|

| Standard Frequency | Provider Group A Current | | | Change | Change To Current | |
|---|---|---|---|---|---|---|
| | Frequency | Allowed Amount | Expected Cost | | Allowed Amount | Expected Cost |
| 0.77 | 0.65 | 790.02 | 513.51 | 0% | 790.02 | 513.51 |
| 0.23 | 0.35 | 948.28 | 331.90 | 0% | 948.28 | 331.90 |
| | | | 845.41 | | | 845.41 |

| Standard Frequency | Provider Group A Current | | | Change | Change To Current | |
|---|---|---|---|---|---|---|
| | Frequency | Allowed Amount | Expected Cost | | Allowed Amount | Expected Cost |
| 1.21 | 1.27 | 990.00 | 1,256.82 | 0% | 990.00 | 1,256.82 |
| 0.23 | 0.24 | 932.81 | 222.48 | 0% | 932.81 | 222.48 |
| 0.05 | 0.06 | 990.00 | 55.91 | 0% | 990.00 | 55.91 |
| | | | 43.89 | | | 43.89 |
| | | | 1,579.11 | | | 1,579.11 |

| Standard Frequency | Provider Group A Current | | | Change | Change To Current | |
|---|---|---|---|---|---|---|
| | Frequency | Allowed Amount | Expected Cost | | Allowed Amount | Expected Cost |
| 0.42 | 0.44 | 3,406.93 | 1,502.46 | 0% | 3,406.93 | 1,502.46 |
| 0.36 | 0.38 | 1,382.94 | 522.75 | 0% | 1,382.94 | 522.75 |
| 0.22 | 0.24 | 34.16 | 8.04 | 0% | 34.16 | 8.04 |
| 0.20 | 0.21 | 933.86 | 198.06 | 0% | 933.86 | 198.06 |
| 0.20 | 0.21 | 932.81 | 192.53 | 0% | 932.81 | 192.53 |
| 0.17 | 0.18 | 129.74 | 23.25 | 0% | 129.74 | 23.25 |
| 0.16 | 0.17 | 36.85 | 6.18 | 0% | 36.85 | 6.18 |
| 0.10 | 0.10 | 67.70 | 6.80 | 0% | 67.70 | 6.80 |
| 0.08 | 0.09 | 68.31 | 5.87 | 0% | 68.31 | 5.87 |
| 0.03 | 0.03 | 58.41 | 1.79 | 0% | 58.41 | 1.79 |
| 0.02 | 0.03 | 43.33 | 1.14 | 0% | 43.33 | 1.14 |
| 0.02 | 0.03 | 70.81 | 1.79 | 0% | 70.81 | 1.79 |
| 0.02 | 0.02 | 911.07 | 19.87 | 0% | 911.07 | 19.87 |
| 0.02 | 0.02 | 14.04 | 0.26 | 0% | 14.04 | 0.26 |
| | | | 342.32 | | | 342.32 |
| | | | 2,833.12 | | | 2,833.12 |

| Standard Frequency | Provider Group A Current | | | Change | Change To Current | |
|---|---|---|---|---|---|---|
| | Frequency | Allowed Amount | Expected Cost | | Allowed Amount | Expected Cost |
| 0.19 | 0.20 | 1,096.85 | 218.82 | 0% | 1,096.85 | 218.82 |
| 0.12 | 0.13 | 572.33 | 72.11 | 0% | 572.33 | 72.11 |
| 0.05 | 0.05 | 948.28 | 48.26 | 0% | 948.28 | 48.26 |
| 0.03 | 0.03 | 120.15 | 3.61 | 0% | 120.15 | 3.61 |
| 0.02 | 0.03 | 74.93 | 1.97 | 0% | 74.93 | 1.97 |
| 0.17 | 0.18 | 90.02 | 139.58 | 0% | 790.02 | 139.58 |
| 0.06 | 0.06 | 1,535.46 | 96.73 | 0% | 1,535.46 | 96.73 |
| 0.02 | 0.02 | 1,406.27 | 23.56 | 0% | 1,406.27 | 23.56 |
| 0.13 | 0.14 | 1,943.07 | 265.23 | 0% | 1,943.07 | 265.23 |
| 0.01 | 0.01 | 620.77 | 9.22 | 0% | 620.77 | 9.22 |
| 0.01 | 0.01 | 129.84 | 1.81 | 0% | 129.84 | 1.81 |
| 0.01 | 0.01 | 125.32 | 1.66 | 0% | 125.32 | 1.66 |
| 0.01 | 0.01 | 591.70 | 7.67 | 0% | 591.70 | 7.67 |
| 0.01 | 0.01 | 107.23 | 1.29 | 0% | 107.23 | 1.29 |
| 0.01 | 0.01 | 83.98 | 0.98 | 0% | 83.98 | 0.98 |
| 0.01 | 0.01 | 69.12 | 0.72 | 0% | 69.12 | 0.72 |
| | | | 167.87 | | | 167.87 |
| | | | 1,061.09 | | | 1,061.09 |
| | | | 6,318.73 | | | 6,318.73 |

Pre-Anchor: All Procedures and Revenue Codes With Frequency > 1%

| Proc Code | Description | Standard Frequency | Provider Group A Current | | | Change to Current | | |
|---|---|---|---|---|---|---|---|---|
| | | | Frequency | Allowed Amount | Expected Cost | Change | Allowed Amount | Expected Cost |
| 99213 | Office outpatient visit 15 minutes | 0.15 | 0.16 | 93.02 | 14.61 | 0% | 93.02 | 14.61 |
| 97110 | Therapeutic px 1/> areas each 15 min exercises | 0.14 | 0.14 | 59.43 | 8.57 | 0% | 59.43 | 8.57 |
| 99214 | Office outpatient visit 25 minutes | 0.13 | 0.14 | 143.40 | 19.49 | 0% | 143.40 | 19.49 |
| 97140 | Manual therapy tqs 1/> regions each 15 minutes | 0.09 | 0.10 | 54.91 | 5.29 | 0% | 54.91 | 5.29 |
| 99203 | Office outpatient new 30 minutes | 0.06 | 0.06 | 140.17 | 8.99 | 0% | 140.17 | 8.99 |
| 97014 | Appl modality 1/> areas elec stim unattended | 0.06 | 0.06 | 29.07 | 1.73 | 0% | 29.07 | 1.73 |
| 97012 | Appl modality 1/> areas traction mechanical | 0.04 | 0.04 | 29.71 | 1.30 | 0% | 29.71 | 1.30 |
| 97243 | Office consultation new/estab patient 40 min | 0.04 | 0.04 | 174.41 | 6.39 | 0% | 174.41 | 6.39 |
| 97035 | Appl modality 1/> areas ultrasound ea 15 min | 0.04 | 0.04 | 23.25 | 0.85 | 0% | 23.25 | 0.85 |
| 97032 | Appl modality 1/> areas elec stim ea 15 min | 0.03 | 0.03 | 34.88 | 0.89 | 0% | 34.88 | 0.89 |
| 99212 | Office outpatient visit 10 minutes | 0.02 | 0.02 | 46.51 | 1.12 | 0% | 46.51 | 1.12 |
| 99204 | Office outpatient new 45 minutes | 0.02 | 0.02 | 237.07 | 5.10 | 0% | 237.07 | 5.10 |
| 97010 | Application modality 1/>areas hot/cold packs | 0.02 | 0.02 | 10.98 | 0.24 | 0% | 10.98 | 0.24 |
| 99215 | Office outpatient visit 40 minutes | 0.02 | 0.02 | 202.83 | 4.17 | 0% | 202.83 | 4.17 |
| 99244 | Office consultation new/estab patient 60 min | 0.02 | 0.02 | 280.35 | 5.49 | 0% | 280.35 | 5.49 |
| 97530 | Therapeut activity direct pt contact act each 15 min | 0.02 | 0.02 | 63.95 | 1.23 | 0% | 63.95 | 1.23 |
| All Other | | | | | 27.33 | | | 27.33 |
| Total Pre-Anchor Cost | | | | | 112.79 | | | 112.79 |

Post-anchor: procedures and revenue codes with frequency > 1%

| Proc Code | Description | Standard Frequency | Provider Group A Current | | | Change to Current | | |
|---|---|---|---|---|---|---|---|---|
| | | | Frequency | Allowed Amount | Expected Cost | Change | Allowed Amount | Expected Cost |
| 97110 | Therapeutic px 1/> areas each 15 min exercises | 0.43 | 0.45 | 59.43 | 26.52 | 0% | 59.43 | 26.52 |
| 97140 | Manual therapy tqs 1/> regions each 15 minutes | 0.28 | 0.29 | 54.91 | 16.00 | 0% | 54.91 | 16.00 |
| 97035 | Appl modality 1/> areas ultrasound ea 15 min | 0.12 | 0.13 | 23.25 | 2.95 | 0% | 23.25 | 2.95 |
| 99213 | Office outpatient visit 15 minutes | 0.08 | 0.08 | 93.02 | 7.85 | 0% | 93.02 | 7.85 |
| 97014 | Appl modality 1/> areas elec stim unattended | 0.08 | 0.08 | 29.07 | 2.41 | 0% | 29.07 | 2.41 |
| 97530 | Therapeut activity direct pt cont act each 15 min | 0.07 | 0.07 | 63.95 | 4.57 | 0% | 63.95 | 4.57 |
| 97022 | Application modality 1/> areas whirlpool | 0.07 | 0.07 | 43.28 | 2.85 | 0% | 43.28 | 2.85 |
| 97012 | Appl modality 1/> areas traction mechanical | 0.06 | 0.06 | 29.71 | 1.93 | 0% | 29.71 | 1.93 |
| 97112 | Ther px 1/> areas each 15 min neuromusc reeduca | 0.05 | 0.06 | 62.01 | 3.45 | 0% | 62.01 | 3.45 |
| 99214 | Office outpatient visit 25 minutes | 0.04 | 0.04 | 143.40 | 5.35 | 0% | 143.40 | 5.35 |
| 97032 | Appl modality 1/> areas elec stim ea 15 min | 0.03 | 0.04 | 34.88 | 1.22 | 0% | 34.88 | 1.22 |
| 97003 | Occupational therapy evaluation | 0.03 | 0.03 | - | - | 0% | - | - |
| 97001 | Physical therapy evaluation | 0.02 | 0.02 | - | - | 0% | - | - |
| 97010 | Application modality 1/> areas hot/cold packs | 0.02 | 0.02 | 10.98 | 0.27 | 0% | 10.98 | 0.27 |
| 97124 | Ther px 1/> areas each 15 minutes massage | 0.02 | 0.02 | 47.80 | 0.80 | 0% | 47.80 | 0.80 |
| All Other | | | | | 32.14 | | | 32.14 |
| Total Post-Anchor Cost | | | | | 108.30 | | 2740 | 108.30 |

| Total— | 6,539.82 |
|---|---|
| Utilization Factor | 1.05 |
| Fee Factor | 0.96 |

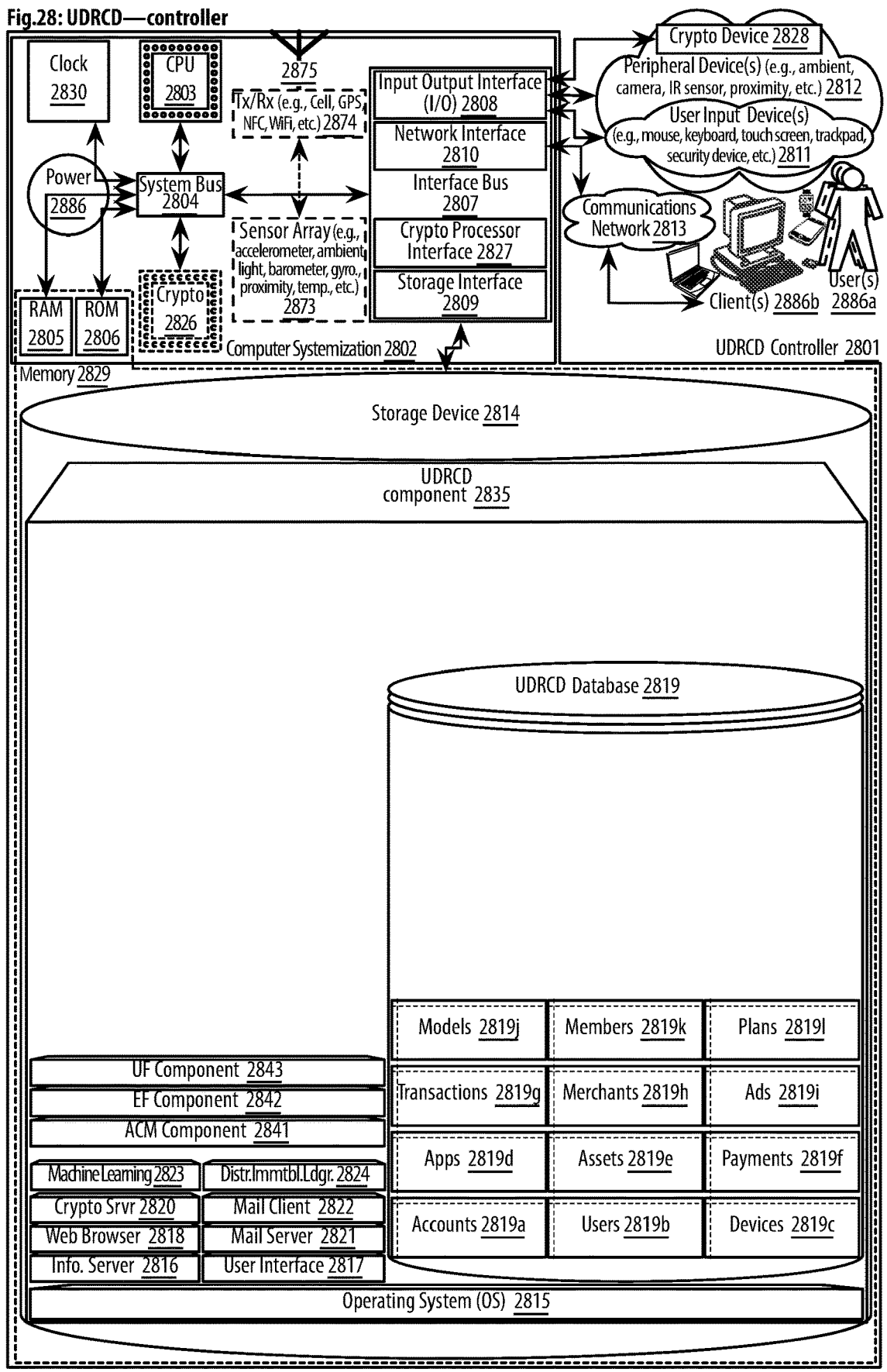
Fig.28: UDRCD—controller

US 11,663,670 B1

USE DETERMINATION RISK COVERAGE DATASTRUCTURE FOR ON-DEMAND AND INCREASED EFFICIENCY COVERAGE DETECTION AND REBALANCING APPARATUSES, METHODS AND SYSTEMS

PRIORITY CLAIM

Applicant hereby claims benefit to priority under 35 USC § 119 as a non-provisional conversion of: U.S. provisional patent application Ser. No. 62/446,810, filed Jan. 16, 2017, entitled "Use Determination Risk Coverage Datastructure for On-Demand and Increased Efficiency Coverage Detection and Rebalancing Apparatuses, Methods and Systems," U.S. provisional patent application Ser. No. 62/510,215, filed May 23, 2017, entitled "Use Determination Risk Coverage Datastructure for On-Demand and Increased Efficiency Coverage Detection and Rebalancing Apparatuses, Methods and Systems," US provisional patent application Ser. No. 62/524,188, filed Jun. 23, 2017, entitled "Use Determination Risk Coverage Datastructure for On-Demand and Increased Efficiency Coverage Detection and Rebalancing Apparatuses, Methods and Systems".

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

The entire contents of the aforementioned applications are herein expressly incorporated by reference.

FIELD

The present innovations generally address information technology analytics and processing for risk coverage, and more particularly, include Use Determination Risk Coverage Datastructure for On-Demand and Increased Efficiency Coverage Detection and Rebalancing Apparatuses, Methods and Systems.

However, in order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BACKGROUND

Insurance companies offer products such as home and life insurance to cover risks against property and injury. Actuaries at the insurance companies analyze various risks in setting the costs of such products. Computer software such as Milliman's Arius and Triangles on Demand products are used by insurance actuaries to assess various risks.

BRIEF DESCRIPTION OF THE DRAWINGS

Appendices and/or drawings illustrating various, non-limiting, example, innovative aspects of the Use Determination Risk Coverage Datastructure for On-Demand and Increased Efficiency Coverage Detection and Rebalancing Apparatuses, Methods and Systems (hereinafter "UDRCD") disclosure, include:

FIG. 8 shows a screenshot diagram illustrating embodiments of the UDRCD;
FIG. 9 shows a screenshot diagram illustrating embodiments of the UDRCD;
FIG. 10 shows a screenshot diagram illustrating embodiments of the UDRCD;
FIG. 18 shows a screenshot diagram illustrating embodiments of the UDRCD;
FIG. 19 shows a screenshot diagram illustrating embodiments of the UDRCD;
FIG. 21 shows a screenshot diagram illustrating embodiments of the UDRCD;
FIG. 23 shows a screenshot diagram illustrating embodiments of the UDRCD;
FIG. 24 shows a screenshot diagram illustrating embodiments of the UDRCD;
FIG. 25 shows a screenshot diagram illustrating embodiments of the UDRCD;
FIG. 26 shows a screenshot diagram illustrating embodiments of the UDRCD;
FIGS. 27, 27A-27B show a screenshot diagram illustrating embodiments of the UDRCD;
FIG. 28 shows a block diagram illustrating embodiments of a UDRCD controller.

Figure 1:
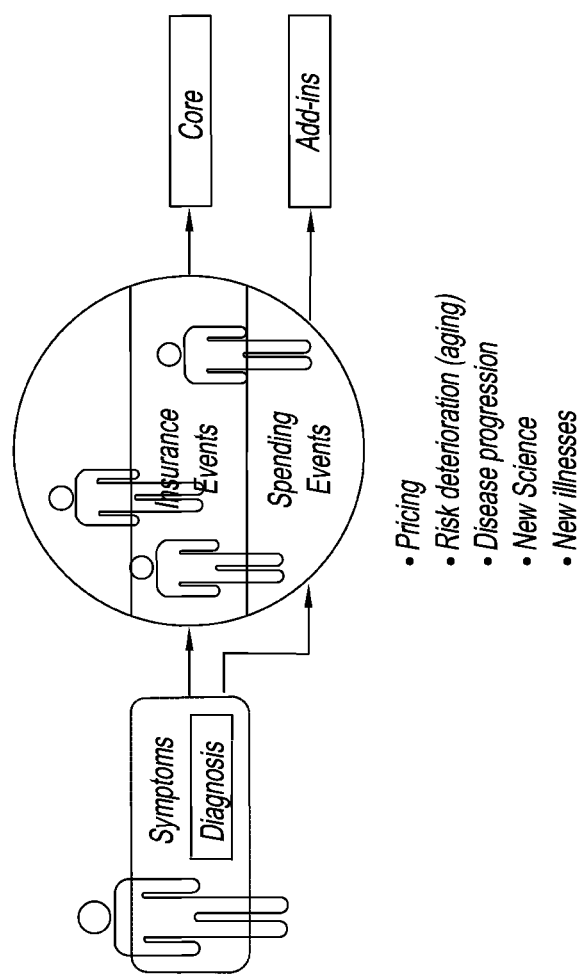
FIG. 1 shows an exemplary model for the UDRCD.

Generally, the leading number of each citation number within the drawings indicates a the figure in which that citation number is introduced and/or detailed. As such, a detailed discussion of citation number 101 would be found and/or introduced in FIG. 1. Citation number 201 is introduced in FIG. 2, etc. Any citation and/or reference numbers are not necessarily sequences but rather just example orders that may be rearranged and other orders are contemplated.

DETAILED DESCRIPTION

The Use Determination Risk Coverage Datastructure for On-Demand and Increased Efficiency Coverage Detection and Rebalancing Apparatuses, Methods and Systems (hereinafter "UDRCD") transforms coverage enrollment request, event signal inputs, via UDRCD components (e.g., ACM, EF, UF, etc. components), into coverage enrollment response, add-in recommendation outputs. The UDRCD components, in various embodiments, implement advantageous features as set forth below.

Introduction

In one embodiment, the UDRCD includes Condition-based coverage: Atomization of coverage that is on-demand and based on procedure or condition rather than annual and based on broad service categories. In one implementation, the UDRCD includes on-demand coverage atomization to reduce entry costs for members to gain coverage to truly insurable events (unpredictable, highest dollars claims); allows members to personalize coverage to their needs; presents treatment and/or provider pathway at the time of need providing relevant choices at relevant times. Underwriting is done today by volume in service categories. This is misaligned with individual disease progression and epidemiology. Underwriting on-demand coverage with atomization utilizes different data science tools and methodology. In one implementation, the UDRCD includes a novel combination of atomized design (also includes choice of provider), on demand coverage at time of need, and structure of the plan. In one implementation, on-demand insurance may include: atomization of plan coverage; attaching insurance coverage to the atomic components; ability to make continuous insurance decisions to make relevant choices at a relevant time, instead of once per year. In typical annual health insurance none of this atomization exists because coverage choices are made long before health care needs are known.

In another embodiment, the UDRCD includes condition-based coverage: identification of care and coverage need; offer for coverage to patient/member; payment for the coverage. In one implementation, the UDRCD includes processes to identify who should get coverage, what coverage they should get, how they should get it, how it should be priced, and how they should pay for it. In one implementation, the UDRCD includes an Early Listening System (ELS) that determines the event that has occurred and where to direct that event to determine coverage. The ELS is able to understand events from electronic health information (e.g., HL7) data such as encounter data and orders, health care Electronic Data Interchange (EDI) X12 transactions, consumer app and website actions such as search. In one implementation, the ELS informs a recommendation engine which presents condition-specific coverage information. In another implementation, the ELS and the recommendation engine may be implemented in a component and collectively referred to as ELS.

In another embodiment, the UDRCD's On Demand Customized Coverage is different than any other system in the U.S. marketplace at this time. UDRCD increases the processing around efficiency and resource use (e.g., providing best value) for members so that good health outcomes are achieved and inappropriate data processing around treatments is reduced and ultimately eliminated. Through efficiencies around the data processing components of the UDRCD, the system provides alternative approaches to reimbursement, and engages patients and providers, providing options never before available in healthcare.

In one implementation, benefit provisions are constructed to:
- Reduce costs of insurance premiums
- Offer a term of more than one year to allow for actuarial modeling precision as well as other benefits
- Encourage effective health behaviors
- Reduce economic barriers for chronic illness
- Provide economic protection for unplanned accident and illness
- Encourage patient-provider dialogue and shared decision-making
- Increase personal responsibility and risk for treatments:
    - of unproven or diminished benefit, and/or
    - where less invasive treatment options exist, and/or
    - where lower cost options of equal or greater quality are available UDRCD

UDRCD

FIG. 1 shows an exemplary model for the UDRCD. In FIG. 1, a model of on-demand health insurance (ODHI) is illustrated. ODHI deconstructs insurance into relevant conditional events; creating a better fit between insurable events versus spending events, and providing increased consumer choices around clinical value. As such, plan members may purchase just the insurance they need, just when they need it. This reduces waste in the healthcare system and lowers insurance premiums for consumers in the risk pool.

In one embodiment, the ODHI includes a core plan (e.g., for insurance events) that insures against the unpredictability of emergencies, trauma events, cancers, and/or the like, while also providing care for routine and preventive care services (e.g., at a significantly reduced cost).

In one embodiment, the ODHI includes add-ins (e.g., for spending events) that may be purchased on demand (e.g., for hip replacement, if such coverage is needed and when it is needed), specific to a provider (e.g., in a local area), paid for with a combination of post-tax copays and/or pre-tax payroll deductions, and/or the like. In some implementations, add-ins may have a specified duration (e.g., an add-in may provide coverage for 3 months).

In one embodiment, the UDRCD utilizes specialized data structures, and/or data science to understand and/or model each individual's state within a Markov process, to facilitate underwriting ODHI. In various implementations, ODHI pricing may be determined by taking into account risk deterioration (e.g., based on a multiyear insurance term), disease progression (e.g., based on underwriting the epidemiology of individual disease progression according to Markov properties), new science (e.g., recommended treatment methods), and/or the like.

Figure 2:
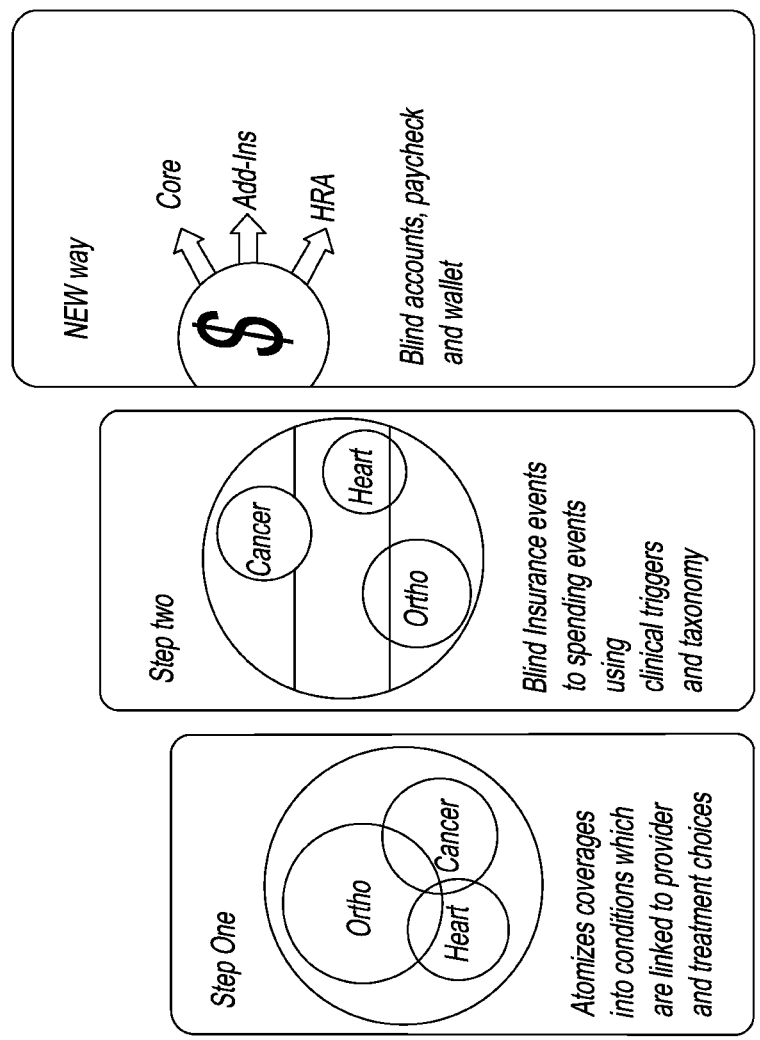
FIG. 2 shows an exemplary model for the UDRCD.

FIG. 2 shows an exemplary model for the UDRCD. In FIG. 2, a model for delivering ODHI is illustrated. In one embodiment, coverage is atomized into conditions which are linked to provider and/or treatment choices. In one implementation, coverage may be atomized for conditions (e.g., knee pain) rather than bucketed (e.g., for all inpatient services) for underwriting. Each condition may include provider choices (e.g., rehab center A, orthopedic group A, surgery center A, hospital A) and/or treatment (e.g., procedure) choices (e.g., up to 4 rehab visits, pain injection series, ACL repair) for which coverage may be purchased (e.g., priced individually for each choice) by plan members.

In one embodiment, insurance events (e.g., core coverage, which plan members share in equally) may be linked (e.g., based on clinical triggers and/or taxonomy) to spending events (e.g., add-ins coverage, which plan members may purchase as conditional needs arise by making provider and/or treatment choices). In one implementation, an insurance event (e.g., visiting a primary care provider several times for knee pain) may indicate a link to a spending event (e.g., knee replacement) that is likely to occur. Accordingly, a knee replacement coverage add-in may be offered to the plan member.

In one embodiment, ODHI may be delivered using a combination of a Health Reimbursement Account (HRA), a core plan, and add-ins. In one implementation, the HRA may be funded via payroll deductions and may be used by a plan member to pay for the core plan and/or for selected add-ins during the term (e.g., 3 years) of the ODHI plan. In one implementation, copays (e.g., for the atomized coverage) associated with the ODHI plan may be paid for using the plan member's other personal funds. In some implementations, copays may vary based on the purchased add-ins (e.g., purchasing an add-in may reduce copays for associated providers and/or treatments).

In one embodiment, the UDRCD utilizes specialized data structures and/or architectures to facilitate delivering ODHI.

Figure 3:
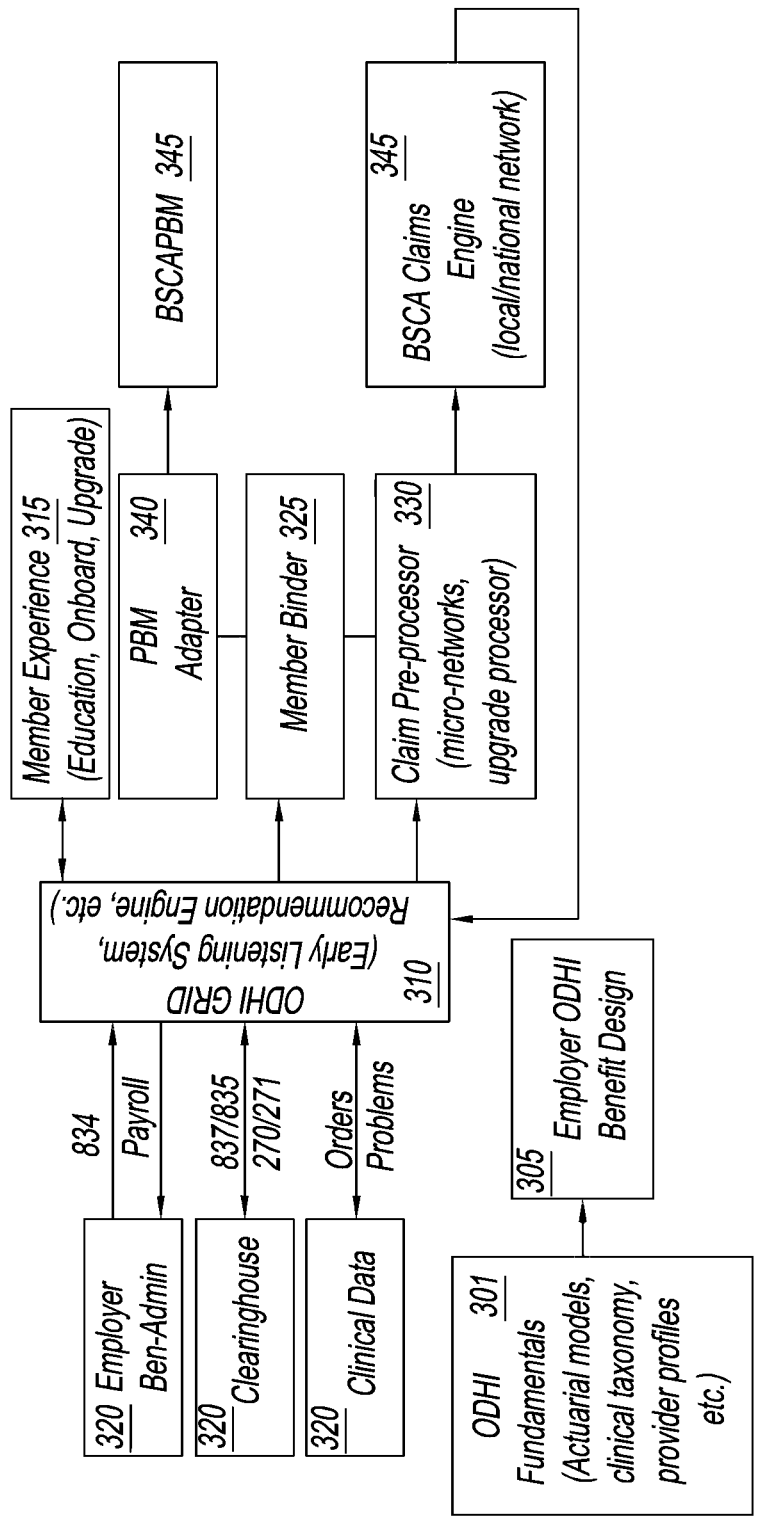
FIG. 3 shows an exemplary architecture for the UDRCD.

FIG. 3 shows an exemplary architecture for the UDRCD. In FIG. 3, ODHI fundamentals 301 may be utilized by an employer ODHI benefit design component 305 to facilitate designing an ODHI plan. In various implementation, an insurance plan sponsor (e.g., employer) may specify parameters, such as the degree of subsidization for core coverage and/or for add-ins coverage by the plan sponsor, the specification of which services are considered to be add-ins, whether payroll deductions are pre-tax or post tax, insurance plan term (e.g., 1 year, 3 years, 10 years), and/or the like, associated with the ODHI plan offered to employees.

An ODHI grid 310, which may include an Early Listening System (ELS), a recommendation engine, pricing engine, and/or the like, interconnects various UDRCD architecture components and/or third party systems to facilitate implementing delivery of the ODHI plan.

A member experience component 315 facilitates educating employees regarding ODHI, onboarding employees who sign up for the ODHI plan, upgrading a plan member's plan to include add-ins, and/or the like. An employer benefit administrator system 320 facilitates enrolling (e.g., via X12 834 formatted data files) employees into an ODHI plan and/or configuring associated employee payroll deductions. A member binder 325 facilitates keeping track of ODHI plan members.

A claim pre-processor 330 facilitates connecting to systems of health plan networks, such as to a Blue Shield of California (BSCA) claims engine 335. A pharmacy benefit manager (PBM) adapter 340 facilitates connecting to systems of third-party administrators of prescription drug programs, such as to a BSCA PBM 345.

A clearinghouse system 350 facilitates determining eligibility (e.g., via X12 270 formatted eligibility request files and/or X12 271 formatted eligibility response files), obtaining healthcare claims (e.g., via X12 837 formatted data files), providing claim payments (e.g., via X12 835 formatted data files), and/or the like.

Clinical data 355 (e.g., orders, problems) may be utilized by the ELS to facilitate determining add-ins that should be offered to plan members (e.g., based on spending events that are likely to occur).

Figure 4:
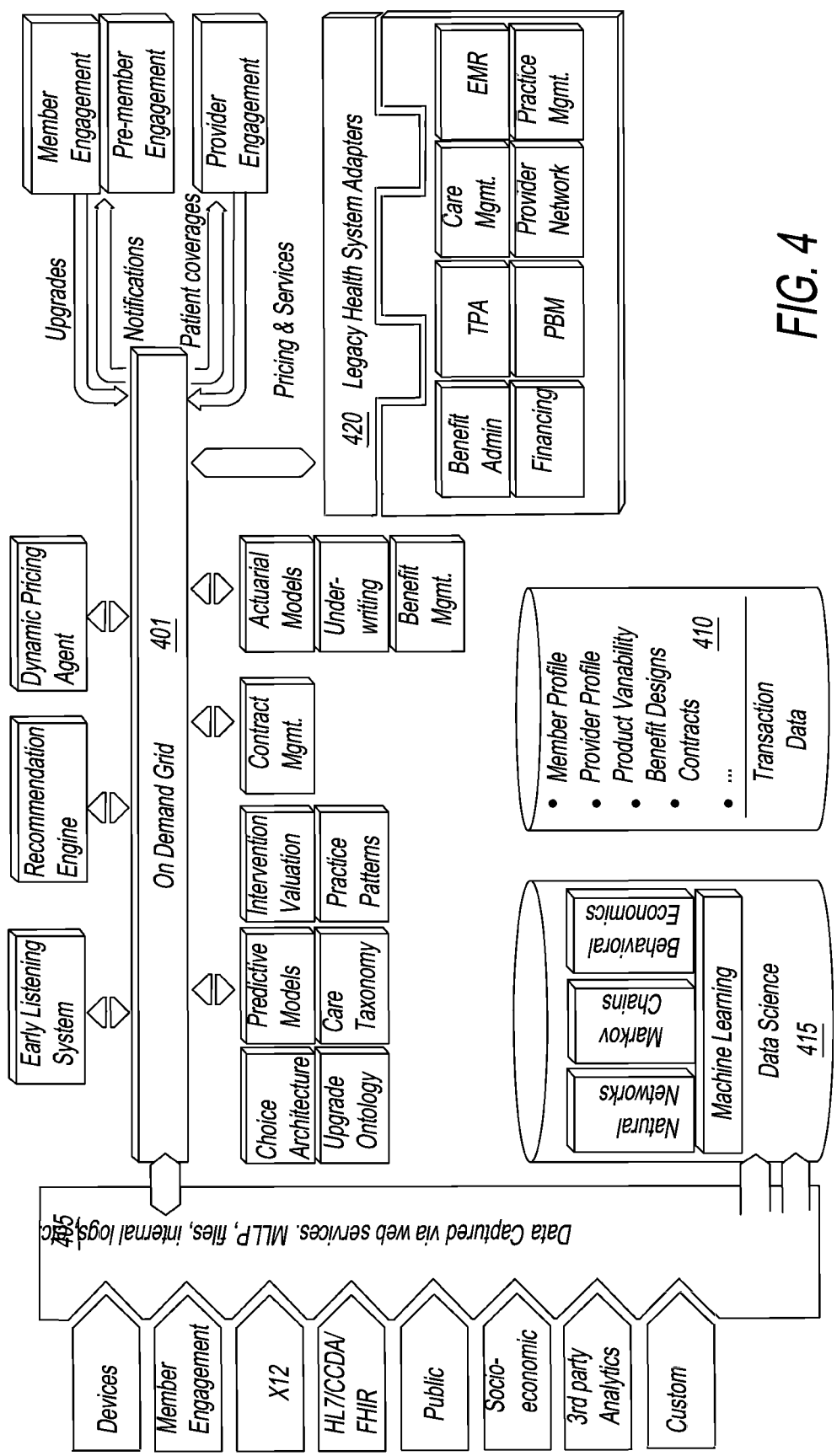
FIG. 4 shows an exemplary architecture for the UDRCD.

FIG. 4 shows an exemplary architecture for the UDRCD. In FIG. 4, the UDRCD may facilitate implementing delivery of an ODHI plan via an ODHI grid 401. In one embodiment, the ODHI grid may include a variety of architecture components. In one implementation, the ODHI grid may include a pre-member engagement component that facilitates member enrollment. In another implementation, the ODHI grid may include a member engagement component that facilitates notifying a plan member regarding add-ins that may be useful to the plan member, and/or that facilitates upgrading the plan member's plan to include add-ins selected by the plan member. In another implementation, the ODHI grid may include an early listening system (ELS) and/or a recommendation engine that facilitate determining which add-ins may be useful to the plan member. In another implementation, the ODHI grid may include a dynamic pricing agent that facilitates determining pricing for core coverage and/or for add-ins coverage. See FIGS. 25-27 for additional details regarding the dynamic pricing agent. In another implementation, the ODHI grid may include an actuarial models component (e.g., to facilitate determining pricing), an underwriting component, a benefit management component (e.g., to facilitate keeping track of members' plan benefits), a and/or the like that facilitate implementing the ODHI plan. In another implementation, the ODHI grid may include a contract management component that facilitates keeping track of contracts with providers, plan sponsors, plan members, and/or the like. In another implementation, the ODHI grid may include a provider engagement component that facilitates informing providers regarding plan members' coverage, and/or facilitates claims processing (e.g., based on services provided by providers and providers' pricing). The ODHI grid may utilize a variety of captured data 405. For example, such data may be captured via web services, Minimal Lower Layer protocol (MLLP), files, messages, internal logs, and/or the like. In various implementations, such data may include devices data, member engagement data, X12 data, HL7/CCDA/FHIR data, public data, socio-economic data, third party analytics data, custom data, and/or the like. The ODHI grid may utilize a variety of transaction data 410 (e.g., stored in a transaction data database). In various implementations, transaction data may include member profiles data, provider profiles data, product variability data, benefit designs data, contracts data, and/or the like. The captured data and/or the transaction data may be utilized by a data science component 415 to implement machine learning processes (e.g., using neural networks, Markov chains, behavioral economics), by the ELS and/or recommendation engine to facilitate determining which add-ins may be useful to the plan member, and/or the like. In another implementation, the ODHI grid may include a choice architecture component, a predictive models component, an intervention valuation component, an upgrade ontology component, a care taxonomy component, a practice patterns component, and/or the like that facilitate implementing the ODHI plan and that are based on the captured data and/or the transaction data and/or the machine learning processes. In another implementation, the ODHI grid may include a legacy health system adapters component 420 to facilitate interfacing the ODHI grid with legacy health systems.

Figure 5:
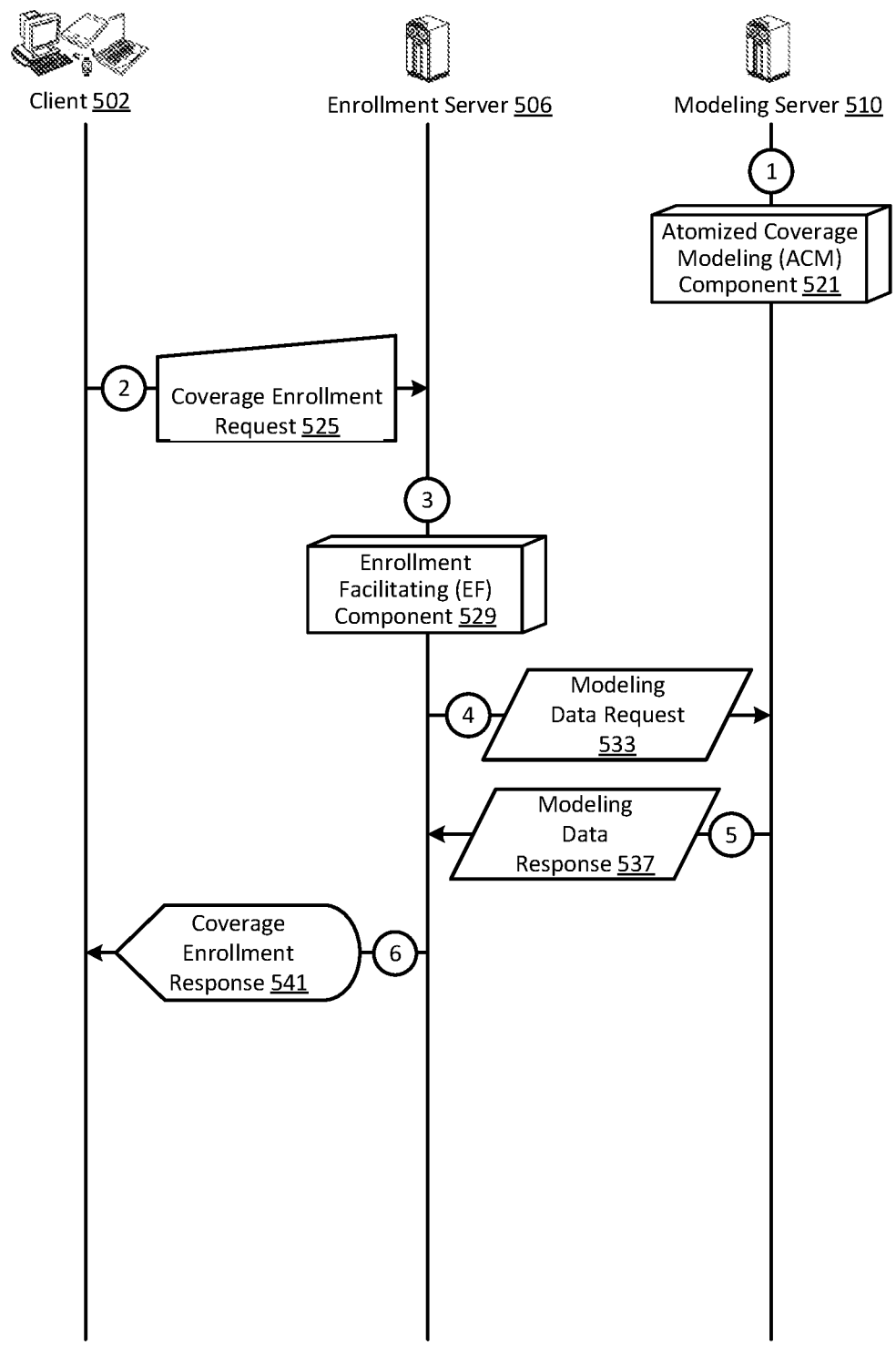
FIG. 5 shows a datagraph diagram illustrating embodiments of a data flow for the UDRCD.

FIG. 5 shows a datagraph diagram illustrating embodiments of a data flow for the UDRCD. In FIG. 5, a modeling server 510 may utilize an atomized coverage modeling (ACM) component 521 to facilitate generate modeling data (e.g., atomized conditions data, atomized procedures data, core coverage data, add-ins coverage data). See FIG. 6 for additional details regarding the ACM component.

A client 502 may send a coverage enrollment request 525 to an enrollment server 506 to facilitate coverage enrollment (e.g., into an ODHI plan) for a user. For example, the client may be a desktop, a laptop, a tablet, a smartphone, and/or the like that is executing a client application. In one implementation, the coverage enrollment request may include data such as a request identifier, user account details, coverage details, and/or the like. In one embodiment, the client may provide the following example coverage enrollment request, substantially in the form of a (Secure) Hypertext Transfer Protocol ("HTTP(S)") POST message including eXtensible Markup Language ("XML") formatted data, as provided below:

```
POST /authrequest.php HTTP/1.1
Host: www.server.com
Content-Type: Application/XML
Content-Length: 667
<?XML version = "1.0" encoding = "UTF-8"?>
<auth_request>
    <timestamp>2020-12-31 23:59:59</timestamp>
    <user_accounts_details>
        <user_account_credentials>
            <user_name>ID_user_1</user_name>
            <password>abc123</password>
            //OPTIONAL <cookie>cookieID</cookie>
            //OPTIONAL     <digital_cert_link>www.mydigitalcertificate.com/
JohnDoeDaDoeDoe@gmail.com/mycertifcate.dc</digital_cert_link>
            //OPTIONAL <digital_certificate>_DATA_</digital_certificate>
        </user_account_credentials>
    </user_accounts_details>
    <client_details> //iOS Client with App and Webkit
        //it should be noted that although several client details
        //sections are provided to show example variants of client
        //sources, further messages will include only on to save
        //space
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6,1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>app with webkit</client_app_type>
        <app_installed_flag>true</app_installed_flag>
        <app_name>UDRCD.app</app_name>
        <app_version>1.0 </app_version>
        <app_webkit_name>Mobile Safari</client_webkit_name>
        <client_version>537.51.2</client_version>
    </client_details>
    <client_details> //iOS Client with Webbrowser
        <client_IP>10.0.0.123</client_IP>
        <user_agent_string>Mozilla/5.0 (iPhone; CPU iPhone OS 7_1_1 like Mac OS X)
AppleWebKit/537.51.2 (KHTML, like Gecko) Version/7.0 Mobile/11D201
Safari/9537.53</user_agent_string>
        <client_product_type>iPhone6, 1</client_product_type>
        <client_serial_number>DNXXX1X1XXXX</client_serial_number>
        <client_UDID>3XXXXXXXXXXXXXXXXXXXXXXXXD</client_UDID>
        <client_OS>iOS</client_OS>
        <client_OS_version>7.1.1</client_OS_version>
        <client_app_type>web browser</client_app_type>
        <client_name>Mobile Safari</client_name>
        <client_version>9537.53</client_version>
    </client details>
    <client_details> //Android Client with Webbrowser
        <client_IP>10.0.0.123</client_IP>
        <user_agent_string>Mozilla/5.0 (Linux; U; Android 4.0.4; en-us; Nexus S
Build/IMM76D) AppleWebKit/534.30 (KHTML, like Gecko) Version/4.0 Mobile
Safari/534.30</user_agent_string>
        <client_product_type>Nexus S</client_product_type>
        <client_serial_number>YXXXXXXXXZ</client_serial_number>
        <client_UDID>FXXXXXXXXX-XXXX-XXXX-XXXX-XXXXXXXXXXXXX</ client_UDID>
        <client_OS>Android</client_OS>
        <client_OS_version>4.0.4</client_OS_version>
        <client_app_type>web browser</client_app_type>
        <client_name>Mobile Safari</client_name>
        <client_version>534.30</client_version>
    </client_details>
    <client_details> //Mac Desktop with Webbrowser
        <client_IP>10.0.0.123</client_IP>
        <user_agent_string>Mozilla/5.0 (Macintosh; Intel Mac OS X 10_9_3)
AppleWebKit/537.75.14(KHTML, like Gecko)Version/7.0.3
Safari/537.75.14</user_agent_string>
        <client_product_type>MacPro5, 1</client_product_type>
```

```
        <client_serial_number>YXXXXXXXXZ</client_serial_number>
        <client_UDID>FXXXXXXXXX-XXXX-XXXX-XXXX-XXXXXXXXXXXX</client_UDID>
        <client_OS>Mac OS X</client_OS>
        <client_OS_version>10.9.3</client_OS_version>
        <client_app_type>web browser</client_app_type>
        <client_name>Mobile Safari</client_name>
        <client_version>537.75.14</client_version>
    </client_details>
    <coverage_enrollment_request>
        <request_identifier>ID_request_1</request_identifier>
        <coverage_details>
            <plan_sponsor>ID_employer_1</plan_sponsor>
            <plan_selected>ID_ODHI_plan_1</plan_selected>
            <plan_term>3 years</plan_term>
            <coverage_type>individual</coverage_type>
            <provider_networks_selected>
                HealthEast, Fairview, HealthPartners
            </provider_networks_selected>
            <copays_selected>
                <emergency_room>$300</emergency_room>
  <hospitalization_unplanned>$2,500</hospitalization_unplanned>
                <medication_brand>$30</medication_brand>
                <medication_generic>$20</medication_generic>
                ...
            </copays_selected>
            <conditions_selected>
                <add_in>ID_condition_asthma</add_in>
            </conditions_selected>
            <procedures_selected>
                <add_in>
                    <type>ID_procedure_acupuncture</type>
                    <provider>ID_provider_1</provider>
                </add_in>
            </procedures_selected>
        </coverage_details>
    </coverage_enrollment_request>
</auth_request>
```

An enrollment facilitating (EF) component 529 may utilize data provided in the coverage enrollment request to facilitate coverage enrollment for the user. See FIG. 7 for additional details regarding the EF component.

The enrollment server may send a modeling data request 533 to the modeling server to obtain relevant modeling data. In one implementation, the modeling data request may include data such as a request identifier, coverage details, and/or the like. In one embodiment, the enrollment server may provide the following example modeling data request, substantially in the form of a HTTP(S) POST message including XML-formatted data, as provided below:

```
POST/modeling_data_request.php HTTP/1.1
Host: www.server.com
Content-Type: Application/XML
Content-Length: 667
<?XML version="1.0" encoding="UTF-8"?>
<modeling_data_request>
<request_identifier>ID_request_2</request_identifier>
<coverage_details>
    <plan_selected>ID_ODHI_plan_1</plan_selected>
    <plan_term>3 years</plan_term>
    <coverage_type>individual</coverage_type>
    <provider_networks_selected>
        HealthEast, Fairview, HealthPartners
    </provider_networks_selected>
    <copays_selected>
        <emergency_room>$300</emergency_room>
        <hospitalization_unplanned>$2,500</hospitalization_unplanned>
        <medication_brand>$30</medication_brand>
        <medication_generic>$20</medication_generic>
        ...
    </copays_selected>
    <conditions_selected>
        <add_in>ID_condition_asthma</add_in>
    </conditions_selected>
    <procedures_selected>
        <add_in>
            <type>ID_procedure_acupuncture</type>
            <provider>ID_provider_1</provider>
        </add_in>
    </procedures_selected>
</coverage_details>
</modeling_data_request>
```

The modeling server may send a modeling data response 537 to the enrollment server to provide the requested modeling data. In one implementation, the modeling data response may include data such as a response identifier, core insurance costs, add-ins insurance costs, and/or the like. In one embodiment, the modeling server may provide the following example modeling data response, substantially in the form of a HTTP(S) POST message including XML-formatted data, as provided below:

```
POST /modeling_data_response.php HTTP/1.1
Host: www.server.com
Content-Type: Application/XML
Content-Length: 667
<?XML version = "1.0" encoding = "UTF-8"?>
<modeling_data_response>
    <response_identifier>ID_response_2</response_identifier>
    <modeling_data>
        <core_cost>$45,292 for 3 years</core_cost>
        <add_ins_costs>
            <add_in>
```

```xml
            <type>ID_condition_asthma</type>
            <cost>$100 per month</cost>
          </add_in>
          <add_in>
            <type>ID_procedure_acupuncture</type>
            <cost>$500 for up to 4 sessions</cost>
          </add_in>
        </add_ins_costs>
      </modeling_data>
    </modeling_data_response>
```

The enrollment server may send a coverage enrollment response 541 to the client to inform the user (e.g., via a website, application (e.g., a mobile app), and/or the like) that the coverage enrollment request has been processed. In one implementation, the coverage enrollment response may include data such as a response identifier, a status, and/or the like. In one embodiment, the enrollment server may provide the following example coverage enrollment response, substantially in the form of a HTTP(S) POST message including XML-formatted data, as provided below:

```
POST/coverage_enrollment_response.php HTTP/1.1
Host: www.server.com
Content-Type: Application/XML
Content-Length: 667
<?XML version="1.0" encoding="UTF-8"?>
<coverage_enrollment_response>
  <response_identifier>ID_response_1</response_identifier>
  <status>User Enrolled Successfully</status>
</coverage_enrollment_response>
```

Figure 6:
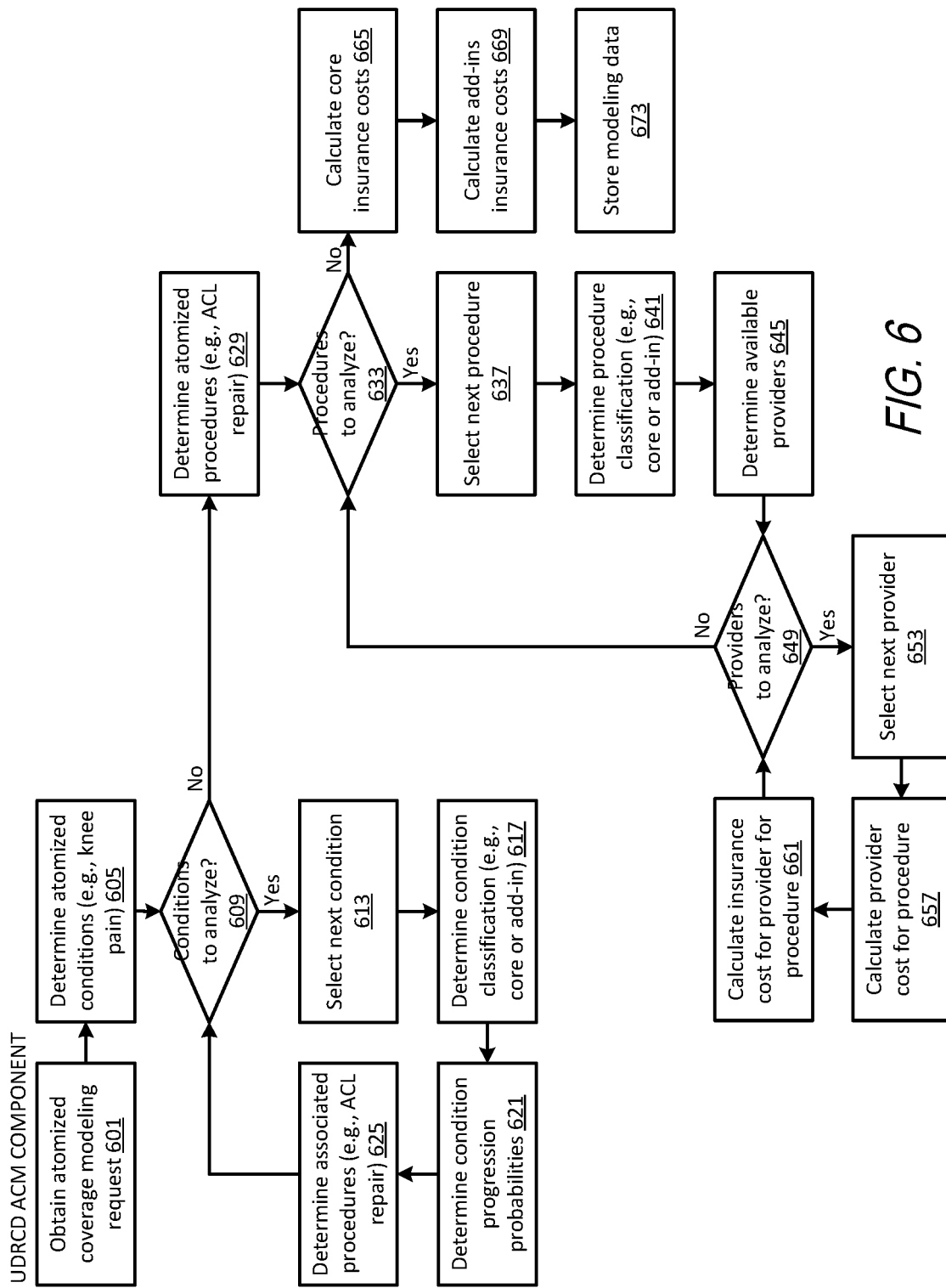
FIG. 6 shows a logic flow diagram illustrating embodiments of an atomized coverage modeling (ACM) component for the UDRCD.

FIG. 6 shows a logic flow diagram illustrating embodiments of an atomized coverage modeling (ACM) component for the UDRCD. In FIG. 6, an atomized coverage modeling request may be received at 601 to generate modeling data. For example, a modeling server may be configured to generate modeling data periodically (e.g., monthly, annually). In another example, a modeling server may be configured to generate modeling data on demand. In one implementation, modeling data may be generated for general UDRCD use. In another implementation, modeling data may be generated for a specified plan sponsor, ODHI plan, locality, provider network, plan term, plan member type (e.g., individual, family, member demographic), and/or the like.

Atomized conditions (e.g., knee pain) may be determined at 605. In one implementation, captured data (e.g., International Classification of Diseases (ICD)) may be utilized to determine a care taxonomy that specifies atomized conditions. In another implementation, machine learning processes may be utilized to analyze captured data (e.g., X12 data, HL7 data) to determine a care taxonomy that specifies atomized conditions.

A determination may be made at 609 whether there remain conditions to analyze. In one implementation, any atomized condition may be analyzed. If there remain conditions to analyze, the next atomized condition may be selected for analysis at 613.

Condition classification of the selected atomized condition may be determined at 617. For example, the selected atomized condition may be classified as being part of a core plan or as being an add-in. In one implementation, this determination may be made based on a general UDRCD setting. In another implementation, this determination may be made based on a setting associated with the plan sponsor, with the ODHI plan, with the locality, with the provider network, with the plan term, with the plan member type, and/or the like. For example, the condition classification may be determined via a MySQL database command similar to the following:

SELECT ConditionClassification
FROM Models
WHERE ConditionID=ID_condition_knee_pain;

Disease progression probabilities associated with the selected atomized condition may be determined at 621. In one implementation, machine learning processes may be utilized to determine probabilities associated with various ways (branches) in which a disease may progress. For example, Markov chains may be utilized.

Atomized procedures associated with the atomized condition may be determined at 625. In one embodiment, practice patterns data (e.g., as provided by the practice patterns component) may be utilized to determine procedures available to treat the condition. In one implementation, associated procedures may be determined for the various determined disease progression branches. For example, a set of procedures may be determined for each branch. In another implementation, associated procedures may be determined for the atomized condition. For example, a set of procedures utilized to treat the condition may be determined.

Atomized procedures (e.g., ACL repair) may be determined at 629. In one implementation, captured data (e.g., Current Procedural Terminology (CPT)) may be utilized to determine a care taxonomy that specifies atomized procedures. In another implementation, machine learning processes may be utilized to analyze captured data (e.g., X12 data, HL7 data) to determine a care taxonomy that specifies atomized procedures.

A determination may be made at 633 whether there remain procedures to analyze. In one implementation, any atomized procedure may be analyzed. If there remain procedures to analyze, the next atomized procedure may be selected for analysis at 637.

Procedure classification of the selected atomized procedure may be determined at 641. For example, the selected atomized procedure may be classified as being part of a core plan or as being an add-in. In one implementation, this determination may be made based on a general UDRCD setting. In another implementation, this determination may be made based on a setting associated with the plan sponsor, with the ODHI plan, with the locality, with the provider network, with the plan term, with the plan member type, and/or the like. For a example, the procedure classification may be determined via a MySQL database command similar to the following:

SELECT ProcedureClassification
FROM Models
WHERE PlanID=ID_ODHI_plan_1 AND ProcedureID=ID_procedure_ACL_repair;

Available providers for the selected atomized procedure (e.g., providers that may perform the procedure) may be determined at 645. In one implementation, this determination may be made based on available UDRCD providers (e.g., providers that have a contract with the UDRCD and that perform the procedure). In another implementation, this determination may be made based on available UDRCD providers that are associated with the plan sponsor, with the ODHI plan, with the locality, with the provider network, with the plan term, with the plan member type, and/or the like. In some embodiments, available provider networks may be determined instead of individual providers.

A determination may be made at 649 whether there remain providers to analyze. In one implementation, any available provider or provider network may be analyzed. If there remain providers to analyze, the next available provider or provider network may be selected for analysis at 653.

The selected provider's or provider network's cost for the selected atomized procedure may be calculated at 657. In one implementation, practice patterns data (e.g., as provided by the practice patterns component) may be utilized to calculate the expected (e.g., average) cost that the provider or provider network charges for performing the selected atomized procedure. For example, claims submitted by the provider or provider network for the procedure over the last 3 years may be analyzed to calculate the average cost.

Insurance cost (e.g., to insure an individual plan member, to insure a family) associated with the selected atomized procedure for the selected provider or provider network may be calculated at 661. In one implementation, the selected provider's or provider network's cost for the selected atomized procedure, actuarial models (e.g., as provided by the actuarial models component), the plan term (e.g., 3 years), machine learning processes, and/or the like may be utilized to calculate the insurance cost.

Core insurance costs (e.g., for general UDRCD use; associated with the specified plan sponsor, ODHI plan, locality, provider network, plan term, plan member type) may be calculated at 665. In one implementation, insurance costs for each atomized procedure classified as core may be calculated. For example, insurance cost for an atomized procedure may be calculated based on a weighted average (e.g., weighted by provider utilization) of insurance costs associated with the available providers. Insurance costs for each atomized condition classified as core may be calculated. For example, insurance cost for an atomized condition may be calculated based on the sum of the insurance costs for the set of procedures utilized to treat the condition. In another example, insurance cost for an atomized condition may be calculated based on a weighted average (e.g., weighted by probabilities associated with each disease progression branch) of insurance costs for each branch. Insurance costs for a core plan may be calculated (e.g., to insure an individual plan member, to insure a family). For example, the insurance cost for the core plan may be calculated based on the sum of the calculated insurance costs for core procedures and core conditions.

Add-ins insurance costs (e.g., for general UDRCD use; associated with the specified plan sponsor, ODHI plan, locality, provider network, plan term, plan member type) may be calculated (e.g., to insure an individual plan member, to insure a family) at 669. In one implementation, insurance costs for each atomized procedure classified as add-in may be calculated and insurance costs for each atomized condition classified as add-in may be calculated.

Modeling data may be stored at 673. For example, the modeling data (e.g., for general UDRCD use; associated with the specified plan sponsor, ODHI plan, locality, provider network, plan term, plan member type) may be stored (e.g., via one or more SQL statements) in a models database 2819j. In various implementations, modeling data may include atomized conditions data (e.g., atomized conditions, condition classification, condition progression probabilities, associated procedures), atomized procedures data (e.g., atomized procedures, procedure classification, available providers, providers costs, insurance costs for providers), core insurance coverage data (e.g., the set of atomized conditions and atomized procedures included in core insurance), core insurance costs, add-ins insurance coverage data (e.g., the set of atomized conditions and atomized procedures included in add-ins insurance), add-ins insurance costs, and/or the like.

Figure 7:
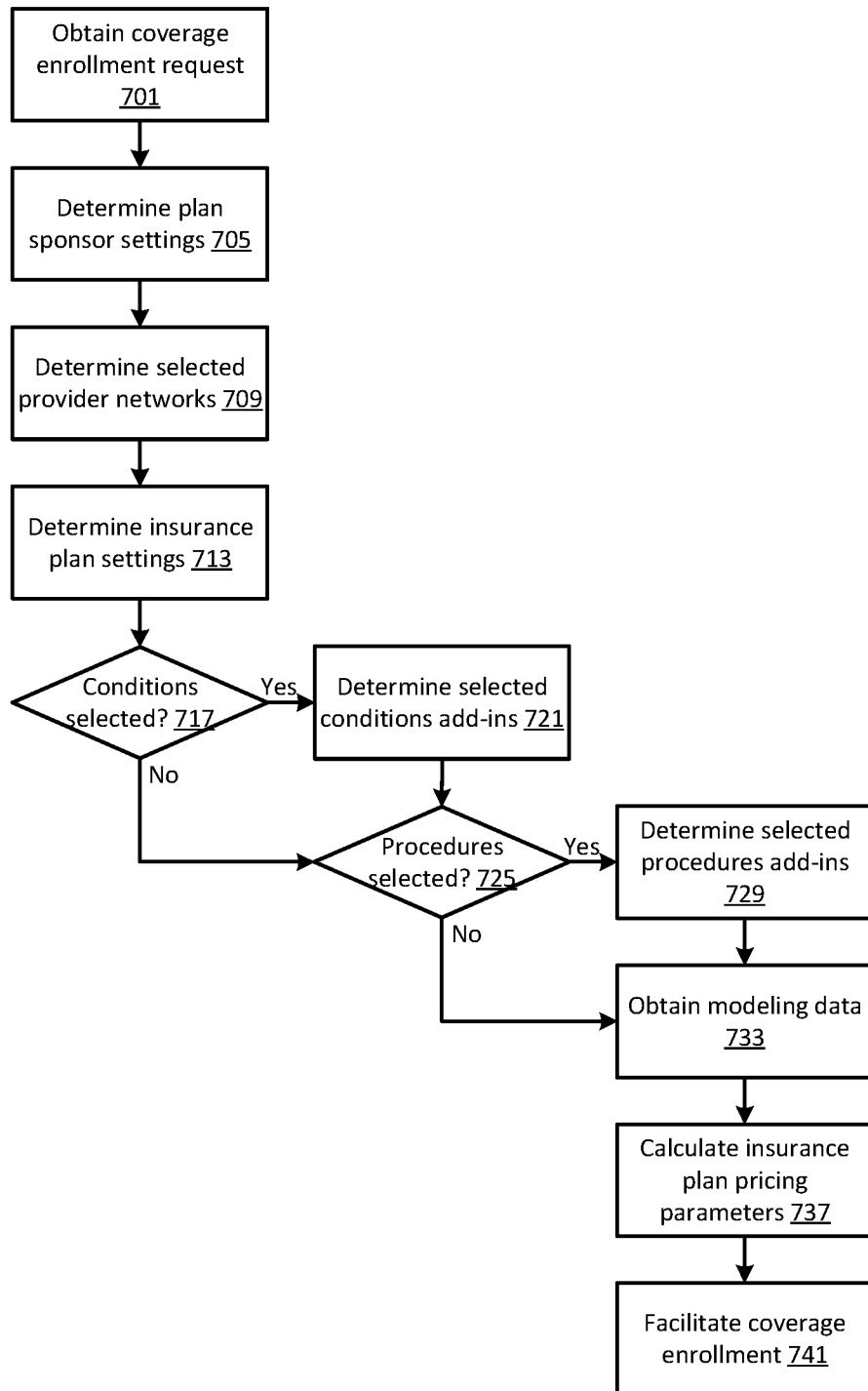
FIG. 7 shows a logic flow diagram illustrating embodiments of an enrollment facilitating (EF) component for the UDRCD.

FIG. 7 shows a logic flow diagram illustrating embodiments of an enrollment facilitating (EF) component for the UDRCD. In FIG. 7, a coverage enrollment request may be obtained at 701. For example, the coverage enrollment request may be obtained as a result of a user requesting to enroll into an ODHI plan.

Plan sponsor settings associated with the enrollment request may be determined at 705. For example, a plan sponsor may be an employer of the user. In one embodiment, the plan sponsor may subsidize (e.g., in whole or in part) core insurance costs and/or add-ins insurance costs for the user. In various implementations, the plan sponsor settings may include available insurance plans, available plan terms, available coverage types, available provider networks, condition classification settings specified by the plan sponsor, procedure classification settings specified by the plan sponsor, data regarding subsidies offered by the plan sponsor (e.g., for the core insurance costs, for the add-ins insurance costs), HRA settings (e.g., data regarding the plan sponsor's contribution to the HRA), and/or the like. For example, the plan sponsor settings may be retrieved (e.g., as provided by the employer ODHI benefit design component) via one or more SQL statements. In one implementation, the plan sponsor settings may be utilized to configure available options for an enrollment user interface that may be utilized by the user (e.g., via a mobile app, via a website) to configure the user's ODHI plan by selecting from the available options. In another implementation, the plan sponsor settings may be utilized to facilitate calculating insurance plan pricing parameters for the user's ODHI plan.

Provider networks selected by the user may be determined at 709. In one implementation, the coverage enrollment request may be parsed (e.g., using PHP commands) to determine the user selected (e.g., via the enrollment user interface) provider networks. For example, the user may select provider networks that include providers that the user is likely to use (e.g., based on geographic proximity of such providers to the user's location). In another example, the user may select provider networks that fit the user's budget (e.g., insurance costs associated with different provider networks may differ).

Insurance plan settings selected by the user may be determined at 713. In one implementation, the coverage enrollment request may be parsed (e.g., using PHP commands) to determine the user selected (e.g., via the enrollment user interface) insurance plan settings. For example, the user may select from available plans (e.g., having different configurations), plan terms (e.g., 1 year, 3 years, 10 years), coverage types (e.g., individual, family), and/or the like. In another example, the user may set copay amounts for various individual services (e.g., emergency room, unplanned hospitalization, brand medication, generic medication).

A determination may be made at 717 whether the user selected any atomized conditions. If so, the selected conditions add-ins (e.g., asthma) may be determined at 721. In one implementation, the coverage enrollment request may be parsed (e.g., using PHP commands) to determine the user selected (e.g., via the enrollment user interface) conditions add-ins.

A determination may be made at 725 whether the user selected any atomized procedures. If so, the selected procedures add-ins (e.g., acupuncture) may be determined at 729. In one implementation, the coverage enrollment request may be parsed (e.g., using PHP commands) to determine the user selected (e.g., via the enrollment user interface) procedures add-ins.

Modeling data associated with the coverage enrollment request may be obtained at 733. In one implementation, the modeling data may be obtained by sending a modeling data request to a modeling server (e.g., based on the plan sponsor settings and/or the user selected options). In another implementation, the modeling data may be cached (e.g., by an enrollment server, by a client) to facilitate generating the enrollment user interface (e.g., to show the user how insurance plan pricing parameters change based on the user's selections).

Insurance plan pricing parameters may be calculated at 737. For example, insurance plan pricing parameters may include pay period deduction for the user to pay for the user's ODHI plan, available HRA balance remaining (e.g., to pay for additional conditions and/or procedures in the future), how a change (e.g., the last insurance plan configuration change made by the user via the enrollment user interface) affects pay period deduction and/or available HRA balance remaining, and/or the like. In one implementation, core insurance cost and/or add-ins insurance costs associated with the user's ODHI plan may be utilized to determine an overall insurance cost for the user's ODHI plan. For example, the overall insurance cost (e.g., $49,392 for 3 years) for the user's ODHI plan may be calculated based on the sum of the core insurance cost (e.g., $45,292 core cost) and add-ins insurance costs (e.g., $3,600 for 3 years (at $100 per month) for Asthma condition add-in and $500 for up to four sessions of acupuncture procedure add-in) associated with the user's ODHI plan. Plan sponsor settings (e.g., data regarding subsidies offered by the plan sponsor (e.g., for the core insurance costs, for the add-ins insurance costs), HRA settings) may be utilized to calculate pay period deduction for the user, available HRA balance remaining, effects of a change, and/or the like. For example, if the plan sponsor subsidizes 50% of the cost of the user's ODHI plan and the user gets paid two times per month, then the user's pay period deduction (e.g., $343) may be calculated as follows:

$49,392 overall cost for three years*50% user responsibility=$24,696 user cost for three years $24,696 user cost for three years/36 months=$686 user cost per month $686 user cost per month/2 pay periods per month=$343 pay period deduction Coverage enrollment of the user into the user's ODHI plan may be facilitated at 741. In one implementation, enrollment data associated with the user's ODHI plan may be provided to an employer benefit administrator system of the plan sponsor to facilitate enrolling the user into the plan, setting up payroll deductions to pay for the plan, and/or the like.

FIG. 8 shows a screenshot diagram illustrating embodiments of the UDRCD. In FIG. 8, an exemplary enrollment user interface is shown. Screen 801 shows how a user may select different provider networks for the user's ODHI plan. For example, the user may use a toggle switch 802 to select the HealthEast provider network. In another example, the user may click on a details GUI widget 804 to view additional information regarding each provider network (e.g., participating providers, insurance cost data). Screen 810 shows how a user may set copays for various services. For example, the user may use a slider 812 to set the emergency room copay. In another example, the resulting pay period deduction 814, available HRA balance remaining 816, and how the last change (e.g., to increase emergency room copay from $200 to $300) affected the pay period deduction and the available HRA balance remaining 818. Screen 820 show how the user may select condition add-ins for the user's ODHI plan. For example, the user may use a toggle switch 822 to select the Asthma add-in.

Figure 9:
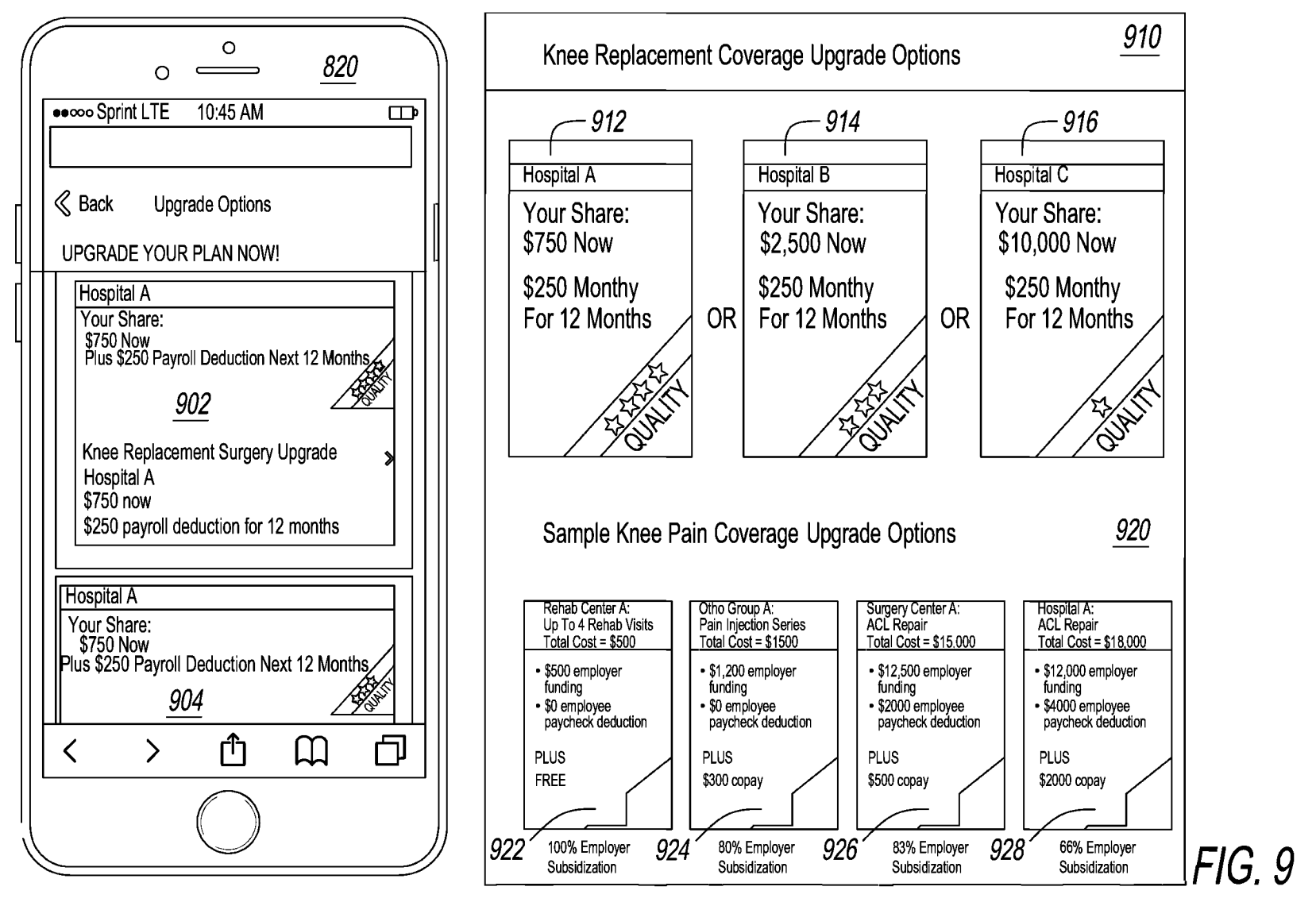

FIG. 9 shows a screenshot diagram illustrating embodiments of the UDRCD. In FIG. 9, an exemplary enrollment user interface is shown. An upgrade options screen 901 shows how a user may upgrade the user's ODHI plan by selecting an add-in (e.g., for knee pain coverage). For example, the user may click on one of the available knee replacement surgery coverage add-in options 902 or 904 to upgrade. Screen 910 shows an example of the upgrade options that may be available to the user in screen 901. For example, the user may select from three different hospitals 912, 914, and 916, with each hospital having a different quality rating and a different insurance cost (e.g., higher quality providers may have lower insurance costs). Screen 920 shows another example of the upgrade options that may be available to the user in screen 901. For example, the user may select from four different providers 922, 924, 926, and 928, with providers offering different treatment options (e.g., procedures) and having different employer subsidization percentages.

FIG. 10 shows a screenshot diagram illustrating embodiments of the UDRCD. In FIG. 10, an exemplary copay schedule comparison of copay amounts that a user has to pay for various services with core coverage vs. core coverage and add-ins coverage is shown. As shown in FIG. 10, having add-ins coverage may lower copays for certain services (e.g., primary care visit, specialty visit, urgent care, prescription drugs). It is to be understood that different add-ins may affect copays for different services.

Figure 11:
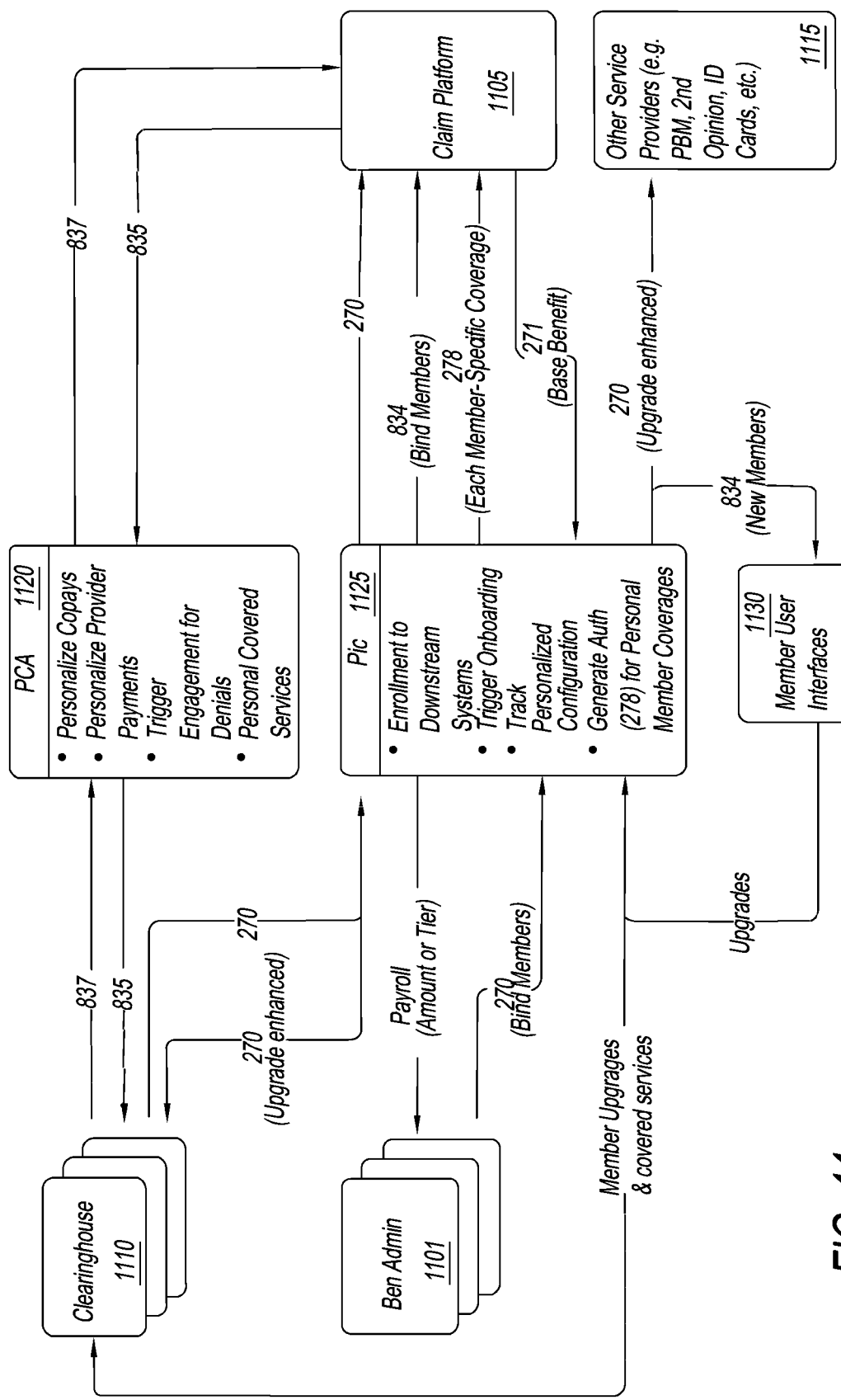
FIG. 11 shows an exemplary architecture for the UDRCD.

FIG. 11 shows an exemplary architecture for the UDRCD. In FIG. 11, a claim administration platform is illustrated. In one embodiment, the claim administration platform facilitates claim processing of each member's individually configured ODHI plan. In one implementation, the claim administration platform interoperates with benefit administration systems 1101 (e.g., benefit administration systems cannot support member personalization of a medical benefit and the resulting calculations and communications), a claim platform 1105 (e.g., claim platforms predefine the insurance coverage and providers, and then associated members to one of the predefined options), clearinghouse systems 1110, other service provider (e.g., pharmacy benefit manager (PBM), $2^{nd}$ opinion, ID cards) systems 1115, and/or the like to facilitate ODHI plan administration in a pluggable manner with health industry systems. For example, numbered arrows indicate various X12 data files that may be sent among different claim administration platform components and health industry systems.

In one embodiment, the claim administration platform includes a personal claim administrator (PCA) component 1120, a personal insurance coordinator (PIC) component 1125, and an onboarding engine (OE) 1130. In one implementation, the PCA component may facilitate personalization of copays, personalization of provider payments, triggering engagement for denials, personal covered services, and/or the like. In one implementation, the PIC component may facilitate enrollment to downstream systems, triggering onboarding, tracking personalized configuration, generating authorization (e.g., X12 278 formatted data files) for personal member coverages, and/or the like. In one implementation, the OE may facilitate onboarding new members and upgrades via member user interfaces, and/or the like. For example:

Personalize Copays

Copays for the services delivered to plan members by providers are applied during claims processing based on the chosen insurance coverage at the time the member added that coverage to the member's benefit. The copay can vary based on a variety of factors, including treatment choice, providers delivering the treatments, location of the treatments, the underlying provider and location fees and practice patterns at the time the coverage was added, and/or the like. These copays are determined and passed to the Claim Platform for adjudication accordingly.

Personalize Provider Payments

The amount paid to providers for services delivered to members is determined at the time the member coverage was added. The amount can vary by provider price commitment at any given point in time, either by providers configuring specific prices or by provider specification of an algorithm, within agreed on parameters. Personalized claim processing delivers payment instructions to be used to pay specific claims based on the fees captured at the time coverage was added.

Trigger Engagement for Denials

In addition to proactive outreach based on algorithms in the Early Listening System, outreach to members based on Denials is used to both inform and educate members, as well as to allow for member coverage additions per plan sponsor configured parameters by post processing claims.

Personal Covered Services

The coverage available for member selection can vary by services included. Personalized claim adjudication takes into consideration the services included for that member based on the member's coverage choices at the time the coverage was added.

Enrollment to Downstream Systems

Enrollment information may be provided to other systems involved in delivering the on-demand health insurance. The mechanism as well as the amount of information provided is determined and delivered based on the specifications of each downstream system.

Trigger Onboarding

Enrollment is a multi-part process, including the initial selection of the on-demand health insurance, the subsequent personalization of that insurance for each member, and the configuration of the product specifically for each member.

Track Personalized Configuration

Each member's personal health coverage is tracked, including all of the parameters involved in the coverage at the point at which it was chosen.

Generate Auth for Personal Member Coverages

Successful adjudication of claims is facilitated in part by creation and management of electronic prior authorization instructions for the claims system that specify coverage and payment parameters for additional personal coverage for each member.

In one implementation, the claim administration platform allows insurance to be individually configurable by each member to meet specific personal insurance needs. The claim administration platform manages the member's individually configured insurance, along with individualized changes over time, and performs the computations utilized to ensure insurance claims are processed according to each member's individual insurance configuration. For a example, the claim administration platform may include the capability to provide instructions to the claims system on the member's individual configuration through the use of prior authorizations to specify coverages for services at one or more providers with specific payment arrangements, and the capability to set inline claims instructions that specify how a specific claim should be processed per the member's chosen configuration. In another example, the claim administration platform may allow for varying each capability to adapt to the unique constraints of the target claims adjudication engine.

Figure 12:
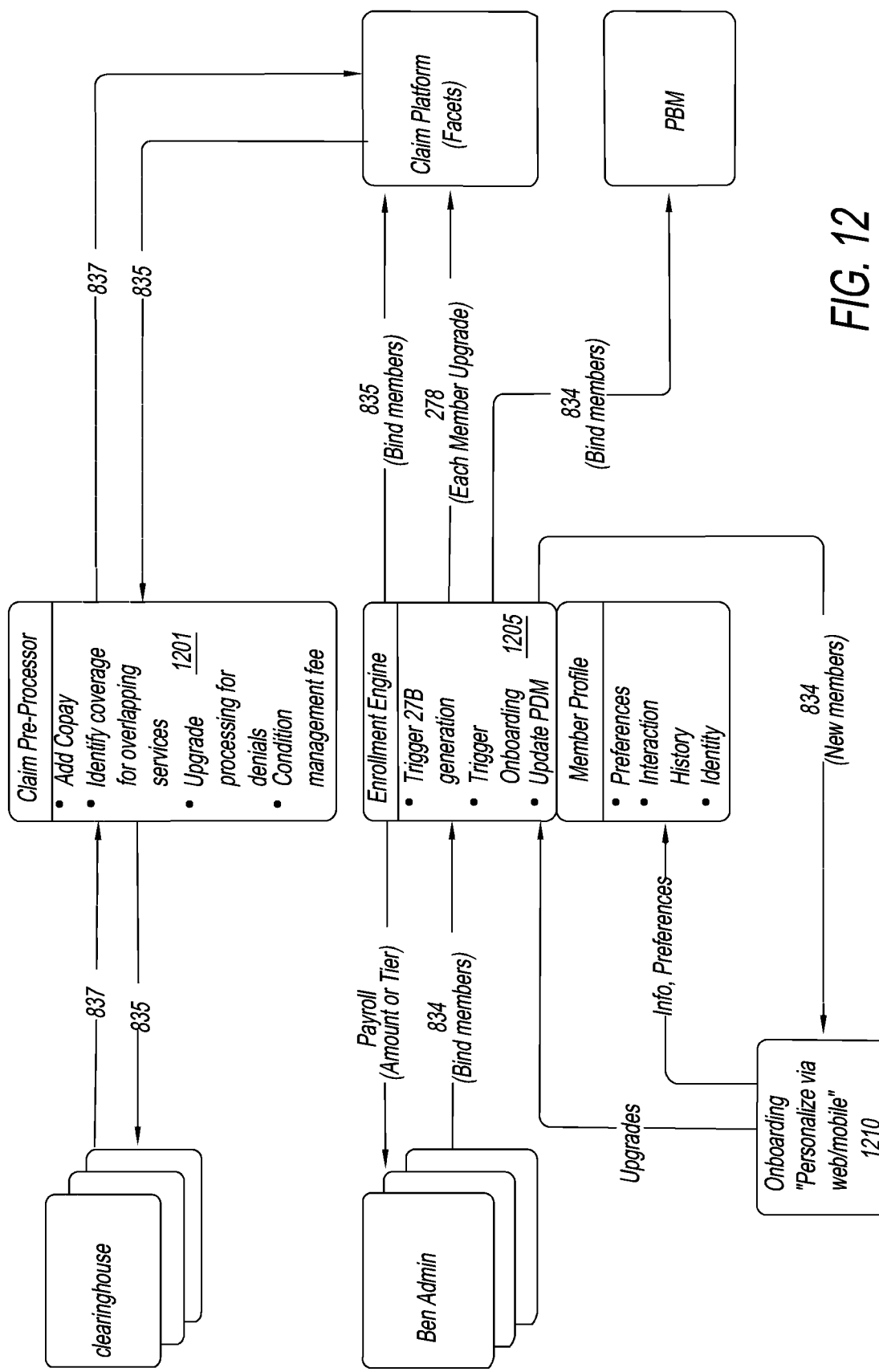
FIG. 12 shows an exemplary architecture for the UDRCD.

FIG. 12 shows an exemplary architecture for the UDRCD. In FIG. 12, alternative embodiments of a claim administration platform are illustrated. In one embodiment, the claim administration platform includes a claim pre-processor component 1201, an enrollment engine 1205, and an onboarding engine (OE) 1210. In one implementation, the claim pre-processor component may facilitate adding copay, identifying coverage for overlapping services, upgrading processing for denials, condition management fee administration, and/or the like. In one implementation, the enrollment engine may facilitate triggering X12 278 formatted data file generation, triggering onboarding, updating PBM, storing a member profile (e.g., a member profile may include preferences, interaction history, identity, and/or the like), and/or the like. In one implementation, the OE may facilitate onboarding new members and upgrades via personalized web and/or mobile user interfaces.

Figure 13:
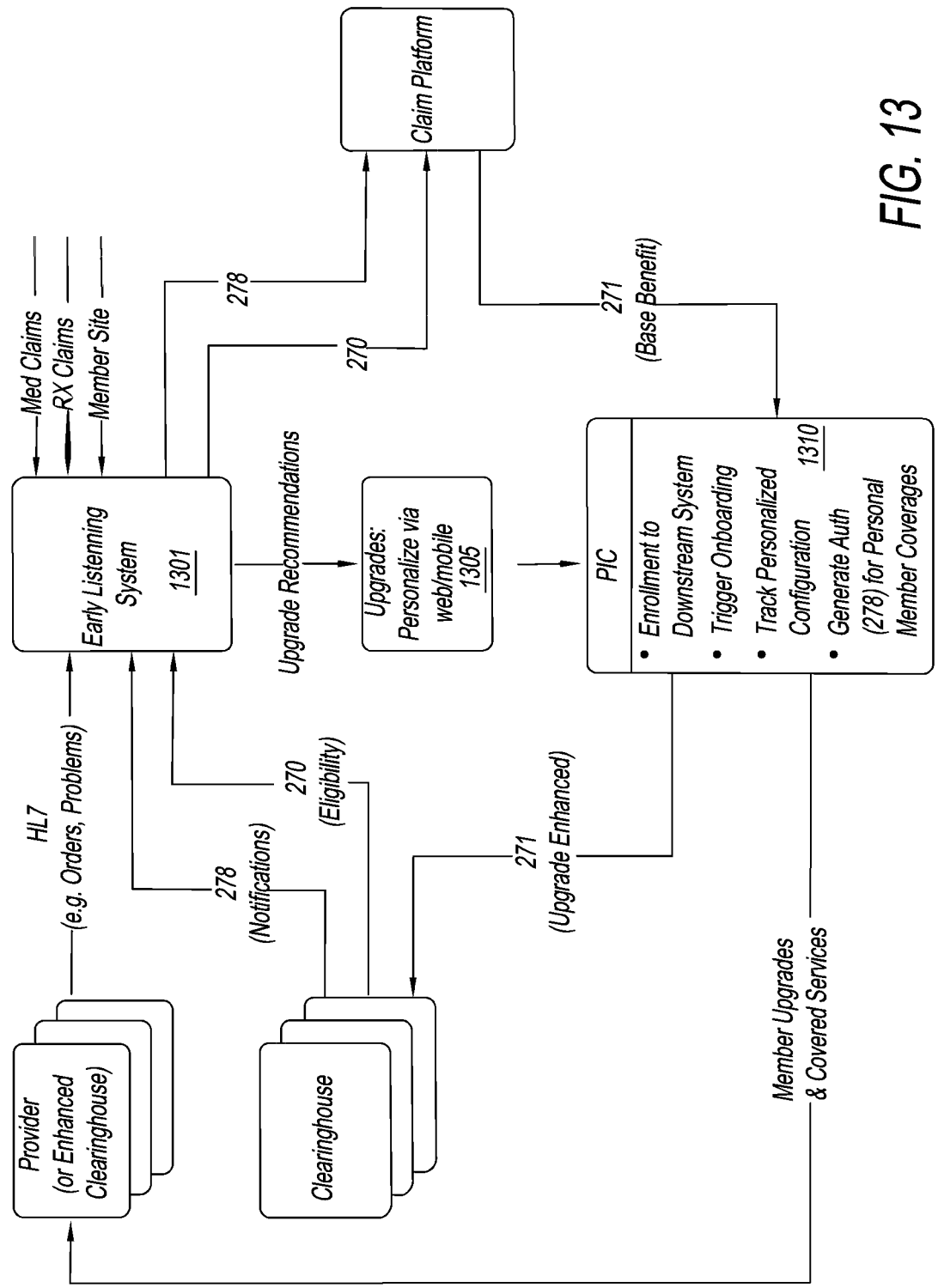
FIG. 13 shows an exemplary architecture for the UDRCD.

FIG. 13 shows an exemplary architecture for the UDRCD. In FIG. 13, an embodiment of how a claim administration platform interoperates with an ELS to provide upgrade recommendations and facilitate upgrade enrollment is illustrated. In one implementation, the ELS 1301 obtains data such as medical claims, medical prescription claims, member site visit data (e.g., "Is it covered?" searches), HL7 data (e.g., orders, problems), X12 data (e.g., notifications, eligibility), and/or the like. The ELS may utilize such data to determine upgrade recommendations (e.g., add-ins that should be offered to plan members).

In one implementation, the ELS may provide the determined upgrade recommendations to an onboarding engine (OE) 1305. For example, the OE may facilitate offering upgrade recommendations to plan members via personalized web and/or mobile user a interfaces.

In one implementation, upgrades selected by plan members for enrollment may be provided to a personal insurance coordinator (PIC) component (e.g., an enrollment engine) in 1310. For example, the PIC component may facilitate enrollment to downstream systems, triggering onboarding, tracking personalized configuration, generating authorization (e.g., X12 278 formatted data files) for personal member coverages, and/or the like.

Figure 14:
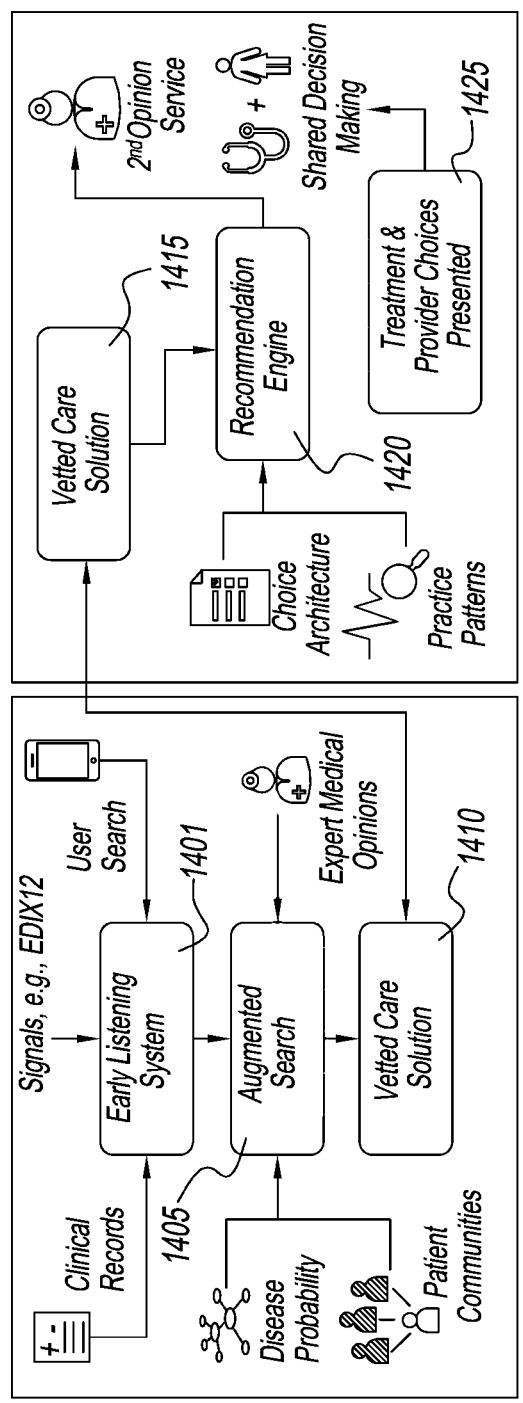
FIG. 14 shows an exemplary architecture for the UDRCD.

FIG. 14 shows an exemplary architecture for the UDRCD. In FIG. 14, an embodiment of how an ELS facilitates presenting treatment and/or provider choices (e.g., associated with a medical condition) to plan members is illustrated. For example, the ELS may facilitate presenting condition-specific coverage information (e.g., existing coverage, available upgrades).

In one implementation, the ELS 1401 obtains event signals from a variety of sources (e.g., clinical records, X12 data files, user searches), and/or the like. The ELS may utilize machine learning processes (e.g., as provided by the data science component) to conduct an augmented search 1405 based on the obtained event signals (e.g., that indicate a medical condition) to determine a vetted care solution 1410 that is appropriate for the condition. In one implementation, the obtained event signal data associated with a plan member, disease progression probability data, patient communities data (e.g., data regarding care efficacy), expert medical opinions data (e.g., data regarding care efficacy), and/or the like may be analyzed (e.g., using a neural network) to determine a set of vetted care solutions (e.g., a set of procedures determined to offer high value care based on medical evidence) that are likely to be utilized by the plan member. For example, the plan member may be likely to choose to use one of the vetted care solutions from the set.

In one implementation, the determined vetted care solutions data 1415 may be provided to a recommendation engine 1420. The recommendation engine may utilize machine learning processes (e.g., as provided by the data science component) to determine treatment and/or provider choices 1425 to present to the plan member. In one implementation, the determined vetted care solutions data, choice architecture data (e.g., data regarding covered benefits available to the plan member), practice patterns (e.g., data regarding quality of care a provided by various providers (e.g., located in locality associated with the plan member) with regard to the vetted care solutions), and/or the like may be analyzed (e.g., using a neural network) to determine a set of treatment and/or provider choices (e.g., that best fit the plan member's ODHI plan) to present to the plan member. For example, the plan member may be informed (e.g., via personalized web and/or mobile user interfaces) regarding likely upcoming care, and, if a treatment choice is not covered by the plan member's ODHI plan, the plan member may be prompted to upgrade by purchasing a corresponding add-in (e.g., for a procedure to be performed at one of the provider choices). In another example, a second opinion service regarding likely upcoming care may be offered to the plan member.

Figure 15:
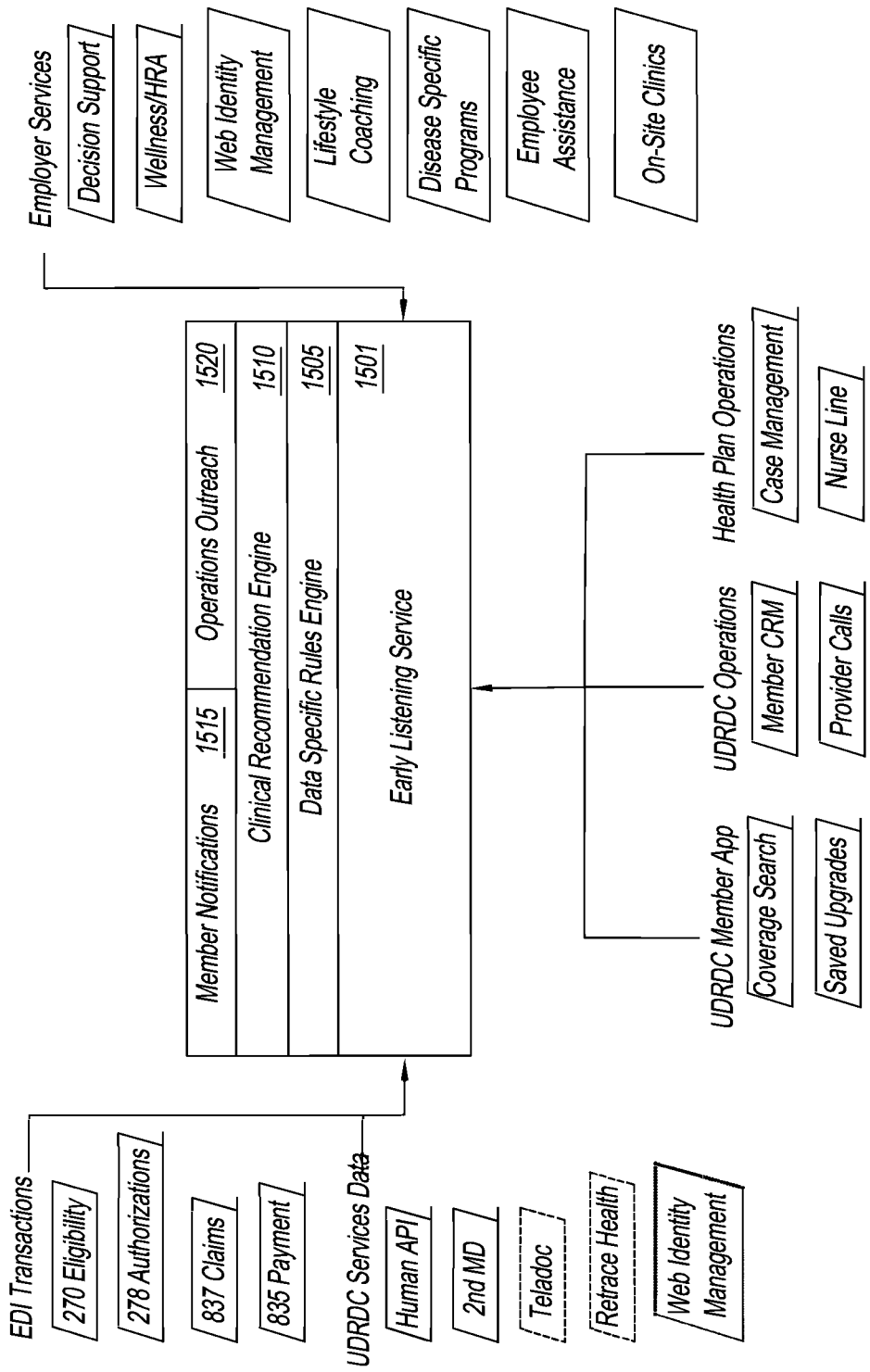
FIG. 15 shows an exemplary architecture for the UDRCD.

FIG. 15 shows an exemplary architecture for the UDRCD. In FIG. 15, alternative embodiments of how an ELS facilitates presenting treatment and/or provider choices to plan members are illustrated. The ELS 1501 obtains event signals from a variety of sources, such as EDI (e.g., X12) transactions (e.g., eligibility, authorizations, claims, payments), UDRCD services data (e.g., human API, $2^{nd}$ MD, teladoc, retrace health, web identity management), UDRCD member app (e.g., coverage search, saved upgrades), UDRCD operations (e.g., member CRM, provider calls), health plan operations (e.g., case management, nurse line), employer services (e.g., decision support, wellness/HRA, engagement platforms, lifestyle coaching, disease specific programs, employee assistance, on-site clinics), and/or the like. A data specific rules engine 1505 may be utilized to determine how data from the various sources should be treated (e.g., parsed, analyzed using a rules-based system, utilized in machine learning processes) to determine relevant vetted care solutions. A recommendation engine 1510 may determine relevant treatment and/or provider choices to present to plan members. A member notifications component 1515 may facilitate notifying (e.g., via personalized web and/or mobile user interfaces) plan members regarding add-in upgrade recommendations. An operations outreach component 1520 may facilitate notifying plan members who do not upgrade regarding the add-in upgrade recommendations via alternative notification channels (e.g., via email, text message, mail, phone).

Figure 16:
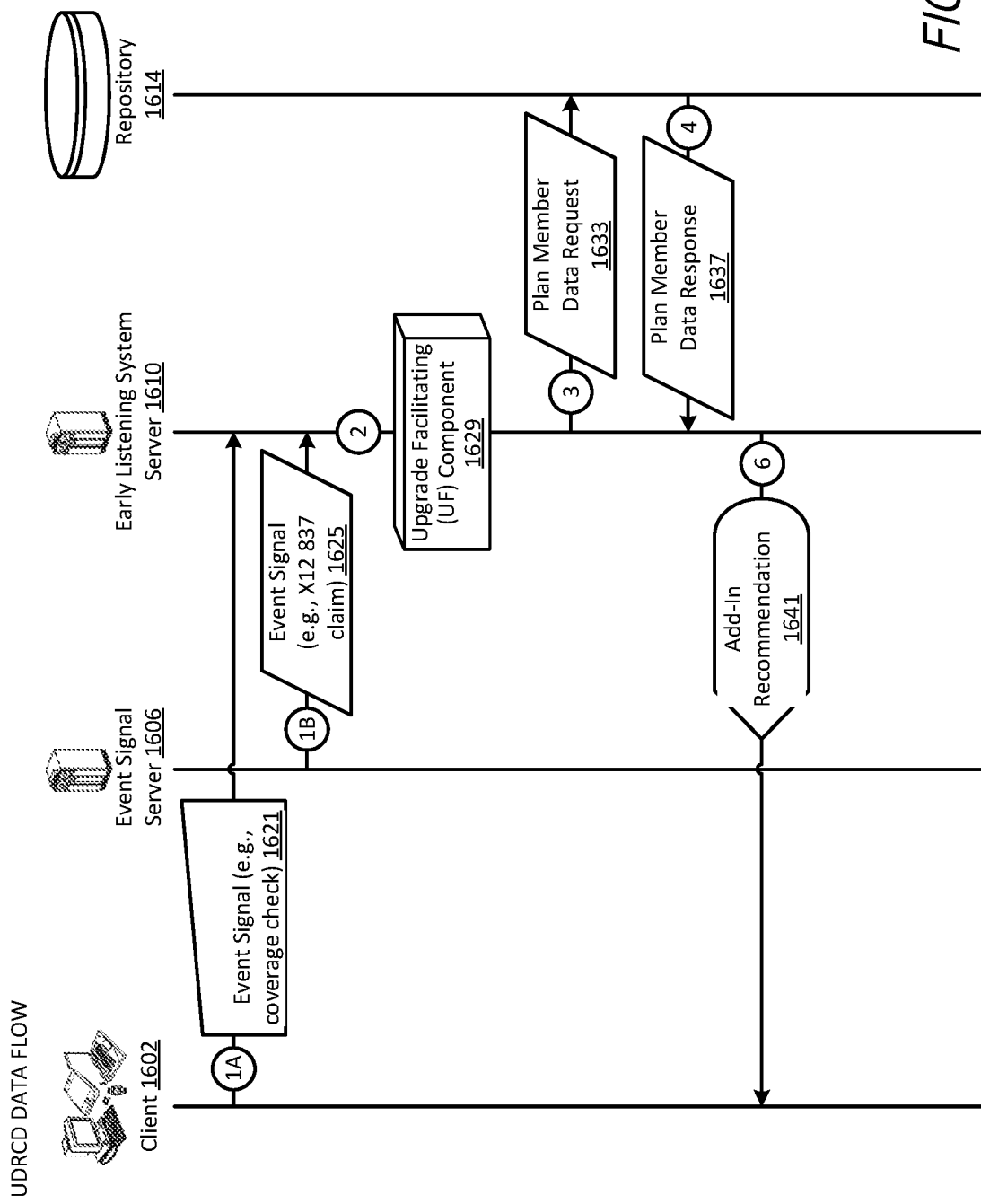
FIG. 16 shows a datagraph diagram illustrating embodiments of a data flow for the UDRCD.

FIG. 16 shows a datagraph diagram illustrating embodiments of a data flow for the UDRCD. In FIG. 16, a client 1602 may send an event signal 1621 to an early listening system (ELS) server 1610. For example, the event signal may be a plan member's "Is it covered?" search for a service, condition, specialty, procedure, drug, and/or the like. In one embodiment, the client may provide the following example event signal, substantially in the form of a HTTP(S) POST message including XML-formatted data, as provided below:

POST/search_request.php HTTP/1.1
Host: www.server.com
Content-Type: Application/XML
Content-Length: 667
<?XML version="1.0" encoding="UTF-8"?>
<search_request>
<user_accounts_details>
  <user_name>ID_user_1</user_name>
  . . .
</user_accounts_details>
<search_query>ear infection</search_query>
</search_request>

An event signal server 1606 (e.g., any server or component that sends captured data) may send an event signal 1625 to the ELS server. For example, the event signal may be an X12 837 health care claim. Accordingly, the event signal server may provide an X12 837 formatted data file associated with the plan member.

It is to be understood that the ELS server may obtain one or more event signals associated with the plan member. For example, the ELS server may either obtain the event signal from the client or obtain the event signal from the event signal server. In another example, the ELS server may both obtain the event signal from the client and obtain the event signal from the event signal server.

An upgrade facilitating (UF) component 1629 may utilize event signal data to facilitate determining add-in upgrade recommendations for the plan member. See FIG. 17 for additional details regarding the UF component.

The ELS server may send a plan member data request 1633 to a repository 1614 to obtain plan member data (e.g., the plan member's profile, the plan member's clinical data, the plan member's ODHI plan configuration). For example, the repository may include a members database 2819*k*. In one implementation, the plan member data request may include data such as a request identifier, a plan member identifier, requested data specification, and/or the like. In one embodiment, the ELS server may provide the following example plan member data request, substantially in the form of a HTTP(S) POST message including XML-formatted data, as provided below:

POST/plan_member_data_request.php HTTP/1.1
Host: www.server.com
Content-Type: Application/XML
Content-Length: 667
<?XML version="1.0" encoding="UTF-8"?>
<plan_member_data_request>
<request_identifier>ID_request_3</request_identifier>
<user_name>ID_user_1</user_name>
<requested_data>member profile, member clinical data, member plan configuration</requested_data>
</plan_member_data_request>

The repository may send a plan member data response 1637 to the ELS server to provide the ELS server with the requested plan member data. In one implementation, the plan member data response may include data such as a response identifier, the requested plan member data, and/or the like. In one embodiment, the repository may provide the following example plan member data response, substantially in the form of a HTTP(S) POST message including XML-formatted data, as provided below:

POST/plan_member_data_response.php HTTP/1.1
Host: www.server.com
Content-Type: Application/XML Content-Length: 667
```
<?XML version="1.0" encoding="UTF-8"?>
<plan_member_data_response>
   <request_identifier>ID_response_3</request_identifier>
   <requested_data>
      <profile>profile data (e.g., address, preferences)</profile>
      <clinical_data>clinical data (e.g., electronic health records, claims data)</clinical_data>
      <plan_configuration>
         plan configuration data (e.g., covered atomized conditions and/or procedures,
         purchased add-ins, add-ins available as upgrades)
      </plan_configuration>
   </requested_data>
</plan_member_data_response>
```

The ELS server may send an add-in recommendation 1641 to the client to inform the plan member (e.g., via a website, application (e.g., a mobile app), email, text message, and/or the like) regarding add-ins that are likely to be useful to the plan member (e.g., add-ins that may lower the cost of likely upcoming care to the plan member) and/or to facilitate purchasing upgrades for such add-ins.

Figure 17:
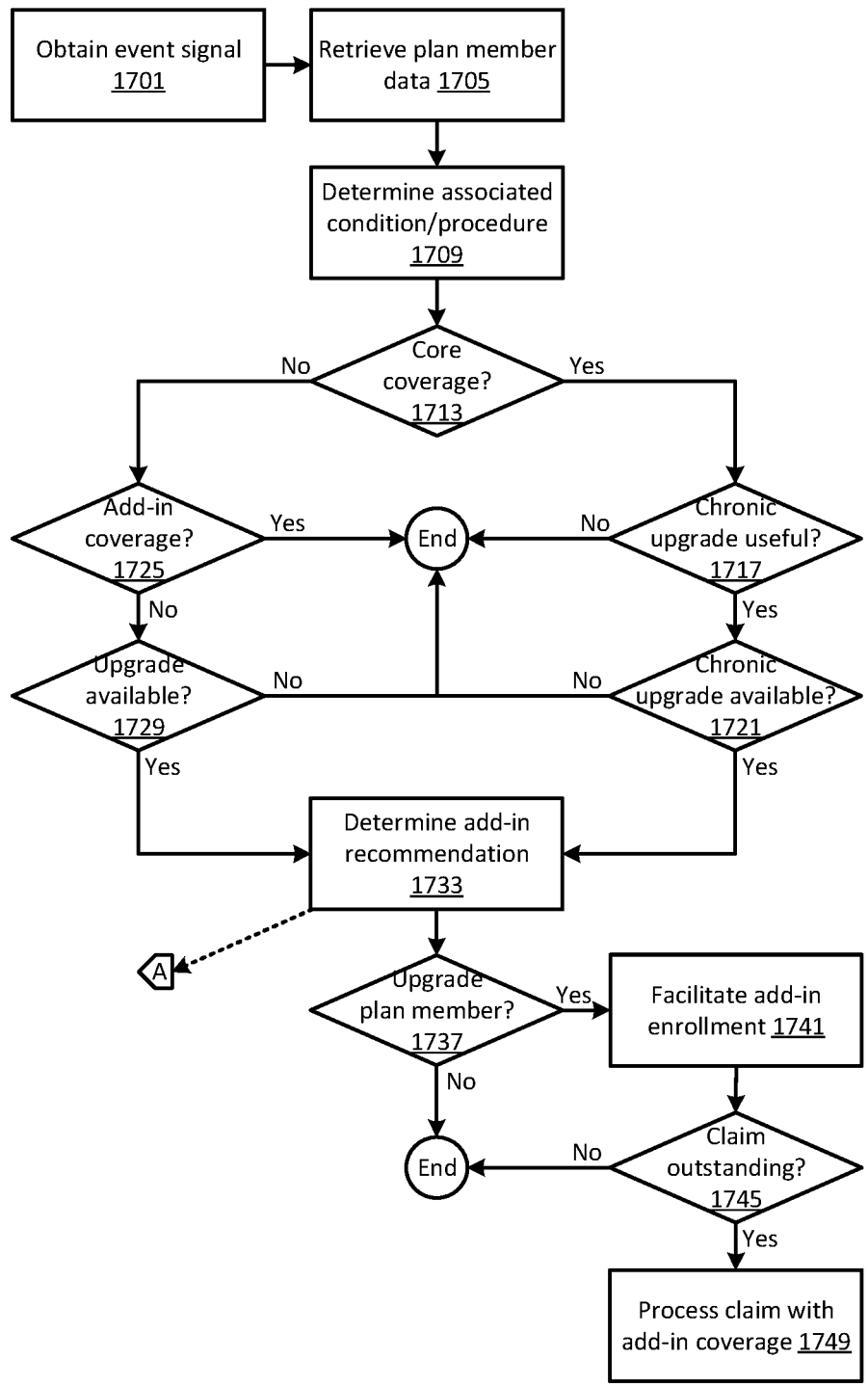
FIG. 17 shows a logic flow diagram illustrating embodiments of an upgrade facilitating (UF) component for the UDRCD.

FIG. 17 shows a logic flow diagram illustrating embodiments of an upgrade facilitating (UF) component for the UDRCD. In FIG. 17, an event signal may be obtained at 1701. For example, the event signal may be obtained from any of the variety of sources from which an ELS may obtain event signals. In another example, a plurality of event signals may be obtained (e.g., from different sources).

Plan member data of a plan member (e.g., of an ODHI plan) may be retrieved at 1705. In one implementation, the plan member data may be retrieved by sending a plan member data request to a repository. For example, member profile data, member clinical data, plan configuration of the plan member's ODHI plan, and/or the like may be retrieved.

A condition and/or a procedure associated with the event signal may be determined at 1709. In one embodiment, event signal data from the one or more obtained event signals, the retrieved plan member data (e.g., the retrieved member clinical data, such as the plan member's health and/or treatment history), modeling data (e.g., disease progression probabilities), and/or the like may be analyzed using machine learning processes (e.g., as provided by the data science component) to determine the associated condition and/or procedure. In one implementation, a condition may be determined. For example, such data may be analyzed (e.g., via a neural network) to determine a condition (e.g., asthma) that the user is likely to have. In another example, such data may be analyzed (e.g., via a neural network) to determine a vetted care solution (e.g., a set of procedures to treat knee pain) for the condition. In another implementation, a procedure may be determined. For example, such data may be analyzed (e.g., via a rules engine) to determine a procedure (e.g., knee replacement) that the user is likely to utilize.

A determination may be made at 1713 whether the determined condition and/or procedure is covered by the ODHI plan's core coverage (e.g., based on the plan configuration). For example, it may be determined that treatment for asthma is covered by the core coverage. In another example, it may be determined that knee replacement is not covered by the core coverage.

If the determined condition and/or procedure is covered by the core coverage, a determination may be made at 1717 whether a chronic upgrade (e.g., a chronic condition add-in) may be useful for the plan member. For example, the chronic condition add-in may lower copay costs associated with treatment for the chronic condition. In one implementation, if the chronic condition add-in exists and the user is not already enrolled into the chronic condition add-in, the chronic condition add-in may be useful. In another implementation, the plan member's profile data (e.g., preferences) may be analyzed to determine whether the chronic condition add-in may be useful (e.g., not useful if the user previously declined to purchase the chronic condition add-in). If it is determined that the chronic upgrade may be useful, a determination may be made at 1721 whether the chronic upgrade is available to the plan member. In one implementation, the plan configuration may be analyzed to make this determination (e.g., based on how the ODHI plan was configured by a plan sponsor).

If the determined condition and/or procedure is not covered by the core coverage, a determination may be made at 1725 whether the determined condition and/or procedure is covered by the ODHI plan's add-in coverage purchased by the plan member (e.g., based on the plan configuration). If the determined condition and/or procedure is not covered by the add-in coverage, a determination may be made at 1729 whether an upgrade (e.g., a procedure add-in) is available to the plan member. In one implementation, the plan configuration may be analyzed to make this determination (e.g., based on whether the procedure add-in exists, based on how the ODHI plan was configured by the plan sponsor). In another implementation, this determination may be made based on whether the procedure is considered useful (e.g., whether scientific evidence supports claims of the procedure's value). For example, if the procedure is not considered useful, the associated procedure add-in may not be recommended (e.g., the plan member could still purchase the upgrade, but the ELS would not provide a recommendation).

If the chronic upgrade or the upgrade is available to the plan member, an add-in recommendation may be determined at 1733. In one embodiment, available add-ins, the plan member data, and/or the like may be analyzed using machine learning processes (e.g., as provided by the data science component) to determine the add-in recommendation. In one implementation, a condition add-in upgrade may be available, and the condition add-in may be determined as the add-in recommendation for the plan member (e.g., see screen 820). In another implementation, multiple procedures and/or providers may be available to treat the condition, and the relevant (e.g., based on care efficacy, based on geographic proximity of providers to the plan member's location) add-ins (e.g., for relevant procedures at relevant providers) may be determined as the add-in recommendation for the plan member (e.g., see screen 920). In another implementation, a procedure add-in upgrade may be available, and the procedure add-in may be determined as the add-in recommendation for the plan member. In another implementation, multiple providers may be available to perform the procedure, and the relevant (e.g., based on providers' quality, based on geographic proximity of providers to the plan member's location) add-ins (e.g., for relevant providers) may be determined as the add-in recommendation for the plan member (e.g., see screen 910).

A determination may be made at 1737 whether the plan member should be upgraded. In one implementation, this determination may be made based on whether the plan member chose to purchase one of the recommended add-ins. In another implementation, this determination may be made based on whether the plan sponsor specifies that the plan member should be auto-enrolled into add-ins (e.g., that lower costs for the plan member).

If the plan member should be upgraded, add-in enrollment into the selected (e.g., by the plan member, by the plan sponsor) add-in may be facilitated at 1741. In one implementation, enrollment data associated with the selected add-in may be provided to an employer benefit administrator system of the plan sponsor to facilitate enrolling the plan member into the selected add-in, setting up payroll deductions to pay for the selected add-in, and/or the like.

A determination may be made at 1745 whether there is an outstanding claim associated with the plan member that benefits (e.g., results in lower cost for the plan member) from enrollment into the selected add-in. For example, the outstanding claim may be the obtained event signal (e.g., a claim for a procedure not covered by the plan member's ODHI plan). If there is an outstanding claim, the outstanding claim may be processed with add-in coverage at 1749. In one implementation, a previously not covered procedure (e.g., not covered at the time the procedure was performed) may be processed as covered by the add-in coverage (e.g., the plan member is responsible for paying a copay instead of for paying for the procedure). In another implementation, a copay amount associated with the outstanding claim may be reduced (e.g., based on a copay schedule associated with the selected add-in).

Figure 18:
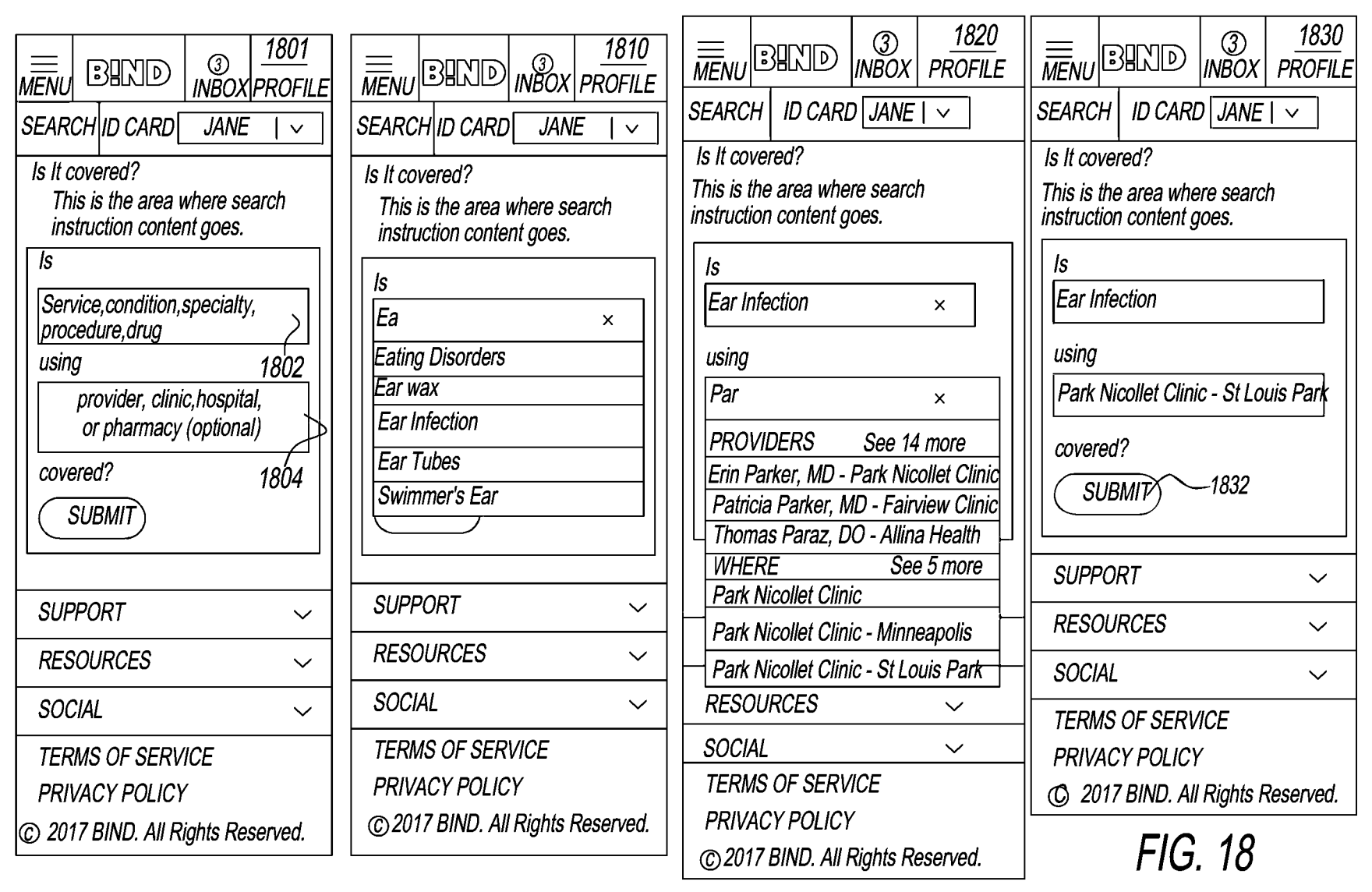

FIG. 18 shows a screenshot diagram illustrating embodiments of the UDRCD. In FIG. 18, an exemplary user interface (e.g., for a mobile device) for conducting an "Is it covered?" search is illustrated. In one embodiment, conducting an "Is covered?" may send an event signal (e.g., with details regarding the search query) to an ELS. Screen 1801 shows that a user may conduct a search to determine whether a service, condition, specialty, procedure, drug, and/or the like specified via a GUI widget 1802 is covered using (e.g., optional) a person provider (e.g., a particular doctor), clinic, hospital, pharmacy, and/or the like specified via a GUI widget 1804 for a plan member (e.g., of an ODHI plan) specified via a GUI widget 1806. Screens 1810 and 1820 show that autocomplete suggestions may be available for GUI widget 1802 and/or GUI widget 1804, respectively. Screen 1830 shows that the user may utilize a submit button 1832 to submit the search query (e.g., Is Ear Infection using Park Nicollet Clinic—St Louis Park covered for plan member Jane).

FIG. 19 shows a screenshot diagram illustrating embodiments of the UDRCD. In FIG. 19, an exemplary user interface (e.g., for a mobile device) for providing results for an "Is it covered?" search is illustrated. Screen 1901 shows results when a condition is covered at a clinic. For example, an indication that the condition is covered and information regarding cost and coverage options may be provided. Screen 1910 shows results when a condition is covered for a specific doctor at a clinic. For example, an indication that the condition is covered and information regarding cost and coverage options may be provided. Screen 1920 shows results when a condition is not covered for a specific doctor at a clinic. For example, an indication that the provider is not covered and a GUI widget 1922 that may be utilized to find a covered provider may be provided.

Figure 20:
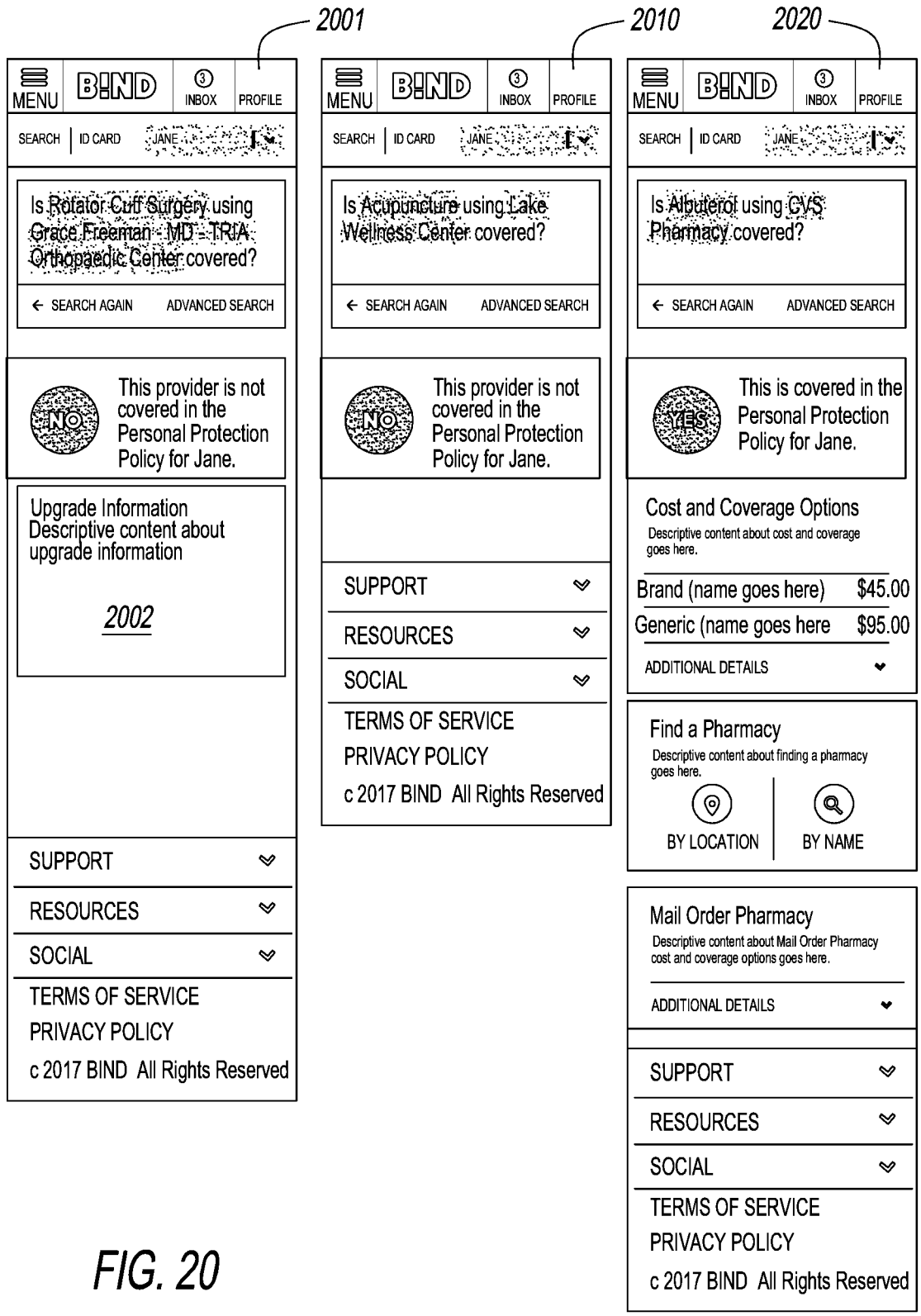
FIG. 20 shows a screenshot diagram illustrating embodiments of the UDRCD.

FIG. 20 shows a screenshot diagram illustrating embodiments of the UDRCD. In FIG. 20, an exemplary user interface (e.g., for a mobile device) for providing results for an "Is it covered?" search is illustrated. Screen 2001 shows results when a procedure is not covered. For example, an indication that the procedure is not covered and a GUI widget 2002 with an add-in recommendation (e.g., that facilitates purchasing an upgrade) may be provided. Screen 2010 shows results when a procedure is not covered. For example, an indication that the procedure is not covered may be provided, but, if the procedure is not considered useful, no add-in recommendation may be provided. Screen 2020 shows results when a drug is covered at a pharmacy chain. For example, an indication that the drug is covered and information regarding cost and coverage options may be provided.

Figure 21:
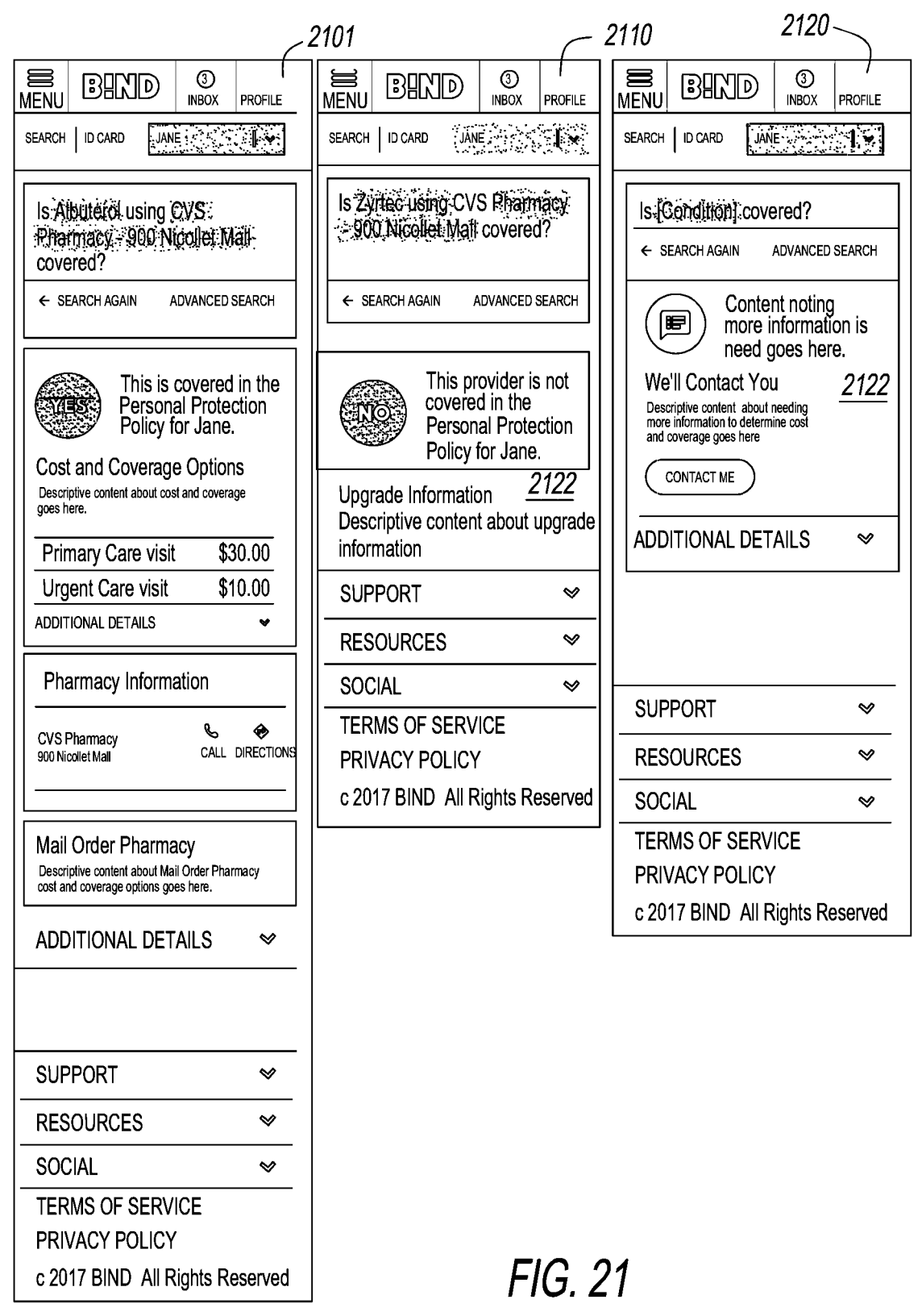

FIG. 21 shows a screenshot diagram illustrating embodiments of the UDRCD. In FIG. 21, an exemplary user interface (e.g., for a mobile device) for providing results for an "Is it covered?" search is illustrated. Screen 2101 shows results when a drug is covered at a pharmacy at a particular location. For example, an indication that the drug is covered and information regarding cost and coverage options may be provided. Screen 2110 shows results when a drug is not covered at a pharmacy at a particular location. For example, an indication that the drug is not covered and a GUI widget 2112 with an add-in recommendation (e.g., that facilitates purchasing an upgrade) may be provided. Screen 2120 shows results when more information is needed to make a coverage determination. For example, an indication that more information is needed and a GUI widget 2122 that facilitates obtaining such information may be provided.

Figure 22:
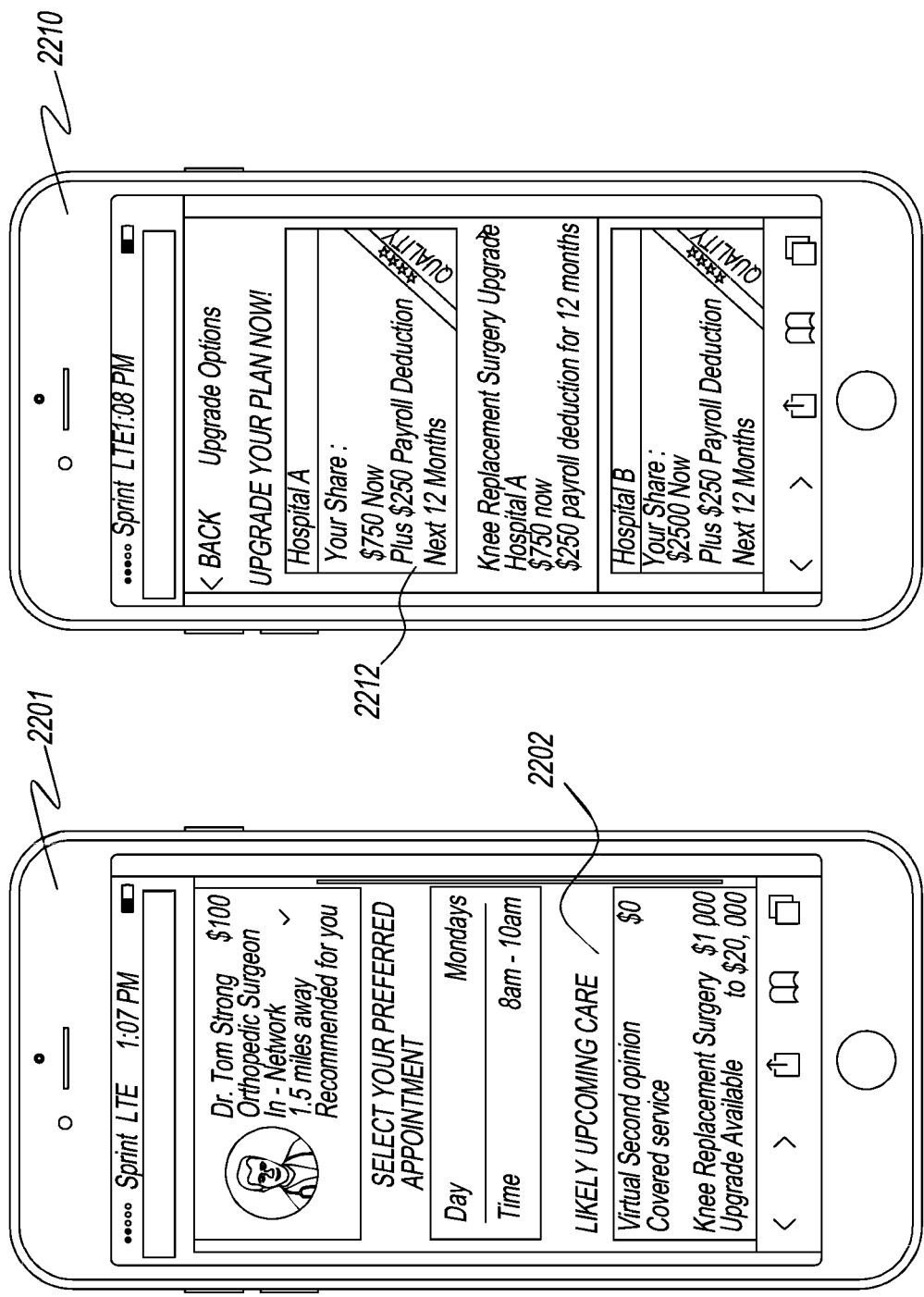
FIG. 22 shows a screenshot diagram illustrating embodiments of the UDRCD.

FIG. 22 shows a screenshot diagram illustrating embodiments of the UDRCD. In FIG. 22, an exemplary user interface (e.g., for a mobile device) is shown. Screen 2201 shows that a plan member scheduled an appointment with an orthopedic surgeon. In one embodiment, scheduling an appointment may send an event signal (e.g., with details regarding the appointment) to an ELS. The ELS may determine that knee replacement surgery is likely and may facilitate purchasing a knee replacement surgery add-in upgrade. For example, the plan member may click on a knee replacement surgery section of a likely upcoming care GUI widget 2202 to view available upgrade options. An upgrade options screen 2210 shows how a user may upgrade the user's ODHI plan by selecting an add-in. For example, the user may click on one of the available knee replacement surgery coverage add-in options 2212 or 2214 to upgrade.

FIG. 23 shows a screenshot diagram illustrating embodiments of the UDRCD. In FIG. 23, an alternative embodiment of a likely upcoming care GUI widget is illustrated. For example, this user interface may be utilized for a website.

FIG. 24 shows a screenshot diagram illustrating embodiments of the UDRCD. In FIG. 24, an alternative embodiment of an upgrade options screen is illustrated. For example, this user interface may be utilized for a website.

FIG. 25 shows a screenshot diagram illustrating embodiments of the UDRCD. In FIG. 25, a screenshot diagram of a provider's current performance for add-in coverages is shown. A current performance screen 2501 shows the provider's performance relative to other providers in the market on an episodic basis for each of the add-in coverages they offer services for 2502. The variance in episodic cost in the market is shown to the provider as a low (e.g. $10^{th}$ percentile) 2511 and high (e.g. $90^{th}$ percentile) 2512. The provider's own average episodic cost is then also showed to them 2613 and plotted graphically relative to the market 2520. The factors contributing to the provider's episodic cost relative to the market are shown as a utilization factor 2531 and price factor 2532.

In one implementation, the utilization may be constructed by pricing each occurrence of a code within an episode for a given add-in coverage based on the Centers for Medicare & Medicaid Services (CMS) fee schedule. The provider's average price per episode for each add-in coverage using the CMS fee schedule is then divided by the market average of other episodes of that add-in coverage also repriced based on the CMS fee schedule. With this implementation, the price factor would then be calculated as the difference in average allowed amount for that provider against the market average that is not accounted for by the utilization factor.

In one implementation, the utilization factor could account for not just the propensity of utilization within an episode, but also the frequency with which surgical and less invasive treatment paths are used by a provider in treating a condition associated with an add-in coverage.

Price and utilization factors may be applied to the member add-in cost 2540 to determine the amount of copay and paycheck deduction a member would have to pay to purchase each add-in coverage for that particular provider. In one implementation, the member copay and paycheck deduction amount may be determined at the provider organization level. In another implementation, it may be determined based on the specific location/facility where the procedure would be delivered under the add-in coverage. In yet another implementation, the copay and paycheck deduction amount may be determined based on the individual practitioner that would be delivering the service.

FIG. 26 shows a screenshot diagram illustrating embodiments of the UDRCD. In FIG. 26, a screenshot diagram of the Provider Pricing Controller (PPC) is shown. Screen 2601 shows how a provider can dynamically modify their allowed amount at any point in time during the year. Based on a configuration setting that establishes a price maximum that the provider may not exceed, providers are able to use the PPC to establish rates for their services at any point below the maximum established for each code or episode. The flexibility allows the providers to adapt to market demand as well as any changes to their supply of physician time or space in their facilities.

Providers can change their allowed amount on an episodic basis 2610. In one implementation, the provider may change the allowed amount for a given episode by having a percent change apply universally across the codes associated with that episode, including those codes that happen during the anchor event, a pre-window (period prior to an admission or anchor service fur the episode), and a post-window (period following a discharge or anchor service for the episode).

In one implementation, the provider may limit the changes to allowed amounts for services within the anchor event. This would include services that happen from the time the patient is admitted and discharged for inpatient stays or during the visit for a service performed as outpatient.

In one implementation, the provider can change the allowed amount differentially for each code associated with an episode, including those codes in the pre-window, anchor service, and post-window. The provider can change or not change their allowed amount for each of these codes and then see how the expected allowed amount and price factor change based on the expected utilization of each of the codes in the episode based on their historical performance.

The provider is able to see how changes in the allowed amount 2620, whether changed at an episodic level or for specific codes within the episode, impact the total member responsibility 2630 associated with buying coverage for a specific add-in at that provider. This new member responsibility is shown to the provider in terms of the copay and paycheck deduction 2640 comprising the total member responsibility as well as how these changes impact how the total member responsibility arrays relative to the low and high amounts of member responsibility for add-in coverages for other providers in the market.

FIGS. 27, 27A-27B show a screenshot diagram illustrating embodiments of the UDRCD. In FIG. 27, a screen shot diagram for how a provider is able to change the allowed amounts for any of the codes associated with episode for an add-in coverage is shown. Screen 2701 (as shown in FIGS. 27, 27A-27B) shows an example episode for which a provider can modify the pricing for each code associated with that episode of care. This screen shows the provider what the frequency of each code associated with an episode is for the market 2710 and for that provider 2721. The current allowed amount 2722 for each code is then multiplied by the existing frequency for those codes to determine their expected cost contribution to the episode 2723.

Providers may alter the allowed amounts for each code in the episode 2731 on a percent basis and determine the new allowed amount for each code 2732 and its modified contribution to the cost of the episode 2733. The total cost of the episode and the new price factor 2740 that is calculated from it are then applied back to the add-in coverage calculations occurring in FIG. 26.

ADDITIONAL ALTERNATIVE EMBODIMENT EXAMPLES

The following alternative example embodiments provide a number of variations of some of the core principles already discussed for expanded color on the abilities of the UDRCD.

Members

Members starts with a Personal Protection Plan (PPP or core) (which in one non-limiting embodiment is a data structure including: coverage amounts, pointers to usage, estimated usage, goals, entities of coverage, persons of coverage, etc.) and a Health Reimbursement Account (HRA) (e.g., which also is a data structure with novel coverage, demand, reimbursement, and other data, structures, and links, etc.). The PPP provides coverage for unplanned accidents and illness and encourages the use of preventive services. The PPP was not designed to provide rich coverage for everyday medical expenses. Those expenses can be funded by the member's HRA or from their other personal financial accounts. Additionally, the PPP deliberately does not cover discretionary procedures and diagnostics. Coverage for those services are available through upgrades (or add-ins), which can be purchased at any point in the coverage cycle. The plan also includes automatic upgrades for those members with chronic conditions. The automatic upgrades reduce cost sharing for valuable preventive services designed to prevent hospitalizations.

Personal Protection Plan

The PPP has no deductible and relies on co-pays to encourage effective health behaviors. As part of the PPP, members have unlimited access to free virtual care visits. Additionally, each member has access to 24×7 concierge support with a dedicated care advisor. When medical needs require more complex care, the PPP also provides a free virtual second opinion service. The PPP fully covers several preventive services, such as immunizations, well-child visits and mammograms, with no member co-pays. As such the UDRCD helps to decrease future costs by preventing more serious health issues from occurring or getting worse.

Default co-pay amounts are built into the services covered by the PPP, however, members have the opportunity to adjust their co-pays for each distinct service.

If members choose higher co-pays their premiums are reduced and the incremental savings created are deposited into their HRA. The reverse happens if they choose co-pay amounts below the default.

The default co-pay amounts under the PPP follow: (Illustrative prices/Not Actual)

| BENEFIT HIGHLIGHTS | In Network Co-Pay | Out Of Network Co-Pay |
|---|---|---|
| Preventive Health and Wellness Services | | |
| Periodic health exams; well-baby care | $0 | $75 |
| Routine immunizations/shots | $0 | $75 |
| Hearing screenings | $0 | $75 |
| Colorectal cancer screening: sigmoidoscopy, colonoscopy | $0 | $75 |
| Prostate screening exam (calendar year) | $0 | $75 |
| Nutritional counseling (limited to two visits per calendar year) | $0 | $75 |
| Physician/Provider Services | | |
| Office visits to Personal Physician/Provider | $25 | $75 |
| Office visits to Specialist | $100 | $300 |
| E-visits, telephone, video visits to a participating provider | $0 | Not Covered |
| Allergy shots, serums, infusions, and injectable medications | $25 | $75 |
| Surgery and anesthesia (in office) | $100 | $300 |
| Inpatient hospital visits for unplanned hospitalizations (including surgery and anesthesia) | $25 | $75 |
| Women's Health Services | | |
| Gynecological exams (calendar year); Pap tests | $0 | $75 |
| Mammograms | $0 | $200 |
| Mental Health/Chemical Dependency | | |
| Inpatient, residential services | $250 per day/Up To $2000 per admission | $500 per day/Up To $5000 per admission |
| Day treatment, intensive outpatient, and partial hospitalization services | $25 | $75 |
| Applied behavior analysis | $25 | $75 |
| Outpatient provider visits | $25 | $75 |
| Unplanned Hospital Services | | |
| Inpatient care | $250 per day/Up To $2000 per admission | $500 per day/Up To $5000 per admission |
| Observation care | $250 per day/Up To $2000 per admission | $500 per day/Up To $5000 per admission |
| Rehabilitative care (30 days per calendar year; 60 days head or spinal cord injuries) | $250 per day/Up To $2000 per admission | $500 per day/Up To $5000 per admission |
| Skilled nursing facility (180 days per calendar year) | $250 per day/Up To $2000 per admission | $500 per day/Up To $5000 per admission |
| Durable medical equipment and supplies | | |
| Durable medical equipment and supplies | 15% of cost | 30% of cost |
| Urgent Care/Emergency/Emergency Medical Transportation | | |
| Urgent care visits (for non-life threatening illness/minor injury) | $100 | $100 |
| Emergency services (for emergency medical conditions only. If admitted to hospital, copayment is not applied; all services subject to inpatient benefits.) | $300 | $300 |
| Emergency medical transportation | $150 | $150 |
| Other Covered Services | | |
| X-ray; lab services | $50 | $100 |
| Outpatient rehabilitative services (60 visits per calendar year) | $25 | $25 |
| Outpatient surgery, dialysis, infusion, chemotherapy, radiation therapy | $25 | $50 |
| Cardiac rehabilitation | $25 | $50 |
| Home health care (up to 180 visits per calendar year) | $25 | $50 |
| Hospice care | $25 | $50 |
| Hearing exam (limited to one per calendar year) | $25 | $50 |
| Hearing aids (one per ear every four calendar years) | 10% of cost | 10% of cost |
| Self-administered chemotherapy (Up to a 30-daysupply from a designated participating pharmacy) | | |
| Generic Drugs | $25 | Not Covered |
| Formulary brand-name drugs | $25 | Not Covered |
| Non-formulary brand-name drugs | $25 | Not Covered |

The premiums and co-pays for the personal protection plan are designed to fund the initial coverage level as well as the portion of additional coverage upgrades within the same coverage period that are not funded by upgrade premium and co-pay amounts.

Coverage Upgrades

Coverage Upgrades may include three different types:
Chronic Condition Coverage Upgrades
Discretionary Procedure Coverage Upgrades
Service Category Coverage Upgrades Chronic Condition Coverage Upgrades The goal of chronic condition care is to keep members out of the hospital by removing barriers to preventive care including visits with their clinical team (primary care plus specialists), tests and medications. To remove these barriers the chronic condition upgrades remove co-pay amounts for preventive care as specified by the protocols developed by each of the specialty societies that are primarily responsible for managing each respective chronic condition. Our benefit makes preventive care free for those with chronic conditions, after they self identify as having that condition. By asking the member to enroll in the upgrade, our plan overcomes the challenge of identifying members with chronic conditions. Our plan identifies these members either during open enrollment or at the onset/diagnosis of the chronic condition because with our plan a member can upgrade on demand. This allows us to engage the member early and immediately put support programs in place for them.

The chronic conditions available for upgrade may include:

Asthma
Bipolar mood disease
Brochiectasis
Cardiac failure
Cardiomyopathy
Chronic obstructive pulmonary disease
Chronic kidney disease
Coronary artery disease
Crohn's disease
Diabetes insipidus
Diabetes mellitus type 1
Diabetes mellitus type 2
Arrythmia (irregular heartbeat)
Epilepsy
Glaucoma
Haemophilia
HIV
Hyperlipidaemia (high cholesterol)
Hypertension (high blood pressure)
Hypothyroidism (inactive thyroid gland)
Multiple sclerosis
Parkinson's disease
Rheumatoid arthritis
Schizophrenia
Systemic lupus erythematosis
Ulcerative colitis
Clinical depression Discretionary Procedure Coverage Upgrades In addition to our strategy to better support preventive services, another aspect of our cost reduction strategy is to decrease the use of services that do not return substantial value to members. Leveraging the benefit designs put in place in South Africa and for the State of Oregon employees, we identified several services that are not supported by evidence. Those services are not covered by the PPP. However, coverage upgrades can be purchased for those services at any point in time. By not covering these services and making them available through v a deliberate enrollment step that requires a significant financial commitment from the member, our plan encourages members to talk with their providers about treatment options and outcomes, rather than immediately settle on the most expensive treatment available. The savings created by lowering the use of these non-valuable services help to fund the increased investment the plan makes in preventive services for members with chronic conditions.

The following is an exemplary list of the procedure upgrades:

Infertility services
Temporomandibular joint (TMJ)
Maternity care
Routine newborn nursery care
Bariatric surgery
Sleep studies
Conservative back and neck treatment
Myringotomy (grommets)
Tonsillectomy
Adenoidectomy
Colonoscopy (other than colo rectal cancer screen where evidence based)
Sigmoidoscopy
Proctoscopy
Gastroscopy
Cystoscopy
Knee Arthroscopy
Shoulder Arthroscopy
Functional Nasal Procedure/Sinus surgery
Hysterectomy (except for pre-operatively diagnosed cancer)
Laparoscopy
Hysteroscopy
Endometrial Ablation
Nissan Fundoplication (reflux surgery)
Spinal surgery (back & neck)
Knee Resurfacing
Knee Replacement
Hip Resurfacing
Hip Replacement
Bariatric Surgery
Bunionectomy
Hammertoe surgery
Knee viscosupplementation
Morton's neuroma
Spinal injections for pain
Upper GI endoscopy
Surgery For Benign Prostatic Hyperplasia
Warts
Varicose vein surgery
Varicose vein stripping
Ganglion surgery
Breast reduction
Radio frequency ablation The upgrades options vary in their premium and co-pay amounts, based on who and where the member chooses to receive the upgrade from. This variable pricing encourages the use of high quality and low cost providers.

Service Category Coverage Upgrades

Similar to discretionary procedures, there exist other categories of medical care that do not provide substantial value to members. These service categories are not covered as part of the PPP but can be purchased as an upgrade at any time by members.

The following is an exemplary list of the service category upgrades:

---
Sleep studies
High tech diagnostic imaging = PET, CT, MRI
ED visits without an inpatient stay
Acupuncture
Chiropractic
Naturopath

---

UDRCD Controller

FIG. 28 shows a block diagram illustrating embodiments of a UDRCD controller. In this embodiment, the UDRCD controller 2801 may serve to aggregate, process, store, search, serve, identify, instruct, generate, match, and/or facilitate interactions with a computer through information technology analytics and processing for risk coverage technologies, and/or other related data.

Typically, users, which may be people and/or other systems, may engage information technology systems (e.g., computers) to facilitate information processing. In turn, computers employ processors to process information; such processors 2803 may be referred to as central processing units (CPU). One form of processor is referred to as a microprocessor. CPUs use communicative circuits to pass binary encoded signals acting as instructions to enable various operations. These instructions may be operational and/or data instructions containing and/or referencing other instructions and data in various processor accessible and operable areas of memory 2829 (e.g., registers, cache memory, random access memory, etc.). Such communicative instructions may be stored and/or transmitted in batches (e.g., batches of instructions) as programs and/or data components to facilitate desired operations. These stored instruction codes, e.g., programs, may engage the CPU circuit components and other motherboard and/or system components to perform desired operations. One type of program is a computer operating system, which, may be executed by CPU on a computer; the operating system enables and facilitates users to access and operate computer information technology and resources. Some resources that may be employed in information technology systems include: input and output mechanisms through which data may pass into and out of a computer; memory storage into which data may be saved; and processors by which information may be processed. These information technology systems may be used to collect data for later retrieval, analysis, and manipulation, which may be facilitated through a database program. These information technology systems provide interfaces that allow users to access and operate various system components.

In one embodiment, the UDRCD controller 2801 may be connected to and/or communicate with entities such as, but not limited to: one or more users from peripheral devices 2812 (e.g., user input devices 2811); an optional cryptographic processor device 2828; and/or a communications network 2813.

Networks are commonly thought to comprise the interconnection and interoperation of clients, servers, and intermediary nodes in a graph topology. It should be noted that the term "server" as used throughout this application refers generally to a computer, other device, program, or combination thereof that processes and responds to the requests of remote users across a communications network. Servers serve their information to requesting "clients." The term "client" as used herein refers generally to a computer, program, other device, user and/or combination thereof that is capable of processing and making requests and obtaining and processing any responses from servers across a communications network. A computer, other device, program, or combination thereof that facilitates, processes information and requests, and/or furthers the passage of information from a source user to a destination user is commonly referred to as a "node." Networks are generally thought to facilitate the transfer of information from source points to destinations. A node specifically tasked with furthering the passage of information from a source to a destination is commonly called a "router." There are many forms of networks such as Local Area Networks (LANs), Pico networks, Wide Area Networks (WANs), Wireless Networks (WLANs), etc. For example, the Internet is generally accepted as being an interconnection of a multitude of networks whereby remote clients and servers may access and interoperate with one another.

The UDRCD controller 2801 may be based on computer systems that may comprise, but are not limited to, components such as: a computer systemization 2802 connected to memory 2829.

Computer Systemization

A computer systemization 2802 may comprise a clock 2830, central processing unit ("CPU(s)" and/or "processor(s)" (these terms are used interchangeably throughout the disclosure unless noted to the contrary)) 2803, a memory 2829 (e.g., a read only memory (ROM) 2806, a random access memory (RAM) 2805, etc.), and/or an interface bus 2807, and most frequently, although not necessarily, are all interconnected and/or communicating through a system bus 2804 on one or more (mother)board(s) 2802 having conductive and/or otherwise transportive circuit pathways through which instructions (e.g., binary encoded signals) may travel to effectuate communications, operations, storage, etc. The computer systemization may be connected to a power source 2886; e.g., optionally the power source may be internal. Optionally, a cryptographic processor 2826 may be connected to the system bus. In another embodiment, the cryptographic processor, transceivers (e.g., ICs) 2874, and/or sensor array (e.g., accelerometer, altimeter, ambient light, barometer, global positioning system (GPS) (thereby allowing UDRCD controller to determine its location), gyroscope, magnetometer, pedometer, proximity, ultra-violet sensor, etc.) 2873 may be connected as either internal and/or external peripheral devices 2812 via the interface bus I/O 2808 (not pictured) and/or directly via the interface bus 2807. In turn, the transceivers may be connected to antenna(s) 2875, thereby effectuating wireless transmission and reception of various communication and/or sensor protocols; for example the antenna(s) may connect to various transceiver chipsets (depending on deployment needs), including: Broadcom BCM4329FKUBG transceiver chip (e.g., providing 802.11n, Bluetooth 2.1+EDR, FM, etc.); a Broadcom BCM4752 GPS receiver with accelerometer, altimeter, GPS, gyroscope, magnetometer; a Broadcom BCM4335 transceiver chip (e.g., providing 2G, 3G, and 4G long-term evolution (LTE) cellular communications; 802.11 ac, Bluetooth 4.0 low energy (LE) (e.g., beacon features)); a Broadcom BCM43341 transceiver chip (e.g., providing 2G, 3G and 4G LTE cellular communications; 802.11 g/, Bluetooth 4.0, near field communication (NFC), FM radio); an Infineon Technologies X-Gold 618-PMB9800 transceiver chip (e.g., providing 2G/3G HSDPA/HSUPA communications); a MediaTek MT6620 transceiver chip (e.g., a providing 802.11a/ac/b/g/n, Bluetooth 4.0 LE, FM, GPS; a Lapis Semiconductor ML8511 UV sensor; a maxim integrated MAX44000 ambient light and infrared proximity sensor; a Texas Instruments WiLink WL1283 transceiver chip (e.g., providing 802.11n, Bluetooth 3.0, FM, GPS); and/or the like. The system clock typically has a crystal oscillator and generates a base signal through the computer systemization's circuit pathways. The clock is typically coupled to the system bus and various clock multipliers that will increase or decrease the base operating frequency for other components interconnected in the computer systemization. The clock and various components in a computer systemization drive signals embodying information throughout the system. Such transmission and reception of instructions embodying information throughout a computer systemization may be commonly referred to as communications. These communicative instructions may further be transmitted, received, and the cause of return and/or reply communications beyond the instant computer systemization to: communications networks, input devices, other computer systemizations, peripheral devices, and/or the like. It should be understood that in alternative embodiments, any of the above components may be connected directly to one another, connected to the CPU, and/or organized in numerous variations employed as exemplified by various computer systems.

The CPU comprises at least one high-speed data processor adequate to execute program components for executing user and/or system-generated requests. The CPU is often packaged in a number of formats varying from large super-computer(s) and mainframe(s) computers, down to mini computers, servers, desktop computers, laptops, thin clients (e.g., Chromebooks), netbooks, tablets (e.g., Android, iPads, and Windows tablets, etc.), mobile smartphones (e.g., Android, iPhones, Nokia, Palm and Windows phones, etc.), wearable device(s) (e.g., watches, glasses, goggles (e.g., Google Glass), etc.), and/or the like. Often, the processors themselves will incorporate various specialized processing units, such as, but not limited to: integrated system (bus) controllers, memory management control units, floating point units, and even specialized processing sub-units like graphics processing units, digital signal processing units, and/or the like. Additionally, processors may include internal fast access addressable memory, and be capable of mapping and addressing memory 2829 beyond the processor itself; internal memory may include, but is not limited to: fast registers, various levels of cache memory (e.g., level 1, 2, 3, etc.), RAM, etc. The processor may access this memory through the use of a memory address space that is accessible via instruction address, which the processor can construct and decode allowing it to access a circuit path to a specific memory address space having a memory state. The CPU may be a microprocessor such as: AMD's Athlon, Duron and/or Opteron; Apple's A series of processors (e.g., A5, A6, A7, A8, etc.); ARM's application, embedded and secure processors; IBM and/or Motorola's DragonBall and PowerPC; IBM's and Sony's Cell processor; Intel's 80X86 series (e.g., 80386, 80486), Pentium, Celeron, Core (2) Duo, i series (e.g., i3, i5, i7, etc.), Itanium, Xeon, and/or XScale; Motorola's 680X0 series (e.g., 68020, 68030, 68040, etc.); and/or the like processor(s). The CPU interacts with memory through instruction passing through conductive and/or transportive conduits (e.g., (printed) electronic and/or optic circuits) to execute stored instructions (i.e., program code) according to conventional data processing techniques. Such instruction passing facilitates communication within the UDRCD controller and beyond through various interfaces. Should processing requirements dictate a greater amount speed and/or capacity, distributed processors (e.g., see Distributed UDRCD below), mainframe, multi-core, parallel, and/or super-computer architectures may similarly be employed. Alternatively, should deployment requirements dictate greater portability, smaller mobile devices (e.g., Personal Digital Assistants (PDAs)) may be employed.

Depending on the particular implementation, features of the UDRCD may be achieved by implementing a microcontroller such as CAST's R8051XC2 microcontroller; Intel's MCS 51 (i.e., 8051 microcontroller); and/or the like. Also, to implement certain features of the UDRCD, some feature implementations may rely on embedded components, such as: Application-Specific Integrated Circuit ("ASIC"), Digital Signal Processing ("DSP"), Field Programmable Gate Array ("FPGA"), and/or the like embedded technology. For example, any of the UDRCD component collection (distributed or otherwise) and/or features may be implemented via the microprocessor and/or via embedded components; e.g., via ASIC, coprocessor, DSP, FPGA, and/or the like. Alternately, some implementations of the UDRCD may be implemented with embedded components that are configured and used to achieve a variety of features or signal processing.

Depending on the particular implementation, the embedded components may include software solutions, hardware solutions, and/or some combination of both hardware/software a solutions. For example, UDRCD features discussed herein may be achieved through implementing FPGAs, which are a semiconductor devices containing programmable logic components called "logic blocks", and programmable interconnects, such as the high performance FPGA Virtex series and/or the low cost Spartan series manufactured by Xilinx. Logic blocks and interconnects can be programmed by the customer or designer, after the FPGA is manufactured, to implement any of the UDRCD features. A hierarchy of programmable interconnects allow logic blocks to be interconnected as needed by the UDRCD system designer/administrator, somewhat like a one-chip programmable breadboard. An FPGA's logic blocks can be programmed to perform the operation of basic logic gates such as AND, and XOR, or more complex combinational operators such as decoders or mathematical operations. In most FPGAs, the logic blocks also include memory elements, which may be circuit flip-flops or more complete blocks of memory. In some circumstances, the UDRCD may be developed on regular FPGAs and then migrated into a fixed version that more resembles ASIC implementations. Alternate or coordinating implementations may migrate UDRCD controller features to a final ASIC instead of or in addition to FPGAs. Depending on the implementation all of the aforementioned embedded components and microprocessors may be considered the "CPU" and/or "processor" for the UDRCD.

Power Source

The power source 2886 may be of any standard form for powering small electronic circuit board devices such as the following power cells: alkaline, lithium hydride, lithium ion, lithium polymer, nickel cadmium, solar cells, and/or the like. Other types of AC or DC power sources may be used as well. In the case of solar cells, in one embodiment, the case provides an aperture through which the solar cell may capture photonic energy. The power cell 2886 is connected to at least one of the interconnected subsequent components of the UDRCD thereby providing an electric current to all subsequent components. In one example, the power source 2886 is connected to the system bus component 2804. In an alternative embodiment, an outside power source 2886 is provided through a connection across the I/O 2808 interface. For example, a USB and/or IEEE 1394 connection carries both data and power across the connection and is therefore a suitable source of power.

Interface Adapters

Interface bus(ses) 2807 may accept, connect, and/or communicate to a number of interface adapters, conventionally although not necessarily in the form of adapter cards, such as but not limited to: input output interfaces (I/O) 2808, storage interfaces 2809, network interfaces 2810, and/or the like. Optionally, cryptographic processor interfaces 2827 similarly may be connected to the interface bus. The interface bus provides for the communications of interface adapters with one another as well as with other components of the computer systemization. Interface adapters are adapted for a compatible interface bus. Interface adapters conventionally connect to the interface bus via a slot architecture. Conventional slot architectures may be employed, such as, but not limited to: Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and/or the like.

Storage interfaces 2809 may accept, communicate, and/or connect to a number of storage devices such as, but not limited to: storage devices 2814, removable disc devices, and/or the like. Storage interfaces may employ connection protocols such as, but not limited to: (Ultra) (Serial) Advanced Technology Attachment (Packet Interface) ((Ultra) (Serial) ATA(PI)), (Enhanced) Integrated Drive Electronics ((E)IDE), Institute of Electrical and Electronics Engineers (IEEE) 1394, fiber channel, Small Computer Systems Interface (SCSI), Universal Serial Bus (USB), and/or the like.

Network interfaces 2810 may accept, communicate, and/or connect to a communications network 2813. Through a communications network 2813, the UDRCD controller is accessible through remote clients 2833b (e.g., computers with web browsers) by users 2833a. Network interfaces may employ connection protocols such as, but not limited to: direct connect, Ethernet (thick, thin, twisted pair 10/100/1000/10000 Base T, and/or the like), Token Ring, wireless connection such as IEEE 802.11a-x, and/or the like. Should processing requirements dictate a greater amount speed and/or capacity, distributed network controllers (e.g., see Distributed UDRCD below), architectures may similarly be employed to pool, load balance, and/or otherwise decrease/increase the communicative bandwidth required by the UDRCD controller. A communications network may be any one and/or the combination of the following: a direct interconnection; the Internet; Interplanetary Internet (e.g., Coherent File Distribution Protocol (CFDP), Space Communications Protocol Specifications (SCPS), etc.); a Local Area Network (LAN); a Metropolitan Area Network (MAN); an Operating Missions as Nodes on the Internet (OMNI); a secured custom connection; a Wide Area Network (WAN); a wireless network (e.g., employing protocols such as, but not limited to a cellular, WiFi, Wireless Application Protocol (WAP), I-mode, and/or the like); and/or the like. A network interface may be regarded as a specialized form of an input output interface. Further, multiple network interfaces 2810 may be used to engage with various communications network types 2813. For example, multiple network interfaces may be employed to allow for the communication over broadcast, multicast, and/or unicast networks.

Input Output interfaces (I/O) 2808 may accept, communicate, and/or connect to user, peripheral devices 2812 (e.g., input devices 2811), cryptographic processor devices 2828, and/or the like. I/O may employ connection protocols such as, but not limited to: audio: analog, digital, monaural, RCA, stereo, and/or the like; data: Apple Desktop Bus (ADB), IEEE 1394a-b, serial, universal serial bus (USB); infrared; joystick; keyboard; midi; optical; PC AT; PS/2; parallel; radio; touch interfaces: capacitive, optical, resistive, etc. displays; video interface: Apple Desktop Connector (ADC), BNC, coaxial, component, composite, digital, Digital Visual Interface (DVI), (mini) displayport, high-definition multimedia interface (HDMI), RCA, RF antennae, S-Video, VGA, and/or the like; wireless transceivers: 802.11a/ac/b/g/n/x; Bluetooth; cellular (e.g., code division multiple access (CDMA), high speed packet access (HSPA(+)), high-speed downlink packet access (HSDPA), global system for mobile communications (GSM), long term evolution (LTE), WiMax, etc.); and/or the like. One typical output device may include a video display, which typically comprises a Cathode Ray Tube (CRT) or Liquid Crystal Display (LCD) based monitor with an interface (e.g., DVI circuitry and cable) that accepts signals from a video interface, may be used. The video interface composites information generated by a computer systemization and generates video signals based on the composited information in a video memory frame. Another output device is a television set, which accepts signals from a video interface. Typically, the video interface provides the composited video information through a video connection interface that accepts a video display interface (e.g., an RCA composite video connector accepting an RCA composite video cable; a DVI connector accepting a DVI display cable, etc.).

Peripheral devices 2812 may be connected and/or communicate to I/O and/or other facilities of the like such as network interfaces, storage interfaces, directly to the interface bus, system bus, the CPU, and/or the like. Peripheral devices may be external, internal and/or part of the UDRCD controller. Peripheral devices may include: antenna, audio devices (e.g., line-in, line-out, microphone input, speakers, etc.), cameras (e.g., gesture (e.g., Microsoft Kinect) detection, motion detection, still, video, webcam, etc.), dongles (e.g., for copy protection, ensuring secure transactions with a digital signature, and/or the like), external processors (for added capabilities; e.g., crypto devices 528), force-feedback devices (e.g., vibrating motors), infrared (IR) transceiver, network interfaces, printers, scanners, sensors/sensor arrays and peripheral extensions (e.g., ambient light, GPS, gyroscopes, proximity, temperature, etc.), storage devices, transceivers (e.g., cellular, GPS, etc.), video devices (e.g., goggles, monitors, etc.), video sources, visors, and/or the like. Peripheral devices often include types of input devices (e.g., cameras).

User input devices 2811 often are a type of peripheral device 512 (see above) and may include: card readers, dongles, finger print readers, gloves, graphics tablets, joysticks, keyboards, microphones, mouse (mice), remote controls, security/biometric devices (e.g., fingerprint reader, iris reader, retina reader, etc.), touch screens (e.g., capacitive, resistive, etc.), trackballs, trackpads, styluses, and/or the like.

It should be noted that although user input devices and peripheral devices may be employed, the UDRCD controller may be embodied as an embedded, dedicated, and/or monitor-less (i.e., headless) device, wherein access would be provided over a network interface connection.

Cryptographic units such as, but not limited to, microcontrollers, processors 2826, interfaces 2827, and/or devices 2828 may be attached, and/or communicate with the UDRCD controller. A MC68HC16 microcontroller, manufactured by Motorola Inc., may be used for and/or within cryptographic units. The MC68HC16 microcontroller utilizes a 16-bit multiply-and-accumulate instruction in the 16 MHz configuration and requires less than one second to a perform a 512-bit RSA private key operation. Cryptographic units support the authentication of communications from interacting agents, as well as allowing for anonymous transactions. Cryptographic units may also be configured as part of the CPU. Equivalent microcontrollers and/or processors may also be used. Other commercially available specialized cryptographic processors include: Broadcom's CryptoNetX and other Security Processors; nCipher's nShield; SafeNet's Luna PCI (e.g., 7100) series; Semaphore Communications' 40 MHz Roadrunner 184; Sun's Cryptographic Accelerators (e.g., Accelerator 6000 PCIe Board, Accelerator 500 Daughtercard); Via Nano Processor (e.g., L2100, L2200, U2400) line, which is capable of performing 500+ MB/s of cryptographic instructions; VLSI Technology's 33 MHz 6868; and/or the like.

Memory

Generally, any mechanization and/or embodiment allowing a processor to affect the storage and/or retrieval of information is regarded as memory 2829. However, memory is a fungible technology and resource, thus, any number of memory embodiments may be employed in lieu of or in concert with one another. It is to be understood that the UDRCD controller and/or a computer systemization may employ various forms of memory 2829. For example, a computer systemization may be configured wherein the operation of on-chip CPU memory (e.g., registers), RAM, ROM, and any other storage devices are provided by a paper punch tape or paper punch card mechanism; however, such an embodiment would result in an extremely slow rate of operation. In a typical configuration, memory 2829 will include ROM 2806, RAM 2805, and a storage device 2814. A storage device 2814 may be any conventional computer system storage. Storage devices may include: an array of devices (e.g., Redundant Array of Independent Disks (RAID)); a drum; a (fixed and/or removable) magnetic disk drive; a magneto-optical drive; an optical drive (i.e., Blu-eray, CD ROM/RAM/Recordable (R)/ReWritable (RW), DVD R/RW, HD DVD R/RW etc.); RAM drives; solid state memory devices (USB memory, solid state drives (SSD), etc.); other processor-readable storage mediums; and/or other devices of the like. Thus, a computer systemization generally requires and makes use of memory.

Component Collection

The memory 2829 may contain a collection of program and/or database components and/or data such as, but not limited to: operating system component(s) 2815 (operating system); information server component(s) 2816 (information server); user interface component(s) 2817 (user interface); Web browser component(s) 2818 (Web browser); database(s) 2819; mail server component(s) 2821; mail client component(s) 2822; cryptographic server component(s) 2820 (cryptographic server); the UDRCD component(s) 2835; and/or the like (i.e., collectively a component collection). These components may be stored and accessed from the storage devices and/or from storage devices accessible through an interface bus. Although non-conventional program components such as those in the component collection, typically, are stored in a local storage device 2814, they may also be loaded and/or stored in memory such as: peripheral devices, RAM, remote storage facilities through a communications network, ROM, various forms of memory, and/or the like.

Operating System

The operating system component 2815 is an executable program component facilitating the operation of the UDRCD controller. Typically, the operating system facilitates access of I/O, network interfaces, peripheral devices, storage devices, and/or the like. The operating system may be a highly fault tolerant, scalable, and secure system such as: Apple's Macintosh OS X (Server); AT&T Plan 9; Be OS; Blackberry's QNX; Google's Chrome; Microsoft's Windows 7/8; Unix and Unix-like system distributions (such as AT&T's UNIX; Berkley Software Distribution (BSD) variations such as FreeBSD, NetBSD, OpenBSD, and/or the like; Linux distributions such as Red Hat, Ubuntu, and/or the like); and/or the like operating systems. However, more limited and/or less secure operating systems also may be employed such as Apple Macintosh OS, IBM OS/2, Microsoft DOS, Microsoft Windows 2000/2003/3.1/95/98/CE/Millenium/Mobile/NT/Vista/XP (Server), Palm OS, and/or the like. Additionally, for robust mobile deployment applications, mobile operating systems may be used, such as: Apple's iOS; China Operating System COS; Google's Android; Microsoft Windows RT/Phone; Palm's WebOS; Samsung/Intel's Tizen; and/or the like. An operating system may communicate to and/or with other components in a component collection, including itself, and/or the like. Most frequently, the operating system communicates with other program components, user interfaces, and/or the like. For example, the operating system may contain, communicate, generate, obtain, and/or provide program component, system, user, and/or data communications, requests, and/or responses. The operating system, once executed by the CPU, may enable the interaction with communications networks, data, I/O, peripheral devices, program components, memory, user input devices, and/or the like. The operating system may provide communications protocols that allow the UDRCD controller to communicate with other entities through a communications network 2813. Various communication protocols may be used by the UDRCD controller as a subcarrier transport mechanism for interaction, such as, but not limited to: multicast, TCP/IP, UDP, unicast, and/or the like.

Information Server

An information server component 2816 is a stored program component that is executed by a CPU. The information server may be a conventional Internet information server such as, but not limited to Apache Software Foundation's Apache, Microsoft's Internet Information Server, and/or the like. The information server may allow for the execution of program components through facilities such as Active Server Page (ASP), ActiveX, (ANSI) (Objective-) C (++), C # and/or .NET, Common Gateway Interface (CGI) scripts, dynamic (D) hypertext markup language (HTML), FLASH, Java, JavaScript, Practical Extraction Report Language (PERL), Hypertext Pre-Processor (PHP), pipes, Python, wireless application protocol (WAP), WebObjects, and/or the like. The information server may support secure communications protocols such as, but not limited to, File Transfer Protocol (FTP); HyperText Transfer Protocol (HTTP); Secure Hypertext Transfer Protocol (HTTPS), Secure Socket Layer (SSL), messaging protocols (e.g., America Online (AOL) Instant Messenger (AIM), Application Exchange (APEX), ICQ, Internet Relay Chat (IRC), Microsoft Network (MSN) Messenger Service, Presence and Instant Messaging Protocol (PRIM), Internet Engineering Task Force's (IETF's) Session Initiation Protocol (SIP), SIP for Instant Messaging and Presence Leveraging Extensions (SIMPLE), open XML-based Extensible Messaging and Presence Protocol (XMPP) (i.e., Jabber or Open Mobile Alliance's (OMA's) Instant Messaging and Presence Service (IMPS)), Yahoo! Instant Messenger Service, and/or the like. The a information server provides results in the form of Web pages to Web browsers, and allows for the manipulated generation of the Web pages through interaction with other program components. After a Domain Name System (DNS) resolution portion of an HTTP request is resolved to a particular information server, the information server resolves requests for information at specified locations on the UDRCD controller based on the remainder of the HTTP request. For example, a request such as http://123.124.125.126/myInformation.html might have the IP portion of the request "123.124.125.126" resolved by a DNS server to an information server at that IP address; that information server might in turn further parse the http request for the "/myInformation.html" portion of the request and resolve it to a location in memory containing the information "myInformation.html." Additionally, other information serving protocols may be employed across various ports, e.g., FTP communications across port 21, and/or the like. An information server may communicate to and/or with other components in a component collection, including itself, and/or facilities of the like. Most frequently, the information server communicates with the UDRCD database 2819, operating systems, other program components, user interfaces, Web browsers, and/or the like.

Access to the UDRCD database may be achieved through a number of database bridge mechanisms such as through scripting languages as enumerated below (e.g., CGI) and through inter-application communication channels as enumerated below (e.g., CORBA, WebObjects, etc.). Any data requests through a Web browser are parsed through the bridge mechanism into appropriate grammars as required by the UDRCD. In one embodiment, the information server would provide a Web form accessible by a Web browser. Entries made into supplied fields in the Web form are tagged as having been entered into the particular fields, and parsed as such. The entered terms are then passed along with the field tags, which act to instruct the parser to generate queries directed to appropriate tables and/or fields. In one embodiment, the parser may generate queries in standard SQL by instantiating a search string with the proper join/select commands based on the tagged text entries, wherein the resulting command is provided over the bridge mechanism to the UDRCD as a query. Upon generating query results from the query, the results are passed over the bridge mechanism, and may be parsed for formatting and generation of a new results Web page by the bridge mechanism. Such a new results Web page is then provided to the information server, which may supply it to the requesting Web browser.

Also, an information server may contain, communicate, generate, obtain, and/or provide program component, system, user, and/or data communications, requests, and/or responses.

User Interface

Computer interfaces in some respects are similar to automobile operation interfaces. Automobile operation interface elements such as steering wheels, gearshifts, and speedometers facilitate the access, operation, and display of automobile resources, and status. Computer interaction interface elements such as check boxes, cursors, menus, scrollers, and windows (collectively and commonly referred to as widgets) similarly facilitate the access, capabilities, operation, and display of data and computer hardware and operating system resources, and status. Operation interfaces are commonly called user interfaces. Graphical user interfaces (GUIs) such as the Apple's iOS, Macintosh Operating System's Aqua; IBM's OS/2; Google's Chrome (e.g., and other webbrowser/cloud based client OSs); Microsoft's Windows varied UIs 2000/2003/3.1/95/98/CE/Millenium/Mobile/NT/Vista/XP (Server) (i.e., Aero, Surface, etc.); Unix's X-Windows (e.g., which may include additional Unix graphic interface libraries and layers such as K Desktop Environment (KDE), mythTV and GNU Network Object Model Environment (GNOME)), web interface libraries (e.g., ActiveX, AJAX, (D)HTML, FLASH, Java, JavaScript, etc. interface libraries such as, but not limited to, Dojo, jQuery(UI), MooTools, Prototype, script.aculo.us, SWFObject, Yahoo! User Interface, any of which may be used and) provide a baseline and means of accessing and displaying information graphically to users.

A user interface component 2817 is a stored program component that is executed by a CPU. The user interface may be a conventional graphic user interface as provided by, with, and/or atop operating systems and/or operating environments such as already discussed. The user interface may allow for the display, execution, interaction, manipulation, and/or operation of program components and/or system facilities through textual and/or graphical facilities. The user interface provides a facility through which users may affect, interact, and/or operate a computer system. A user interface may communicate to and/or with other components in a component collection, including itself, and/or facilities of the like. Most frequently, the user interface communicates with operating systems, other program components, and/or the like. The user interface may contain, communicate, generate, obtain, and/or provide program component, system, user, and/or data communications, requests, and/or responses.

Web Browser

A Web browser component 2818 is a stored program component that is executed by a CPU. The Web browser may be a conventional hypertext viewing application such as Apple's (mobile) Safari, Google's Chrome, Microsoft Internet Explorer, Mozilla's Firefox, Netscape Navigator, and/or the like. Secure Web browsing may be supplied with 128 bit (or greater) encryption by way of HTTPS, SSL, and/or the like. Web browsers allowing for the execution of program components through facilities such as ActiveX, AJAX, (D)HTML, FLASH, Java, JavaScript, web browser plug-in APIs (e.g., FireFox, Safari Plug-in, and/or the like APIs), and/or the like. Web browsers and like information access tools may be integrated into PDAs, cellular telephones, and/or other mobile devices. A Web browser may communicate to and/or with other components in a component collection, including itself, and/or facilities of the like. Most frequently, the Web browser communicates with information servers, operating systems, integrated program components (e.g., plug-ins), and/or the like; e.g., it may contain, communicate, generate, obtain, and/or provide program component, system, user, and/or data communications, requests, and/or responses. Also, in place of a Web browser and information server, a combined application may be developed to perform similar operations of both. The combined application would similarly affect the obtaining and the provision of information to users, user agents, and/or the like from the UDRCD enabled nodes. The combined application may be nugatory on systems employing standard Web browsers.

Mail Server

A mail server component 2821 is a stored program component that is executed by a CPU 2803. The mail server may be a conventional Internet mail server such as, but not limited to: dovecot, Courier IMAP, Cyrus IMAP, Maildir, Microsoft Exchange, sendmail, and/or the like. The mail server may allow for the execution of program components through facilities such as ASP, ActiveX, (ANSI) (Objective-) C (++), C # and/or .NET, CGI scripts, Java, JavaScript, PERL, PHP, pipes, Python, WebObjects, and/or the like. The mail server may support communications protocols such as, but not limited to: Internet message access protocol (IMAP), Messaging Application Programming Interface (MAPI)/Microsoft Exchange, post office protocol (POP3), simple mail transfer protocol (SMTP), and/or the like. The mail server can route, forward, and process incoming and outgoing mail messages that have been sent, relayed and/or otherwise traversing through and/or to the UDRCD. Alternatively, the mail server component may be distributed out to mail service providing entities such as Google's cloud services (e.g., Gmail and notifications may alternatively be provided via messenger services such as AOL's Instant Messenger, Apple's iMessage, Google Messenger, SnapChat, etc.).

Access to the UDRCD mail may be achieved through a number of APIs offered by the individual Web server components and/or the operating system.

Also, a mail server may contain, communicate, generate, obtain, and/or provide program component, system, user, and/or data communications, requests, information, and/or responses.

Mail Client

A mail client component 2822 is a stored program component that is executed by a CPU 2803. The mail client may be a conventional mail viewing application such as Apple Mail, Microsoft Entourage, Microsoft Outlook, Microsoft Outlook Express, Mozilla, Thunderbird, and/or the like. Mail clients may support a number of transfer protocols, such as: IMAP, Microsoft Exchange, POP3, SMTP, and/or the like. A mail client may communicate to and/or with other components in a component collection, including itself, and/or facilities of the like. Most frequently, the mail client communicates with mail servers, operating systems, other mail clients, and/or the like; e.g., it may contain, communicate, generate, obtain, and/or provide program component, system, user, and/or data communications, requests, information, and/or responses. Generally, the mail client provides a facility to compose and transmit electronic mail messages.

Cryptographic Server

A cryptographic server component 2820 is a stored program component that is executed by a CPU 2803, cryptographic processor 2826, cryptographic processor interface 2827, cryptographic processor device 2828, and/or the like. Cryptographic processor interfaces will allow for expedition of encryption and/or decryption requests by the cryptographic component; however, the cryptographic component, alternatively, may run on a conventional CPU. The cryptographic component allows for the encryption and/or decryption of provided data. The cryptographic component allows for both symmetric and asymmetric (e.g., Pretty Good Protection (PGP)) encryption and/or decryption. The cryptographic component may employ cryptographic techniques such as, but not limited to: digital certificates (e.g., X.509 authentication framework), digital signatures, dual signatures, enveloping, password access protection, public key management, and/or the like. The cryptographic component will u facilitate numerous (encryption and/or decryption) security protocols such as, but not limited to: checksum, Data Encryption Standard (DES), Elliptical Curve Encryption (ECC), International Data Encryption Algorithm (IDEA), Message Digest 5 (MD5, which is a one way hash operation), passwords, Rivest Cipher (RC5), Rijndael, RSA (which is an Internet encryption and authentication system that uses an algorithm developed in 1977 by Ron Rivest, Adi Shamir, and Leonard Adleman), Secure Hash Algorithm (SHA), Secure Socket Layer (SSL), Secure Hypertext Transfer Protocol (HTTPS), Transport Layer Security (TLS), and/or the like. Employing such encryption security protocols, the UDRCD may encrypt all incoming and/or outgoing communications and may serve as node within a virtual private network (VPN) with a wider communications network. The cryptographic component facilitates the process of "security authorization" whereby access to a resource is inhibited by a security protocol wherein the cryptographic component effects authorized access to the secured resource. In addition, the cryptographic component may provide unique identifiers of content, e.g., employing and MD5 hash to obtain a unique signature for an digital audio file. A cryptographic component may communicate to and/or with other components in a component collection, including itself, and/or facilities of the like. The cryptographic component supports encryption schemes allowing for the secure transmission of information across a communications network to enable the UDRCD component to engage in secure transactions if so desired. The cryptographic component facilitates the secure accessing of resources on the UDRCD and facilitates the access of secured resources on remote systems; i.e., it may act as a client and/or server of secured resources. Most frequently, the cryptographic component communicates with information servers, operating systems, other program components, and/or the like. The cryptographic component may contain, communicate, generate, obtain, and/or provide program component, system, user, and/or data communications, requests, and/or responses.

The UDRCD Database

The UDRCD database component 2819 may be embodied in a database and its stored data. The database is a stored program component, which is executed by the CPU; the stored program component portion configuring the CPU to process the stored data. The database may be a conventional, fault tolerant, relational, scalable, secure database such as MySQL, Oracle, Sybase, etc. may be used. Additionally, optimized fast memory and distributed databases such as IBM's Netezza, MongoDB's MongoDB, opensource Hadoop, opensource VoltDB, SAP's Hana, etc. Relational databases are an extension of a flat file. Relational databases consist of a series of related tables. The tables are interconnected via a key field. Use of the key field allows the combination of the tables by indexing against the key field; i.e., the key fields act as dimensional pivot points for combining information from various tables. Relationships generally identify links maintained between tables by matching primary keys. Primary keys represent fields that uniquely identify the rows of a table in a relational database. Alternative key fields may be used from any of the fields having unique value sets, and in some alternatives, even non-unique values in combinations with other fields. More precisely, they uniquely identify rows of a table on the "one" side of a one-to-many relationship.

Alternatively, the UDRCD database may be implemented using various standard data-structures, such as an array, hash, (linked) list, struct, structured text file (e.g., XML), table, and/or the like. Such data-structures may be stored in memory and/or in (structured) files. In another alternative, an object-oriented database may be used, such as Frontier, ObjectStore, Poet, Zope, and/or the like. Object databases can include a number of object collections that are grouped and/or linked together by common attributes; they may be related to other object collections by some common attributes. Object-oriented databases perform similarly to relational databases with the exception that objects are not just pieces of data but may have other types of capabilities encapsulated within a given object. If the UDRCD database is implemented as a data-structure, the use of the UDRCD database 2819 may be integrated into another component such as the UDRCD component 2835. Also, the database may be implemented as a mix of data structures, objects, and relational structures. Databases may be in consolidated and/or distributed in countless variations (e.g., see Distributed UDRCD below). Portions of databases, e.g., tables, may be exported and/or imported and thus decentralized and/or integrated.

In one embodiment, the database component 2819 includes several tables 2819*a-l*:

An accounts table 2819*a* includes fields such as, but not limited to: an accountID, accountOwnerID, accountContactID, assetIDs, deviceIDs, paymentIDs, transactionIDs, userIDs, accountType (e.g., agent, entity (e.g., corporate, non-profit, partnership, etc.), individual, etc.), accountCreationDate, accountUpdateDate, accountName, accountNumber, routingNumber, linkWalletsID, accountPrioritAccountRatio, accountAddress, accountState, accountZIPcode, accountCountry, accountEmail, accountPhone, accountAuthKey, accountIPaddress, accountURLAccessCode, accountPortNo, accountAuthorizationCode, accountAccessPrivileges, accountPreferences, accountRestrictions, and/or the like;

A users table 2819*b* includes fields such as, but not limited to: a userID, userSSN, taxID, userContactID, accountID, assetIDs, deviceIDs, paymentIDs, transactionIDs, userType (e.g., agent, entity (e.g., corporate, non-profit, partnership, etc.), individual, etc.), namePrefix, firstName, middleName, lastName, nameSuffix, DateOfBirth, userAge, userName, userEmail, userSocialAccountID, contactType, contactRelationship, userPhone, userAddress, userCity, userState, userZIPCode, userCountry, userAuthorizationCode, userAccessPrivilges, userPreferences, userRestrictions, and/or the like (the user table may support and/or track multiple entity accounts on a UDRCD);

An devices table 2819*c* includes fields such as, but not limited to: deviceID, sensorIDs, accountID, assetIDs, paymentIDs, deviceType, deviceName, deviceManufacturer, deviceModel, deviceVersion, deviceSerialNo, deviceIPaddress, deviceMACaddress, device_ECID, deviceUUID, deviceLocation, deviceCertificate, deviceOS, appIDs, deviceResources, deviceSession, authKey, deviceSecureKey, walletAppInstalledFlag, deviceAccessPrivileges, devicePreferences, deviceRestrictions, hardware_config, a software_config, storage_location, sensor_value, pin_reading, data_length, channel_requirement, sensor_name, sensor_model_no, sensor_manufacturer, sensor_type, sensor_serial_number, sensor_power_requirement, device_power_requirement, location, sensor_associated_tool, sensor_dimensions, device_dimensions, sensor_communications_type, device_communications_type, power_percentage, power_condition, temperature_setting, speed_adjust, hold_duration, part_actuation, and/or the like. Device table may, in some embodiments, include fields corresponding to one or more Bluetooth profiles, such as those published at https://www.bluetooth.org/en-us/specification/adopted-specifications, and/or other device specifications, and/or the like;

An apps table 2819*d* includes fields such as, but not limited to: appID, appName, appType, appDependencies, accountID, deviceIDs, transactionID, userID, appStoreAuthKey, appStoreAccountID, appStoreIPaddress, appStoreURLaccessCode, appStorePortNo, appAccessPrivileges, appPreferences, appRestrictions, portNum, access_API_call, linked_wallets_list, and/or the like;

An assets table 2819*e* includes fields such as, but not limited to: assetID, accountID, userID, distributorAccountID, distributorPaymentID, distributorOnwerID, assetOwnerID, assetType, assetSourceDeviceID, assetSourceDeviceType, assetSourceDeviceName, assetSourceDistributionChannelID, assetSourceDistributionChannelType, assetSourceDistributionChannelName, assetTargetChannelID, assetTargetChannelType, assetTargetChannelName, assetName, assetSeriesName, assetSeriesSeason, assetSeriesEpisode, assetCode, assetQuantity, assetCost, assetPrice, assetValue, assetManufactuer, assetModelNo, assetSerialNo, assetLocation, assetAddress, assetState, assetZIPcode, assetState, assetCountry, assetEmail, assetIPaddress, assetURLaccessCode, assetOwnerAccountID, subscriptionIDs, assetAuthroizationCode, assetAccessPrivileges, assetPreferences, assetRestrictions, assetAPI, assetAPIconnectionAddress, and/or the like;

A payments table 2819*f* includes fields such as, but not limited to: paymentID, accountID, userID, couponID, couponValue, couponConditions, couponExpiration, paymentType, paymentAccountNo, paymentAccountName, paymentAccountAuthorizationCodes, paymentExpirationDate, paymentCCV, paymentRoutingNo, paymentRoutingType, paymentAddress, paymentState, paymentZIPcode, paymentCountry, paymentEmail, paymentAuthKey, paymentIPaddress, paymentURLaccessCode, paymentPortNo, paymentAccessPrivileges, paymentPreferences, payementRestrictions, and/or the like;

An transactions table 2819*g* includes fields such as, but not limited to: transactionID, accountID, assetIDs, deviceIDs, paymentIDs, transactionIDs, userID, merchantID, transactionType, transactionDate, transactionTime, transactionAmount, transactionQuantity, transactionDetails, productsList, productType, productTitle, productsSummary, productParamsList, transactionNo, transactionAccessPrivileges, transactionPreferences, transactionRestrictions, merchantAuthKey, merchantAuthCode, and/or the like;

An merchants table 2819h includes fields such as, but not limited to: merchantID, merchantTaxID, merchanteName, merchantContactUserID, accountID, issuerID, acquirerID, merchantEmail, merchantAddress, merchantState, merchantZIPcode, merchantCountry, merchantAuthKey, merchantIPaddress, portNum, merchantURLaccessCode, merchantPortNo, merchantAccessPrivileges, merchantPreferences, merchantRestrictions, and/or the like;

An ads table 2819i includes fields such as, but not limited to: adID, advertiserID, adMerchantID, adNetworkID, adName, adTags, advertiserName, adSponsor, adTime, adGeo, adAttributes, adFormat, adProduct, adText, adMedia, adMediaID, adChannelID, adTagTime, adAudioSignature, adHash, adTemplateID, adTemplateData, adSourceID, adSourceName, adSourceServerIP, adSourceURL, adSourceSecurityProtocol, adSourceFTP, adAuthKey, adAccessPrivileges, adPreferences, adRestrictions, adNetworkXchangeID, adNetworkXchangeName, adNetworkXchangeCost, adNetworkXchangeMetricType (e.g., CPA, CPC, CPM, CTR, etc.), adNetworkXchangeMetricValue, adNetworkXchangeServer, adNetworkXchangePortNumber, publisherID, publisherAddress, publisherURL, publisherTag, publisherIndustry, publisherName, publisherDescription, siteDomain, siteURL, siteContent, siteTag, siteContext, siteImpression, siteVisits, siteHeadline, sitePage, siteAdPrice, sitePlacement, sitePosition, bidID, bidExchange, bidOS, bidTarget, bidTimestamp, bidPrice, bidImpressionID, bidType, bidScore, adType (e.g., mobile, desktop, wearable, largescreen, interstitial, etc.), assetID, merchantID, deviceID, userID, accountID, impressionID, impressionOS, impressionTimeStamp, impressionGeo, impressionAction, impressionType, impressionPublisherID, impressionPublisherURL, and/or the like;

An models table 2819j includes fields such as, but not limited to: modelID, modelAssociatedPlanSponsor, modelAssociatedPlanID, modelAssociatedLocality, modelAssociatedProviderNetwork, modelAssociatedPlanTerm, modelAssociatedPlanMemberType, atomizedConditionsData, atomizedProceduresData, coreInsuranceCoverageData, coreInsuranceCosts, addinsInsuranceCoverageData, addinsInsuranceCosts, and/or the like;

An members table 2819k includes fields such as, but not limited to: memberID, memberAssociatedPlanSponsor, memberAssociatedPlanID, memberProfile, memberClinicalData, memberPlanConfiguration, and/or the like.

An plans table 2819l includes fields such as, but not limited to: planID, planAssociatedPlanSponsor, planCoreCoverageData, planAvailableAddinsCoverageData, planAvailableTerms, planAvailableLocalities, planAvailableProviderNetworks, and/or the like.

In one embodiment, the UDRCD database may interact with other database systems. For example, employing a distributed database system, queries and data access by search UDRCD component may treat the combination of the UDRCD database, an integrated data security layer database as a single database entity (e.g., see Distributed UDRCD below).

In one embodiment, user programs may contain various user interface primitives, which may serve to update the UDRCD. Also, various accounts may require custom database tables depending upon the environments and the types of clients the UDRCD may need to serve. It should be noted that any unique fields may be designated as a key field throughout. In an alternative embodiment, these tables have been decentralized into their own databases and their respective database controllers (i.e., individual database controllers for each of the above tables). Employing standard data processing techniques, one may further distribute the databases over several computer systemizations and/or storage devices. Similarly, configurations of the decentralized database controllers may be varied by consolidating and/or distributing the various database components 2819a-l. The UDRCD may be configured to keep track of various settings, inputs, and parameters via database controllers.

The UDRCD database may communicate to and/or with other components in a component collection, including itself, and/or facilities of the like. Most frequently, the UDRCD database communicates with the UDRCD component, other program components, and/or the like. The database may contain, retain, and provide information regarding other nodes and data.

The UDRCDs

The UDRCD component 2835 is a stored program component that is executed by a CPU. In one embodiment, the UDRCD component incorporates any and/or all combinations of the aspects of the UDRCD that was discussed in the previous figures. As such, the UDRCD affects accessing, obtaining and the provision of information, services, transactions, and/or the like across various communications networks. The features and embodiments of the UDRCD discussed herein increase network efficiency by reducing data transfer requirements the use of more efficient data structures and mechanisms for their transfer and storage. As a consequence, more data may be transferred in less time, and latencies with regard to transactions, are also reduced. In many cases, such reduction in storage, transfer time, bandwidth requirements, latencies, etc., will reduce the capacity and structural infrastructure requirements to support the UDRCD's features and facilities, and in many cases reduce the costs, energy consumption/requirements, and extend the life of UDRCD's underlying infrastructure; this has the added benefit of making the UDRCD more reliable. Similarly, many of the features and mechanisms are designed to be easier for users to use and access, thereby broadening the audience that may enjoy/employ and exploit the feature sets of the UDRCD; such ease of use also helps to increase the reliability of the UDRCD. In addition, the feature sets include heightened security as noted via the Cryptographic components 2820, 2826, 2828 and throughout, making access to the features and data more reliable and secure The UDRCD transforms coverage enrollment request, event signal inputs, via UDRCD components (e.g., ACM, EF, UF), into coverage enrollment response, add-in recommendation outputs.

The UDRCD component enabling access of information between nodes may be a developed by employing standard development tools and languages such as, but not limited to: Apache components, Assembly, ActiveX, binary executables, (ANSI) (Objective-) C (++), C # and/or .NET, database adapters, CGI scripts, Java, JavaScript, mapping tools, procedural and object oriented development tools, PERL, PHP, Python, shell scripts, SQL commands, web application server extensions, web development environments and libraries (e.g., Microsoft's ActiveX; Adobe AIR, FLEX & FLASH; AJAX; (D)HTML; Dojo, Java; JavaScript; jQuery(UI); MooTools; Prototype; script.aculo.us; Simple Object Access Protocol (SOAP); SWFObject;

Yahoo! User Interface; and/or the like), WebObjects, and/or the like. In one embodiment, the UDRCD server employs a cryptographic server to encrypt and decrypt communications. The UDRCD component may communicate to and/or with other components in a component collection, including itself, and/or facilities of the like. Most frequently, the UDRCD component communicates with the UDRCD database, operating systems, other program components, and/or the like. The UDRCD may contain, communicate, generate, obtain, and/or provide program component, system, user, and/or data communications, requests, and/or responses.

Distributed UDRCDs

The structure and/or operation of any of the UDRCD node controller components may be combined, consolidated, and/or distributed in any number of ways to facilitate development and/or deployment. Similarly, the component collection may be combined in any number of ways to facilitate deployment and/or development. To accomplish this, one may integrate the components into a common code base or in a facility that can dynamically load the components on demand in an integrated fashion. As such a combination of hardware may be distributed within a location, within a region and/or globally where logical access to a controller may be abstracted as a singular node, yet where a multitude of private, semiprivate and publically accessible node controllers (e.g., via dispersed data centers) are coordinated to serve requests (e.g., providing private cloud, semi-private cloud, and public cloud computing resources) and allowing for the serving of such requests in discrete regions (e.g., isolated, local, regional, national, global cloud access).

The component collection may be consolidated and/or distributed in countless variations through standard data processing and/or development techniques. Multiple instances of any one of the program components in the program component collection may be instantiated on a single node, and/or across numerous nodes to improve performance through load-balancing and/or data-processing techniques. Furthermore, single instances may also be distributed across multiple controllers and/or storage devices; e.g., databases. All program component instances and controllers working in concert may do so through standard data processing communication techniques.

The configuration of the UDRCD controller will depend on the context of system deployment. Factors such as, but not limited to, the budget, capacity, location, and/or use of the underlying hardware resources may affect deployment requirements and configuration. Regardless of if the configuration results in more consolidated and/or integrated program components, results in a more distributed series of program components, and/or results in some combination between a consolidated and distributed configuration, data may be communicated, obtained, and/or provided. Instances of components consolidated into a common code base from the program component collection may communicate, obtain, and/or provide data. This may be accomplished through intra-application data processing communication techniques such as, but not limited to: data referencing (e.g., pointers), internal messaging, object instance variable communication, shared memory space, variable passing, and/or the like. For example, cloud services such as Amazon Data Services, Microsoft Azure, Hewlett Packard Helion, IBM Cloud services allow for UDRCD controller and/or UDRCD component collections to be hosted in full or partially for varying degrees of scale.

If component collection components are discrete, separate, and/or external to one another, then communicating, obtaining, and/or providing data with and/or to other component components may be accomplished through inter-application data processing communication techniques such as, but not limited to: Application Program Interfaces (API) information passage; (distributed) Component Object Model ((D)COM), (Distributed) Object Linking and Embedding ((D)OLE), and/or the like), Common Object Request Broker Architecture (CORBA), Jini local and remote application program interfaces, JavaScript Object Notation JSON), Remote Method Invocation (RMI), SOAP, process pipes, shared files, and/or the like. Messages sent between discrete component components for inter-application communication or within memory spaces of a singular component for intra-application communication may be facilitated through the creation and parsing of a grammar. A grammar may be developed by using development tools such as lex, yacc, XML, and/or the like, which allow for grammar generation and parsing capabilities, which in turn may form the basis of communication messages within and between components.

For example, a grammar may be arranged to recognize the tokens of an HTTP post command, e.g.:

w3c-post http:// . . . Value1 where Value1 is discerned as being a parameter because "http://" is part of the grammar syntax, and what follows is considered part of the post value. Similarly, with such a grammar, a variable "Value1" may be inserted into an "http://" post command and then sent. The grammar syntax itself may be presented as structured data that is interpreted and/or otherwise used to generate the parsing mechanism (e.g., a syntax description text file as processed by lex, yacc, etc.). Also, once the parsing mechanism is generated and/or instantiated, it itself may process and/or parse structured data such as, but not limited to: character (e.g., tab) delineated text, HTML, structured text streams, XML, and/or the like structured data. In another embodiment, inter-application data processing protocols themselves may have integrated and/or readily available parsers (e.g., JSON, SOAP, and/or like parsers) that may be employed to parse (e.g., communications) data. Further, the parsing grammar may be used beyond message parsing, but may also be used to parse: databases, data collections, data stores, structured data, and/or the like. Again, the desired configuration will depend upon the context, environment, and requirements of system deployment.

For example, in some implementations, the UDRCD controller may be executing a PHP script implementing a Secure Sockets Layer ("SSL") socket server via the information server, which listens to incoming communications on a server port to which a client may send data, e.g., data encoded in JSON format. Upon identifying an incoming communication, the PHP script may read the incoming message from the client device, parse the received JSON-encoded text data to extract information from the JSON-encoded text data into PHP script variables, and store the data (e.g., client identifying information, etc.) and/or extracted information in a relational database accessible using the Structured Query Language ("SQL"). An exemplary listing, written substantially in the form of PHP/SQL commands, to accept JSON-encoded input data from a client device via a SSL connection, parse the data to extract variables, and store the data to a database, is provided below:

```
<?PHP
header('Content-Type: text/plain');
//sel ip address and port to listen to for incoming data
$address='192.168.0.100';
```

```
    $port=255;
    //create a server-side SSL socket, listen for/accept incom-
ing communication
    $sock=socket_create(AF_INET, SOCK_STREAM, 0);
    socket_bind($sock, $address, $port) or die('Could not
bind to address');
    socket_listen($sock);
    $client=socket_accept($sock);
    //read input data from client device in 1024 byte blocks
until end of message do {
    $input="";
    $input=socket_read($client, 1024);
    $data.=$input;
    } while($input !="");
    //parse data to extract variables
    $obj=json_decode($data, true);
    //store input data in a database
    mysql_connect("201.408.185.132", $DBserver, $pass-
word); //access database server
    mysql_select("CLIENT_DB.SQL"); //select database to
append
    mysql_query("INSERT INTO UserTable (transmission)
VALUES ($data)"); //add data to UserTable table in a
CLIENT database
    mysql_close("CLIENT_DB.SQL"); //close connection to
database
    ?>
```

Also, the following resources may be used to provide example embodiments regarding SOAP parser implementation:

http://www.xav.com/perl/site/lib/SOAP/Parser.html
http://publib.boulder.ibm.com/infocenter/tivihelp/v2r1/index.jsp?topic=/com.ibm.I BMDI.doc/referenceguide295.htm
and other parser implementations:
http://publib.boulder.ibm.com/infocenter/tivihelp/v2r1/index.jsp?topic=/com.ibm.I BMDI.doc/referenceguide259.htm
all of which are hereby expressly incorporated by reference.

Additional embodiments may include:

1. A coverage enrollment facilitating apparatus, comprising:
a memory;
a component collection in the memory, including:
    an enrollment facilitating component;
a processor disposed in communication with the memory, and configured to issue a plurality of processing instructions from the component collection stored in the memory,
    wherein the processor issues instructions from the enrollment facilitating component, stored in the a memory, to:
        obtain, via at least one processor, a coverage enrollment request from a user;
        determine, via at least one processor, a plan sponsor associated with the user;
        retrieve, via at least one processor, plan sponsor settings associated with the plan sponsor and the user, wherein the plan sponsor settings include atomized condition classification settings, atomized procedure classification settings, and subsidization settings;
        configure, via at least one processor, available options for an enrollment user interface based on the plan sponsor settings;
        obtain, via the enrollment user interface, copay setting selections for individual core coverage services, from the available options, of the user;
        obtain, via the enrollment user interface, atomized condition add-in selections, from the available options, of the user;
        obtain, via the enrollment user interface, atomized procedure add-in selections, from the available options, of the user;
        determine, via at least one processor, associated modeling data based on the plan sponsor settings and the obtained copay setting selections, atomized condition add-in selections, and atomized procedure add-in selections;
        calculate, via at least one processor, a core coverage cost using the associated modeling data;
        calculate, via at least one processor, add-in coverage costs, for each of the selected atomized condition add-in and each of the selected atomized procedure add-in, using the associated modeling data;
        calculate, via at least one processor, a user cost for the user based on the core coverage cost, the subsidization settings for the core coverage cost, the add-in coverage costs, and the subsidization settings for the add-in coverage costs; and
        configure, via at least one processor, the enrollment user interface to display the calculated user cost for the user.

2. The apparatus of embodiment 1, further comprising:
the processor issues instructions from the enrollment facilitating component, stored in the memory, to:
    facilitate, via at least one processor, enrollment of the user into a plan that includes the core coverage, and add-ins coverage for the selected atomized condition add-ins and the selected atomized procedure add-ins.

3. The apparatus of embodiment 2, further comprising:
the processor issues instructions from the enrollment facilitating component, stored in the memory, to:
    facilitate, via at least one processor, enrollment of the user into additional add-ins at any time during a plan term associated with the plan.

4. The apparatus of embodiment 1, wherein the plan sponsor settings include available plan terms.

5. The apparatus of embodiment 4, wherein a plan term is any of: days, weeks, months, yearly, multi-yearly.

6. The apparatus of embodiment 4, wherein the associated modeling data is determined based on a plan term selected by the user from the available plan terms.

7. The apparatus of embodiment 1, wherein the plan sponsor settings include available provider networks.

8. The apparatus of embodiment 7, wherein the associated modeling data is determined based on a set of provider networks selected by the user from the available provider networks.

9. The apparatus of embodiment 1, wherein the subsidization settings specify a first subsidization amount or percentage for the core coverage and a second subsidization amount or percentage for add-ins coverage.

10. The apparatus of embodiment 1, wherein the subsidization settings specify an individual subsidization amount or percentage for each add-in.

11. The apparatus of embodiment 1, wherein the available options associated with an atomized condition add-in include a plurality of available procedure options.

12. The apparatus of embodiment 1, wherein the available options associated with an atomized procedure add-in include a plurality of available provider options.

13. The apparatus of embodiment 12, wherein the available provider options are determined based on proximity of providers to the user's location.

14. The apparatus of embodiment 1, wherein a coverage cost associated with an atomized condition add-in is calculated based on disease progression probabilities associated with a corresponding atomized condition.
15. The apparatus of embodiment 1, wherein the user cost is a pay period deduction.
16. A processor-readable coverage enrollment facilitating non-transient physical medium storing processor-executable components, the components, comprising:
a component collection stored in the medium, including:
an enrollment facilitating component;
wherein the enrollment facilitating component, stored in the medium, includes processor-issuable instructions to:
obtain, via at least one processor, a coverage enrollment request from a user;
determine, via at least one processor, a plan sponsor associated with the user;
retrieve, via at least one processor, plan sponsor settings associated with the plan sponsor and the user, wherein the plan sponsor settings include atomized condition classification settings, atomized procedure classification settings, and subsidization settings;
configure, via at least one processor, available options for an enrollment user interface based on the plan sponsor settings;
obtain, via the enrollment user interface, copay setting selections for individual core coverage services, from the available options, of the user;
obtain, via the enrollment user interface, atomized condition add-in selections, from the available options, of the user;
obtain, via the enrollment user interface, atomized procedure add-in selections, from the available options, of the user;
determine, via at least one processor, associated modeling data based on the plan sponsor settings and the obtained copay setting selections, atomized condition add-in selections, and atomized procedure add-in selections;
calculate, via at least one processor, a core coverage cost using the associated modeling data;
calculate, via at least one processor, add-in coverage costs, for each of the selected atomized condition add-in and each of the selected atomized procedure add-in, using the associated modeling data;
calculate, via at least one processor, a user cost for the user based on the core coverage cost, the subsidization settings for the core coverage cost, the add-in coverage costs, and the subsidization settings for the add-in coverage costs; and
configure, via at least one processor, the enrollment user interface to display the calculated user cost for the user.
17. The medium of embodiment 16, further comprising:
the enrollment facilitating component, stored in the medium, includes processor-issuable instructions to:
facilitate, via at least one processor, enrollment of the user into a plan that includes the core coverage, and add-ins coverage for the selected atomized condition add-ins and the selected atomized procedure add-ins.
18. The medium of embodiment 17, further comprising:
the enrollment facilitating component, stored in the medium, includes processor-issuable instructions to:
facilitate, via at least one processor, enrollment of the user into additional add-ins at any time during a plan term associated with the plan.
19. The medium of embodiment 16, wherein the plan sponsor settings include available plan terms.
20. The medium of embodiment 19, wherein a plan term is any of: days, weeks, months, yearly, multi-yearly.
21. The medium of embodiment 19, wherein the associated modeling data is determined based on a plan term selected by the user from the available plan terms.
22. The medium of embodiment 16, wherein the plan sponsor settings include available provider networks.
23. The medium of embodiment 22, wherein the associated modeling data is determined based on a set of provider networks selected by the user from the available provider networks.
24. The medium of embodiment 16, wherein the subsidization settings specify a first subsidization amount or percentage for the core coverage and a second subsidization amount or percentage for add-ins coverage.
25. The medium of embodiment 16, wherein the subsidization settings specify an individual subsidization amount or percentage for each add-in.
26. The medium of embodiment 16, wherein the available options associated with an atomized condition add-in include a plurality of available procedure options.
27. The medium of embodiment 16, wherein the available options associated with an atomized procedure add-in include a plurality of available provider options.
28. The medium of embodiment 27, wherein the available provider options are determined based on proximity of providers to the user's location.
29. The medium of embodiment 16, wherein a coverage cost associated with an atomized condition add-in is calculated based on disease progression probabilities associated with a corresponding atomized condition.
30. The medium of embodiment 16, wherein the user cost is a pay period deduction.
31. A processor-implemented coverage enrollment facilitating system, comprising:
an enrollment facilitating component means, to:
obtain, via at least one processor, a coverage enrollment request from a user;
determine, via at least one processor, a plan sponsor associated with the user;
retrieve, via at least one processor, plan sponsor settings associated with the plan sponsor and the user, wherein the plan sponsor settings include atomized condition classification settings, atomized procedure classification settings, and subsidization settings;
configure, via at least one processor, available options for an enrollment user interface based on the plan sponsor settings;
obtain, via the enrollment user interface, copay setting selections for individual core coverage services, from the available options, of the user;
obtain, via the enrollment user interface, atomized condition add-in selections, from the available options, of the user;
obtain, via the enrollment user interface, atomized procedure add-in selections, from the available options, of the user;
determine, via at least one processor, associated modeling data based on the plan sponsor settings and the obtained copay setting selections, atomized condition add-in selections, and atomized procedure add-in selections;
calculate, via at least one processor, a core coverage cost using the associated modeling data;

calculate, via at least one processor, add-in coverage costs, for each of the selected atomized condition add-in and each of the selected atomized procedure add-in, using the associated modeling data;

calculate, via at least one processor, a user cost for the user based on the core coverage cost, the subsidization settings for the core coverage cost, the add-in coverage costs, and the subsidization settings for the add-in coverage costs; and configure, via at least one processor, the enrollment user interface to display the calculated user cost for the user.

32. The system of embodiment 31, further comprising:
the enrollment facilitating component means, to:
facilitate, via at least one processor, enrollment of the user into a plan that includes the core coverage, and add-ins coverage for the selected atomized condition add-ins and the selected atomized procedure add-ins.

33. The system of embodiment 32, further comprising:
the enrollment facilitating component means, to:
facilitate, via at least one processor, enrollment of the user into additional add-ins at any time during a plan term associated with the plan.

34. The system of embodiment 31, wherein the plan sponsor settings include available plan terms.

35. The system of embodiment 34, wherein a plan term is any of: days, weeks, months, yearly, multi-yearly.

36. The system of embodiment 34, wherein the associated modeling data is determined based on a plan term selected by the user from the available plan terms.

37. The system of embodiment 31, wherein the plan sponsor settings include available provider networks.

38. The system of embodiment 37, wherein the associated modeling data is determined based on a set of provider networks selected by the user from the available provider networks.

39. The system of embodiment 31, wherein the subsidization settings specify a first subsidization amount or percentage for the core coverage and a second subsidization amount or percentage for add-ins coverage.

40. The system of embodiment 31, wherein the subsidization settings specify an individual subsidization amount or percentage for each add-in.

41. The system of embodiment 31, wherein the available options associated with an atomized condition add-in include a plurality of available procedure options.

42. The system of embodiment 31, wherein the available options associated with an atomized procedure add-in include a plurality of available provider options.

43. The system of embodiment 42, wherein the available provider options are determined based on proximity of providers to the user's location.

44. The system of embodiment 31, wherein a coverage cost associated with an atomized condition add-in is calculated based on disease progression probabilities associated with a corresponding atomized condition.

45. The system of embodiment 31, wherein the user cost is a pay period deduction.

46. A processor-implemented coverage enrollment facilitating method, comprising:
executing processor-implemented enrollment facilitating component instructions to:
obtain, via at least one processor, a coverage enrollment request from a user;
determine, via at least one processor, a plan sponsor associated with the user;
retrieve, via at least one processor, plan sponsor settings associated with the plan sponsor and the user, wherein the plan sponsor settings include atomized condition classification settings, atomized procedure classification settings, and subsidization settings;
configure, via at least one processor, available options for an enrollment user interface based on the plan sponsor settings;
obtain, via the enrollment user interface, copay setting selections for individual core coverage services, from the available options, of the user;
obtain, via the enrollment user interface, atomized condition add-in selections, from the available options, of the user;
obtain, via the enrollment user interface, atomized procedure add-in selections, from the available options, of the user;
determine, via at least one processor, associated modeling data based on the plan sponsor settings and the obtained copay setting selections, atomized condition add-in selections, and atomized procedure add-in selections;
calculate, via at least one processor, a core coverage cost using the associated modeling data;
calculate, via at least one processor, add-in coverage costs, for each of the selected atomized condition add-in and each of the selected atomized procedure add-in, using the associated modeling data;
calculate, via at least one processor, a user cost for the user based on the core coverage cost, the subsidization settings for the core coverage cost, the add-in coverage costs, and the subsidization settings for the add-in coverage costs; and
configure, via at least one processor, the enrollment user interface to display the calculated user cost for the user.

47. The method of embodiment 46, further comprising:
executing processor-implemented enrollment facilitating component instructions to:
facilitate, via at least one processor, enrollment of the user into a plan that includes the core coverage, and add-ins coverage for the selected atomized condition add-ins and the selected atomized procedure add-ins.

48. The method of embodiment 47, further comprising:
executing processor-implemented enrollment facilitating component instructions to:
facilitate, via at least one processor, enrollment of the user into additional add-ins at any time during a plan term associated with the plan.

49. The method of embodiment 46, wherein the plan sponsor settings include available plan terms.

50. The method of embodiment 49, wherein a plan term is any of: days, weeks, months, yearly, multi-yearly.

51. The method of embodiment 49, wherein the associated modeling data is determined based on a plan term selected by the user from the available plan terms.

52. The method of embodiment 46, wherein the plan sponsor settings include available provider networks.

53. The method of embodiment 52, wherein the associated modeling data is determined based on a set of provider networks selected by the user from the available provider networks.

54. The method of embodiment 46, wherein the subsidization settings specify a first subsidization amount or percentage for the core coverage and a second subsidization amount or percentage for add-ins coverage.

55. The method of embodiment 46, wherein the subsidization settings specify an individual subsidization amount or percentage for each add-in.
56. The method of embodiment 46, wherein the available options associated with an atomized condition add-in include a plurality of available procedure options.
57. The method of embodiment 46, wherein the available options associated with an atomized procedure add-in include a plurality of available provider options.
58. The method of embodiment 57, wherein the available provider options are determined based on proximity of providers to the user's location.
59. The method of embodiment 46, wherein a coverage cost associated with an atomized condition add-in is calculated based on disease progression probabilities associated with a corresponding atomized condition.
60. The method of embodiment 46, wherein the user cost is a pay period deduction.
101. An add-in upgrade enrollment facilitating apparatus, comprising:
a memory;
a component collection in the memory, including:
an upgrade facilitating component;
a processor disposed in communication with the memory, and configured to issue a plurality of processing instructions from the component collection stored in the memory,
wherein the processor issues instructions from the upgrade facilitating component, stored in the memory, to:
obtain, via at least one processor, an event signal associated with a plan member enrolled into a plan that includes a core coverage component and an add-ins coverage component;
retrieve, via at least one processor, plan member data associated with the plan member;
determine, via at least one processor, a condition or procedure associated with the event signal based on event signal data associated with the event signal;
determine, via at least one processor, that an atomized add-in upgrade that provides coverage for the determined condition or procedure is available to the plan member;
determine, via at least one processor, an atomized add-in recommendation for the plan member, wherein the atomized add-in recommendation includes a set of atomized add-in options;
provide, via an enrollment user interface, the atomized add-in recommendation to the plan member;
obtain, via the enrollment user interface, a selection of an atomized add-in from the plan member; and
facilitate, via at least one processor, addition of the selected atomized add-in to the add-ins coverage component of the plan.
102. The apparatus of embodiment 101, further comprising:
the processor issues instructions from the upgrade facilitating component, stored in the memory, to:
determine, via at least one processor, that here is an outstanding claim associated with the plan member that benefits from the addition of the selected atomized add-in to the add-ins coverage component; and
facilitate, via at least one processor, processing the outstanding claim based on coverage provided by the selected atomized add-in.
103. The apparatus of embodiment 101, wherein the event signal is one of: a coverage search by the plan member, a health care electronic data interchange transaction associated with the plan member, an electronic health information message associated with the plan member.
104. The apparatus of embodiment 101, wherein the event signal comprises a plurality of event signals, and wherein the condition or procedure associated with the event signal is determined based on a combination of event signal data from the plurality of event signals.
105. The apparatus of embodiment 101, wherein the plan member data includes at least one of: profile data associated with the plan member, clinical data associated with the plan member, plan configuration of the plan.
106. The apparatus of embodiment 105, wherein the condition or procedure associated with the event signal is determined also based on the clinical data associated with the plan member.
107. The apparatus of embodiment 105, wherein the atomized add-in recommendation is determined also based on the plan configuration of the plan.
108. The apparatus of embodiment 105, wherein the determination that the atomized add-in upgrade is available is determined also based on the profile data associated with the plan member.
109. The apparatus of embodiment 101, wherein the determination that the atomized add-in upgrade is available is made based on the determination that the core coverage component does not provide coverage for the determined condition or procedure, and that the add-ins coverage component does not provide coverage for the determined condition or procedure.
110. The apparatus of embodiment 101, wherein the determination that the atomized add-in upgrade is available is made based on the determination that a chronic condition add-in upgrade is beneficial for the plan member.
111. The apparatus of embodiment 101, wherein the set of atomized add-in options includes a plurality of available procedure add-in options.
112. The apparatus of embodiment 111, wherein the available procedure add-in options are determined based on care efficacy of procedures.
113. The apparatus of embodiment 101, wherein the set of atomized add-in options include a plurality of available provider add-in options.
114. The apparatus of embodiment 113, wherein the available provider add-in options are determined based on proximity of providers to the plan member's location.
115. The apparatus of embodiment 101, wherein the selected atomized add-in is associated with a payroll deduction cost and with a copay cost.
116. A processor-readable add-in upgrade enrollment facilitating non-transient physical medium a storing processor-executable components, the components, comprising:
a component collection stored in the medium, including:
an upgrade facilitating component;
wherein the upgrade facilitating component, stored in the medium, includes processor-issuable instructions to:
obtain, via at least one processor, an event signal associated with a plan member enrolled into a plan that includes a core coverage component and an add-ins coverage component;
retrieve, via at least one processor, plan member data associated with the plan member;
determine, via at least one processor, a condition or procedure associated with the event signal based on event signal data associated with the event signal;

determine, via at least one processor, that an atomized add-in upgrade that provides coverage for the determined condition or procedure is available to the plan member;

determine, via at least one processor, an atomized add-in recommendation for the plan member, wherein the atomized add-in recommendation includes a set of atomized add-in options;

provide, via an enrollment user interface, the atomized add-in recommendation to the plan member;

obtain, via the enrollment user interface, a selection of an atomized add-in from the plan member; and facilitate, via at least one processor, addition of the selected atomized add-in to the add-ins coverage component of the plan.

117. The medium of embodiment 116, further comprising:
the upgrade facilitating component, stored in the medium, includes processor-issuable instructions to:
determine, via at least one processor, that here is an outstanding claim associated with the plan member that benefits from the addition of the selected atomized add-in to the add-ins coverage component; and
facilitate, via at least one processor, processing the outstanding claim based on coverage provided by the selected atomized add-in.

118. The medium of embodiment 116, wherein the event signal is one of: a coverage search by the plan member, a health care electronic data interchange transaction associated with the plan member, an electronic health information message associated with the plan member.

119. The medium of embodiment 116, wherein the event signal comprises a plurality of event signals, and wherein the condition or procedure associated with the event signal is determined based on a combination of event signal data from the plurality of event signals.

120. The medium of embodiment 116, wherein the plan member data includes at least one of: profile data associated with the plan member, clinical data associated with the plan member, plan configuration of the plan.

121. The medium of embodiment 120, wherein the condition or procedure associated with the event signal is determined also based on the clinical data associated with the plan member.

122. The medium of embodiment 120, wherein the atomized add-in recommendation is determined also based on the plan configuration of the plan.

123. The medium of embodiment 120, wherein the determination that the atomized add-in upgrade is available is determined also based on the profile data associated with the plan member.

124. The medium of embodiment 116, wherein the determination that the atomized add-in upgrade is available is made based on the determination that the core coverage component does not provide coverage for the determined condition or procedure, and that the add-ins coverage component does not provide coverage for the determined condition or procedure.

125. The medium of embodiment 116, wherein the determination that the atomized add-in upgrade is available is made based on the determination that a chronic condition add-in upgrade is beneficial for the plan member.

126. The medium of embodiment 116, wherein the set of atomized add-in options includes a plurality of available procedure add-in options.

127. The medium of embodiment 126, wherein the available procedure add-in options are determined based on care efficacy of procedures.

128. The medium of embodiment 116, wherein the set of atomized add-in options include a plurality of available provider add-in options.

129. The medium of embodiment 128, wherein the available provider add-in options are determined based on proximity of providers to the plan member's location.

130. The medium of embodiment 116, wherein the selected atomized add-in is associated with a payroll deduction cost and with a copay cost.

131. A processor-implemented add-in upgrade enrollment facilitating system, comprising:
an upgrade facilitating component means, to:
obtain, via at least one processor, an event signal associated with a plan member enrolled into a plan that includes a core coverage component and an add-ins coverage component;
retrieve, via at least one processor, plan member data associated with the plan member;
determine, via at least one processor, a condition or procedure associated with the event signal based on event signal data associated with the event signal;
determine, via at least one processor, that an atomized add-in upgrade that provides coverage for the determined condition or procedure is available to the plan member;
determine, via at least one processor, an atomized add-in recommendation for the plan member, wherein the atomized add-in recommendation includes a set of atomized add-in options;
provide, via an enrollment user interface, the atomized add-in recommendation to the plan member;
obtain, via the enrollment user interface, a selection of an atomized add-in from the plan member; and
facilitate, via at least one processor, addition of the selected atomized add-in to the add-ins coverage component of the plan.

132. The system of embodiment 131, further comprising:
the upgrade facilitating component means, to:
determine, via at least one processor, that here is an outstanding claim associated with the plan member that benefits from the addition of the selected atomized add-in to the add-ins coverage component; and
facilitate, via at least one processor, processing the outstanding claim based on coverage provided by the selected atomized add-in.

133. The system of embodiment 131, wherein the event signal is one of: a coverage search by the plan member, a health care electronic data interchange transaction associated with the plan member, an electronic health information message associated with the plan member.

134. The system of embodiment 131, wherein the event signal comprises a plurality of event signals, and wherein the condition or procedure associated with the event signal is determined a based on a combination of event signal data from the plurality of event signals.

135. The system of embodiment 131, wherein the plan member data includes at least one of: profile data associated with the plan member, clinical data associated with the plan member, plan configuration of the plan.

136. The system of embodiment 135, wherein the condition or procedure associated with the event signal is determined also based on the clinical data associated with the plan member.

137. The system of embodiment 135, wherein the atomized add-in recommendation is determined also based on the plan configuration of the plan.

138. The system of embodiment 135, wherein the determination that the atomized add-in upgrade is available is determined also based on the profile data associated with the plan member.

139. The system of embodiment 131, wherein the determination that the atomized add-in upgrade is available is made based on the determination that the core coverage component does not provide coverage for the determined condition or procedure, and that the add-ins coverage component does not provide coverage for the determined condition or procedure.

140. The system of embodiment 131, wherein the determination that the atomized add-in upgrade is available is made based on the determination that a chronic condition add-in upgrade is beneficial for the plan member.

141. The system of embodiment 131, wherein the set of atomized add-in options includes a plurality of available procedure add-in options.

142. The system of embodiment 141, wherein the available procedure add-in options are determined based on care efficacy of procedures.

143. The system of embodiment 131, wherein the set of atomized add-in options include a plurality of available provider add-in options.

144. The system of embodiment 143, wherein the available provider add-in options are determined based on proximity of providers to the plan member's location.

145. The system of embodiment 131, wherein the selected atomized add-in is associated with a payroll deduction cost and with a copay cost.

146. A processor-implemented add-in upgrade enrollment facilitating method, comprising:
executing processor-implemented upgrade facilitating component instructions to:
obtain, via at least one processor, an event signal associated with a plan member enrolled into a plan that includes a core coverage component and an add-ins coverage component;
retrieve, via at least one processor, plan member data associated with the plan member;
determine, via at least one processor, a condition or procedure associated with the event signal based on event signal data associated with the event signal;
determine, via at least one processor, that an atomized add-in upgrade that provides coverage for the determined condition or procedure is available to the plan member;
determine, via at least one processor, an atomized add-in recommendation for the plan member, wherein the atomized add-in recommendation includes a set of atomized add-in options;
provide, via an enrollment user interface, the atomized add-in recommendation to the plan member;
obtain, via the enrollment user interface, a selection of an atomized add-in from the plan member; and
facilitate, via at least one processor, addition of the selected atomized add-in to the add-ins coverage component of the plan.

147. The method of embodiment 146, further comprising:
executing processor-implemented upgrade facilitating component instructions to:
determine, via at least one processor, that here is an outstanding claim associated with the plan member that benefits from the addition of the selected atomized add-in to the add-ins coverage component; and
facilitate, via at least one processor, processing the outstanding claim based on coverage provided by the selected atomized add-in.

148. The method of embodiment 146, wherein the event signal is one of: a coverage search by the plan member, a health care electronic data interchange transaction associated with the plan member, an electronic health information message associated with the plan member.

149. The method of embodiment 146, wherein the event signal comprises a plurality of event signals, and wherein the condition or procedure associated with the event signal is determined based on a combination of event signal data from the plurality of event signals.

150. The method of embodiment 146, wherein the plan member data includes at least one of: profile data associated with the plan member, clinical data associated with the plan member, plan configuration of the plan.

151. The method of embodiment 150, wherein the condition or procedure associated with the event signal is determined also based on the clinical data associated with the plan member.

152. The method of embodiment 150, wherein the atomized add-in recommendation is determined also based on the plan configuration of the plan.

153. The method of embodiment 150, wherein the determination that the atomized add-in upgrade is available is determined also based on the profile data associated with the plan member.

154. The method of embodiment 146, wherein the determination that the atomized add-in upgrade is available is made based on the determination that the core coverage component does not provide coverage for the determined condition or procedure, and that the add-ins coverage component does not provide coverage for the determined condition or procedure.

155. The method of embodiment 146, wherein the determination that the atomized add-in upgrade is available is made based on the determination that a chronic condition add-in upgrade is beneficial for the plan member.

156. The method of embodiment 146, wherein the set of atomized add-in options includes a plurality of available procedure add-in options.

157. The method of embodiment 156, wherein the available procedure add-in options are determined based on care efficacy of procedures.

158. The method of embodiment 146, wherein the set of atomized add-in options include a plurality of available provider add-in options.

159. The method of embodiment 158, wherein the available provider add-in options are determined based on proximity of providers to the plan member's location.

160. The method of embodiment 146, wherein the selected atomized add-in is associated with a payroll deduction cost and with a copay cost.

201. An enhanced dynamic account structure apparatus, comprising:
a memory;
a component collection in the memory;
a processor disposed in communication with the memory, and configured to issue a plurality of processing instructions from the component collection stored in the memory, to:
obtain initial plan budget from a user, wherein the initial plan budget includes a temporal duration;

obtain plan option selections and values, via design user interface widgets, wherein the options a include: individual co-pay options for individual events, and desired procedures, determine upgrade options based on initial plan budget value and plan option selections and values, wherein excess amounts left over from plan option selections and values from initial plan budget are used to search for upgrade options specific to the user;

provide determined upgrade options to the user;

obtain selected upgrade options from the user;

determine schedule options for the desired procedures and provide to the user for scheduling;

generate an enhanced dynamic account structure account, wherein the enhanced dynamic structure includes: an personalized health account structure, and wherein the personalized health account structure includes a core component includes catastrophic health coverage with preventative and primary care, wherein the personalized health account includes a pointer to callable options for additional services for the determined upgrade options and on demand coverage.

202. The enhanced dynamic account structure apparatus of embodiment 201, wherein the temporal duration is any of: days, weeks, months, yearly, and multi-yearly.

203. The enhanced dynamic account structure apparatus of embodiment 201, wherein the upgrade options include at least one of chronic condition coverage upgrades, discretionary procedure coverage upgrades and service category coverage upgrades.

204. The enhanced dynamic account structure apparatus of embodiment 201, wherein the personalized health account is an HRA.

205. The enhanced dynamic account structure apparatus of embodiment 201, wherein the pointer to callable options is an unreferenced pointer.

206. The enhanced dynamic account structure apparatus of embodiment 201, wherein the pointer to callable options is an untyped pointer.

207. The enhanced dynamic account structure apparatus of embodiment 201, wherein the pointer to callable options is an void types pointer that may late bind to different data types on-demand.

In order to address various issues and advance the art, the entirety of this application for Use Determination Risk Coverage Datastructure for On-Demand and Increased Efficiency Coverage Detection and Rebalancing Apparatuses, Methods and Systems (including the Cover Page, Title, Headings, Field, Background, Summary, Brief Description of the Drawings, Detailed Description, Claims, Abstract, Figures, Appendices, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Further and to the extent any financial and/or investment examples are included, such examples are for illustrative purpose(s) only, and are not, nor should they be interpreted, as investment advice. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components, data flow order, logic flow order, and/or any present feature sets as described in the figures and/or throughout are not limited to a fixed operating order and/or arrangement, but rather, any disclosed order is exemplary and all equivalents, regardless of order, are contemplated by the disclosure. Similarly, descriptions of embodiments disclosed throughout this disclosure, any reference to direction or orientation is merely intended for convenience of description and is not intended in any way to limit the scope of described embodiments. Relative terms such as "lower," "upper," "horizontal," "vertical," "above," "below," "up," "down," "top" and "bottom" as well as derivative thereof (e.g., "horizontally," "downwardly," a "upwardly," etc.) should not be construed to limit embodiments, and instead, again, are offered for convenience of description of orientation. These relative descriptors are for convenience of description only and do not require that any embodiments be constructed or operated in a particular orientation unless explicitly indicated as such. Terms such as "attached," "affixed," "connected," "coupled," "interconnected," and similar may refer to a relationship wherein structures are secured or attached to one another either directly or indirectly through intervening structures, as well as both movable or rigid attachments or relationships, unless expressly described otherwise. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of a UDRCD individual and/or enterprise user, database configuration and/or relational model, data type, data transmission and/or network framework, syntax structure, and/or the like, various embodiments of the UDRCD, may be implemented that enable a great deal of flexibility and customization. For example, aspects of the UDRCD may be adapted for service packages that are traditionally static and difficult to change.

While various embodiments and discussions of the UDRCD have included information technology analytics and processing for risk coverage, however, it is to be understood that the embodiments described herein may be readily configured and/or customized for a wide variety of other applications and/or implementations.

What is claimed is:

1. A coverage enrollment facilitating apparatus, comprising:
    at least one memory;
    a component collection in the at least one memory;
        at least one processor disposed in communication with the at least one memory, the at least one processor executing processor-executable instructions from the component collection, the component collection storage structured with processor-executable comprising:
            obtain, via at least one processor, a coverage enrollment request from a user;
            determine, via at least one processor, a plan sponsor associated with the user;
            retrieve, via at least one processor, plan sponsor settings associated with the plan sponsor and the user, in which the plan sponsor settings include atomized condition classification settings, atomized procedure classification settings, and subsidization settings;
            structure, via at least one processor, available options for an enrollment user interface based on the plan sponsor settings;
            obtain, via the enrollment user interface, copay setting selections for individual core coverage services, from the available options, of the user;
            obtain, via the enrollment user interface, atomized medical condition add-in selections, from the available options, of the user;
            obtain, via the enrollment user interface, atomized medical procedure add-in selections, from the available options, of the user;
            generate an associated combinational medical plan data structure based on the plan sponsor settings and the obtained copay setting selections, atomized medical condition add-in selections, and atomized medical procedure add-in selections;
            calculate, via at least one processor, a core coverage cost using the associated combinational medical plan data structure;
            calculate, via at least one processor, add-in coverage costs, for each of the selected atomized medical condition add-in and each of the selected atomized medical procedure add-in, using the associated combinational medical plan data structure;
            calculate, via at least one processor, a user cost for the user based on the core coverage cost, the subsidization settings for the core coverage cost, the add-in coverage costs, and the subsidization settings for the add-in coverage costs; and
            modify, via at least one processor, the enrollment user interface based on the user selections to display the calculated user cost for the user;
            obtain, via the enrollment user interface, a user selection of a plan, wherein the user selected plan comprises at least one of:
                a Personal Protection Plan (PPP), wherein the PPP is a data structure comprising fields for: a coverage amount, a pointer to usage, an estimated usage, a goal, an entity of coverage, and a person of coverage, and/or
                a Health Reimbursement Account (HRA), wherein the HRA is a data structure comprising fields for: a novel coverage, a demand, and a reimbursement; and
            store, in the component collection storage, the plan selected by the user.

2. The apparatus of claim 1, further comprising:
    facilitate, via at least one processor, enrollment of the user into a plan that includes the core coverage, and add-ins coverage for the selected atomized medical condition add-ins and the selected atomized medical procedure add-ins.

3. The apparatus of claim 2, further comprising:
    facilitate, via at least one processor, enrollment of the user into additional add-ins at any time during a plan term associated with the plan.

4. The apparatus of claim 1, in which the plan sponsor settings include available plan terms.

5. The apparatus of claim 4, in which a plan term is any of: days, weeks, months, yearly, multi-yearly.

6. The apparatus of claim 4, in which the associated combinational medical plan data structure is determined based on a plan term selected by the user from the available plan terms.

7. The apparatus of claim 1, in which the plan sponsor settings include available provider networks.

8. The apparatus of claim 7, in which the associated combinational medical plan data structure is determined based on a set of provider networks selected by the user from the available provider networks.

9. The apparatus of claim 1, in which the subsidization settings specify a first subsidization amount or percentage for the core coverage and a second subsidization amount or percentage for add-ins coverage.

10. The apparatus of claim 1, in which the subsidization settings specify an individual subsidization amount or percentage for each add-in.

11. The apparatus of claim 1, in which the available options associated with an atomized medical condition add-in include a plurality of available procedure options.

12. The apparatus of claim 1, in which the available options associated with an atomized medical procedure add-in include a plurality of available provider options.

13. The apparatus of claim 12, in which the available provider options are determined based on proximity of providers to the user's location.

14. The apparatus of claim 1, in which a coverage cost associated with an atomized medical condition add-in is calculated based on disease progression probabilities associated with a corresponding atomized condition.

15. The apparatus of claim 1, in which the user cost is a pay period deduction.

16. A facilitating coverage enrollment process, including processing processor-executable instructions via at least one processor from a component collection stored in at least one memory, the component collection storage structured with processor-executable instructions, comprising:
    obtaining, via at least one processor, a coverage enrollment request from a user;
    determining, via at least one processor, a plan sponsor associated with the user;
    retrieving, via at least one processor, plan sponsor settings associated with the plan sponsor and the user, in which the plan sponsor settings include atomized condition classification settings, atomized procedure classification settings, and subsidization settings;

structuring, via at least one processor, available options for an enrollment user interface based on the plan sponsor settings;

obtaining, via the enrollment user interface, copay setting selections for individual core coverage services, from the available options, of the user;

obtaining, via the enrollment user interface, atomized medical condition add-in selections, from the available options, of the user;

obtaining, via the enrollment user interface, atomized medical procedure add-in selections, from the available options, of the user;

generating an associated combinational medical plan data structure based on the plan sponsor settings and the obtained copay setting selections, atomized medical condition add-in selections, and atomized medical procedure add-in selections;

calculating, via at least one processor, a core coverage cost using the associated combinational medical plan data structure;

calculating, via at least one processor, add-in coverage costs, for each of the selected atomized medical condition add-in and each of the selected atomized medical procedure add-in, using the associated combinational medical plan data structure;

calculating, via at least one processor, a user cost for the user based on the core coverage cost, the subsidization settings for the core coverage cost, the add-in coverage costs, and the subsidization settings for the add-in coverage costs; and structuring, via at least one processor, the enrollment user interface to display the calculated user cost for the user;

obtain, via the enrollment user interface, a user selection of a plan, wherein the user selected plan comprises at least one of:
- a Personal Protection Plan (PPP), wherein the PPP is a data structure comprising fields for: a coverage amount, a pointer to usage, an estimated usage, a goal, an entity of coverage, and a person of coverage, and/or
- a Health Reimbursement Account (HRA), wherein the HRA is a data structure comprising fields for: a novel coverage, a demand, and a reimbursement; and store, in the component collection storage, the plan selected by the user.

* * * * *